United States Patent [19]
Wilkerson et al.

[11] Patent Number: 5,778,387
[45] Date of Patent: Jul. 7, 1998

[54] DATABASE AUTOMATED RECOVERY SYSTEM

[75] Inventors: Thomas Adam Wilkerson, Lenexa; Roger Lynn Bechtel, Shawnee; James Robert Cessna, Olathe; David Francis Costello, Overland Park; James Louis Frentrop, Kansas City; Edwin Lee Ryan, Overland Park, all of Kans.; Gary Douglas Shaw, Raytown, Mo.

[73] Assignee: Sprint Communications Co., L.P., Kansas City, Mo.

[21] Appl. No.: 444,624

[22] Filed: May 19, 1995

[51] Int. Cl.$^6$ .................................................. G06F 17/30
[52] U.S. Cl. ..................... 707/202; 707/204; 395/182.18
[58] Field of Search .......................... 395/600, 182.18, 395/573; 707/202, 204

[56] References Cited

U.S. PATENT DOCUMENTS

| | | | |
|---|---|---|---|
| 5,151,987 | 9/1992 | Abraham et al. | 395/575 |
| 5,201,044 | 4/1993 | Frey, Jr. et al. | 395/575 |
| 5,241,588 | 8/1993 | Babson, III et al. | 379/201 |
| 5,247,669 | 9/1993 | Abraham et al. | 395/600 |
| 5,265,206 | 11/1993 | Shackelford et al. | 395/683 |
| 5,287,496 | 2/1994 | Chen et al. | 395/600 |
| 5,327,529 | 7/1994 | Fults et al. | 345/335 |
| 5,446,884 | 8/1995 | Schwendemann et al. | 395/600 |
| 5,504,883 | 4/1996 | Coverston et al. | 395/600 |

*Primary Examiner*—Thomas G. Black
*Assistant Examiner*—Cheryl R. Lewis
*Attorney, Agent, or Firm*—Harley R. Ball; Jed W. Caven

[57] ABSTRACT

The present invention is directed to a method and apparatus that automates the database recovery process. A person not technically skilled in the use of a computer can operate the new procedure. The process operates under a system in which menus known as "panels" prompt the user for information and process selection. The user merely selects one of the panels to start and operate the system. Each recovery procedure follows the same general series of steps comprising of initialization of system location and variables, selection by the operator of major functions including research, recovery, and cleanup, process of the function and function options, and execution of the mode in which the function will be processed. This panel driven system results in a significant reduction of the amount of time required for recovery, at least a twenty percent decrease for the period. In accordance with the present invention, the user identifies the corrupted database and enters the database name and estimated time stamp into the computer. The database recovery system automatically creates program control language and executes the language wherein the result provides a new, more accurate time stamp. The recovery system then creates additional program control language using the new time stamp and executes the program control language which then recovers the uncorrupted data. The user does not need to look up, write, or enter any program control language. These functions are fully automated.

17 Claims, 44 Drawing Sheets

FIGURE 4

```
IMSn -------------- IMS Automated Recovery --------------- IMSn
COMMAND ===>

IMS system: _              Choose an option: _
       P  Production              1  IMS Recovery Research
       S  CASS                    2  IMS Recovery
       T  Test                    3  IMS Recovery Clean-up
       R  Cass Test
       C  Int. Test Press ENTER KEY to process, or END KEY to terminate
```

FIGURE 5

```
IMSn ---------------- Job Execution Options ----------------- IMSn
COMMAND ===>

Choose an option: _
       1  Execute in Foreground
       2  Execute as a Batch Job Press ENTER KEY to process, or END KEY to terminate
```

FIGURE 6

```
IMSn --------------- Foreground Output Options -------------- IMSn
COMMAND ===>

Specify the disposition of the output:

Option = _              Class/Printer = _____
       1  KEEP it
       2  Route to Sysout, then delete
       3  Print on a VPS printer, then delete
       4  Delete it (default)

Press ENTER KEY to process, or END KEY to terminate
```

FIGURE 7

```
IMSn ---------------- IMS Recovery Research ----------------- IMSn
COMMAND ===>

Choose an option: _
         1  List History              10  DBD/PSB Information
         2  List LOG                  11  List OLDS Status
         3  List SUBSYS
         4  List CAGRPS/DBDSGRPs
         5  List BKOUT
         6  Outage by DBD Analysis
         7  Outage by PSB Analysis
         8  List Transactions for a DBD
         9  List RECON Status Press ENTER KEY to process, or END KEY to terminate
```

FIGURE 8

```
IMSn ----------------------- List History ----------------------- IMSn
COMMAND ===>

Specify the following processing information:
         Type        G              (D = DBD or G = DBDSGRP)
         Name        _____
         From Time   _____       (yydddhhmmsstt)
         To Time     _____       (yydddhhmmsstt)

Press ENTER KEY to process, or END KEY to terminate
```

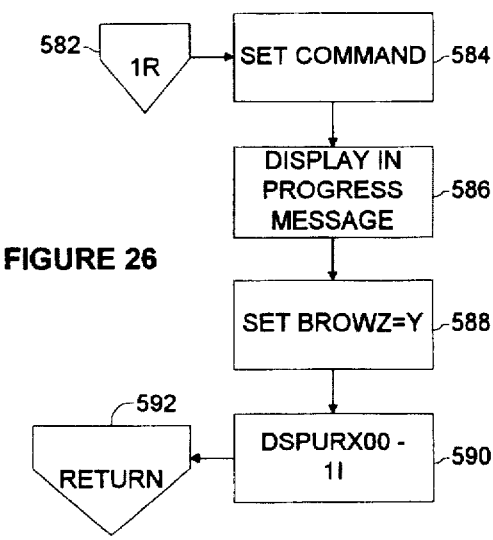
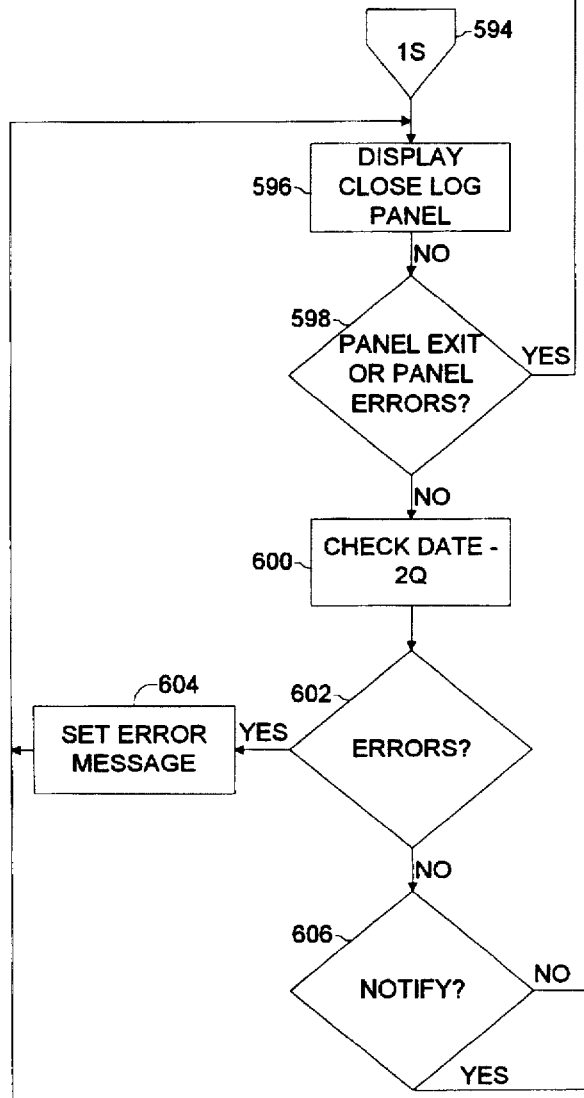
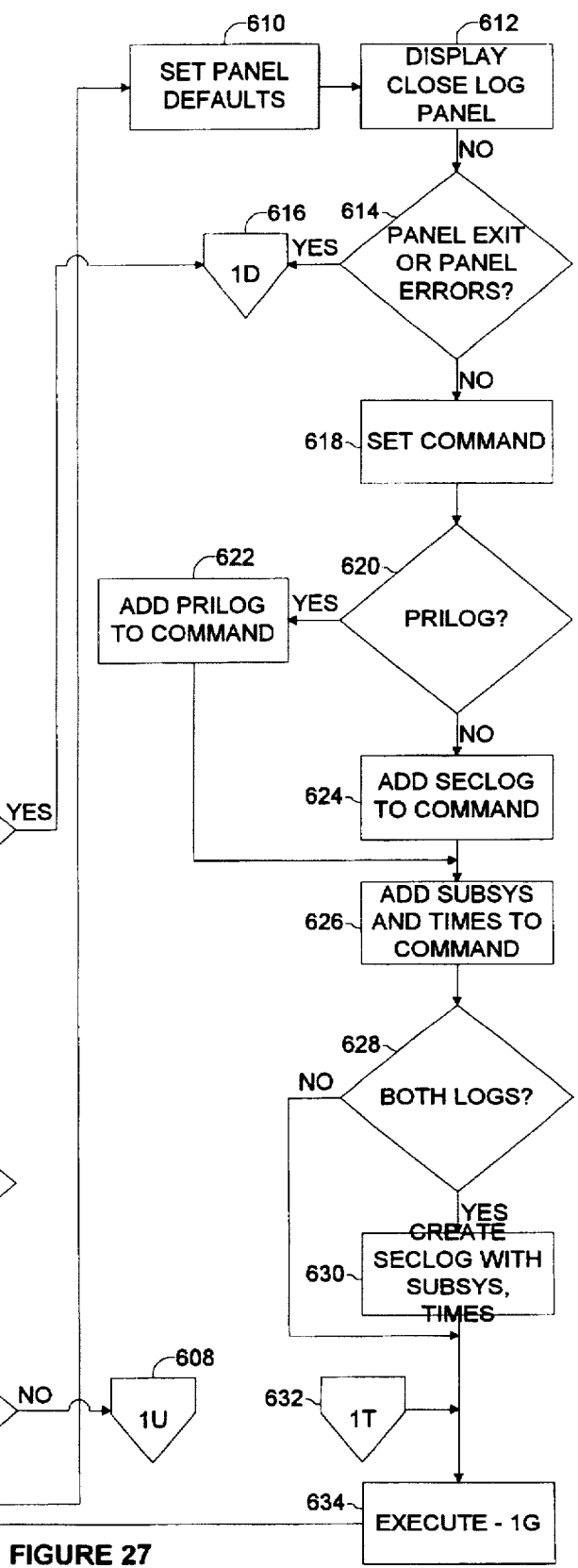
FIGURE 26
FIGURE 27

FIGURE 28
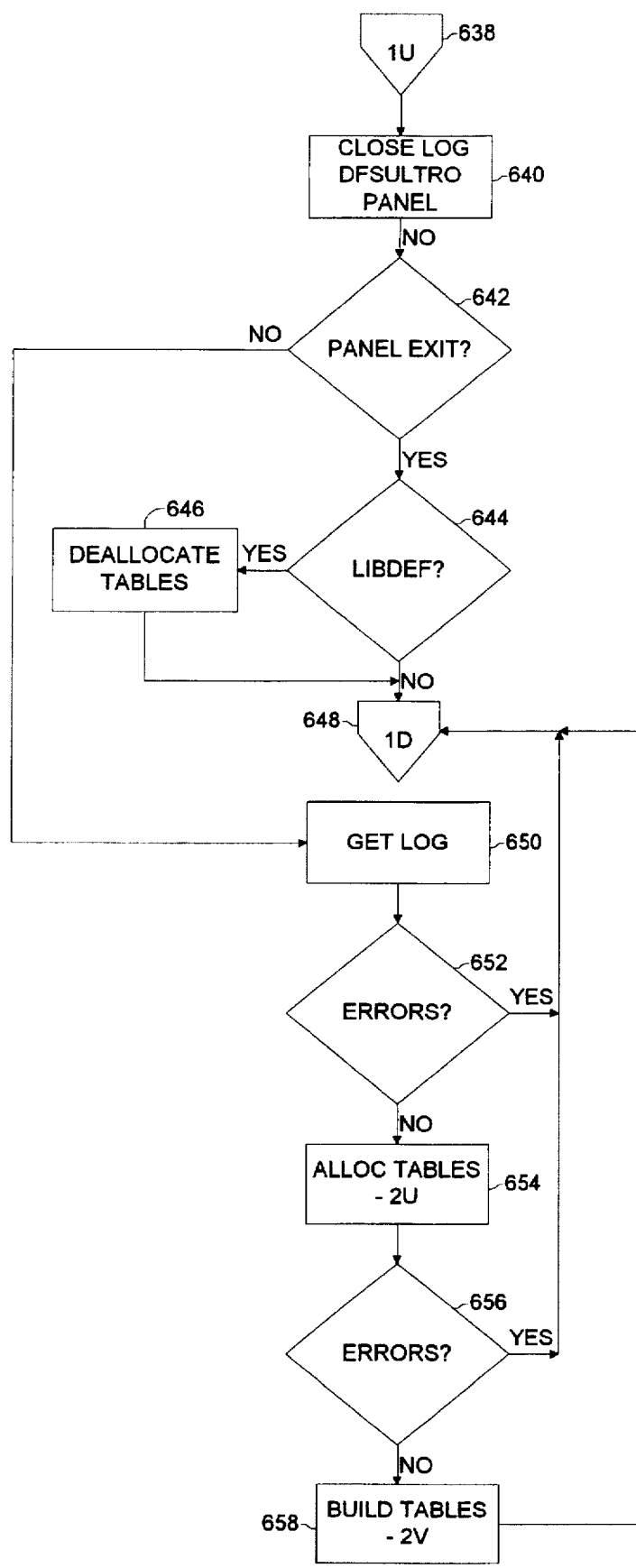
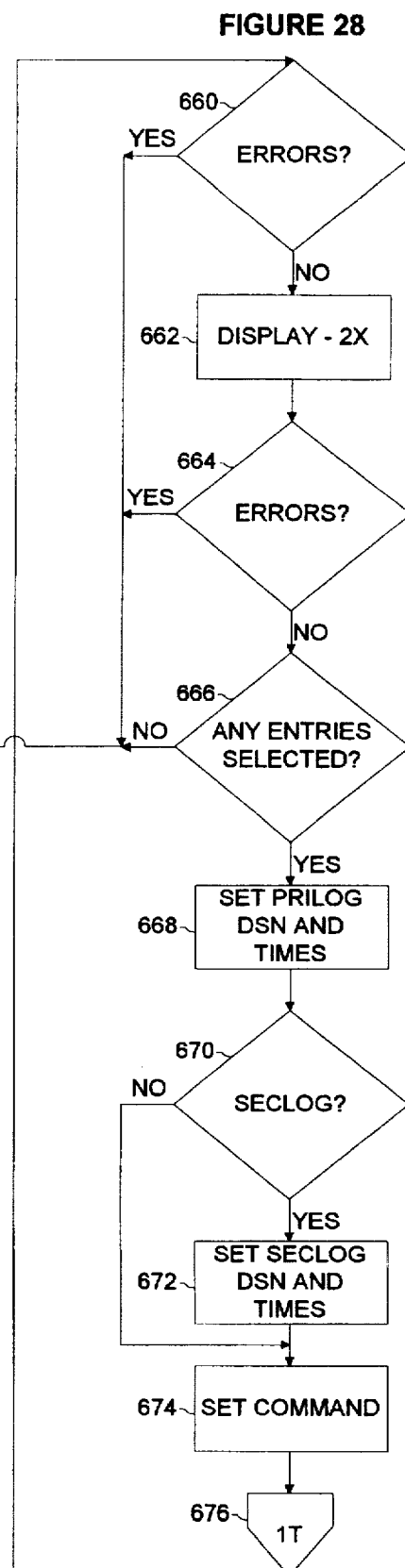

FIGURE 38
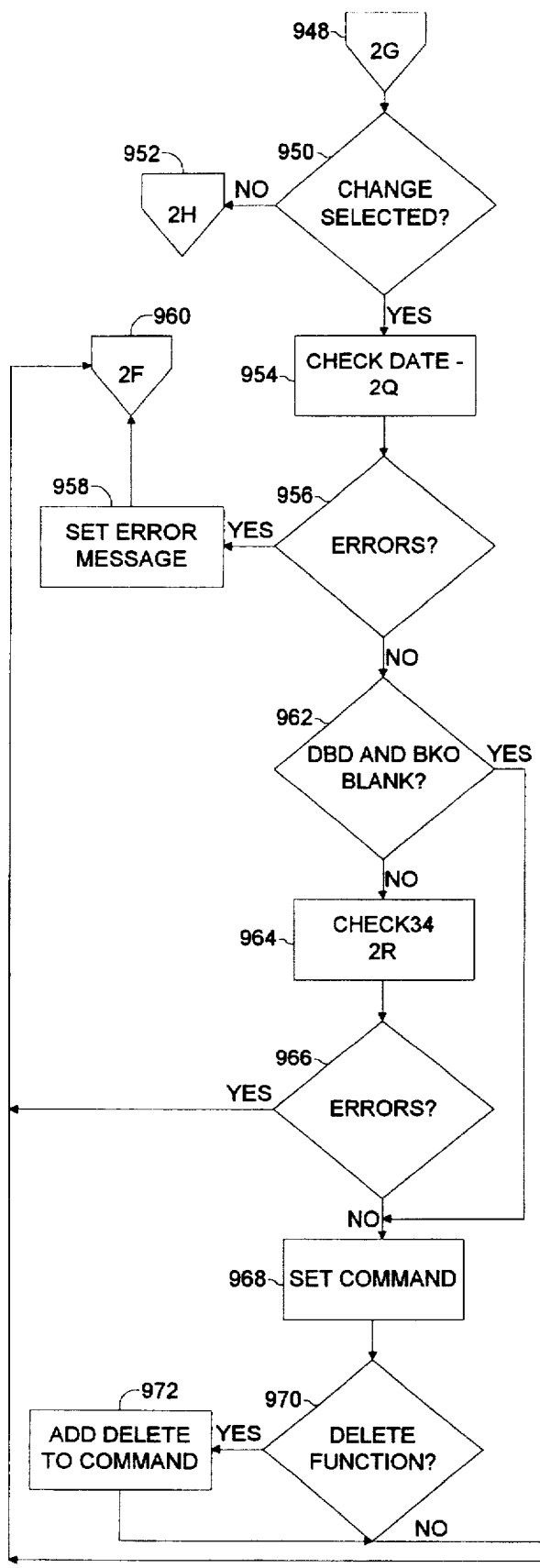
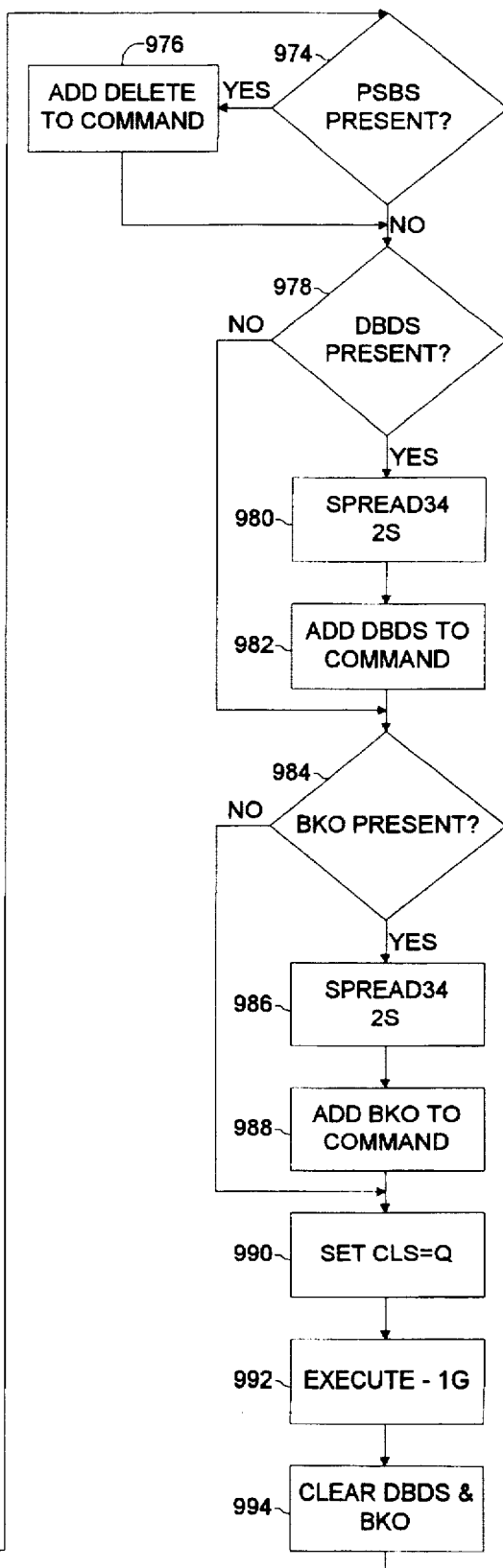

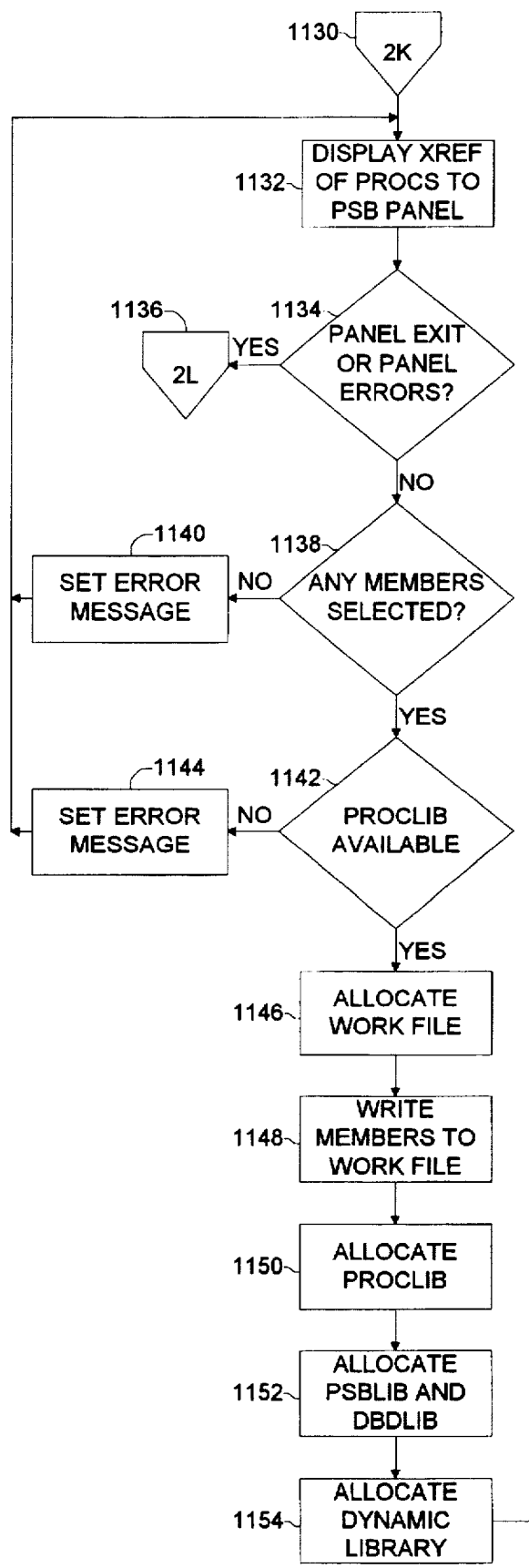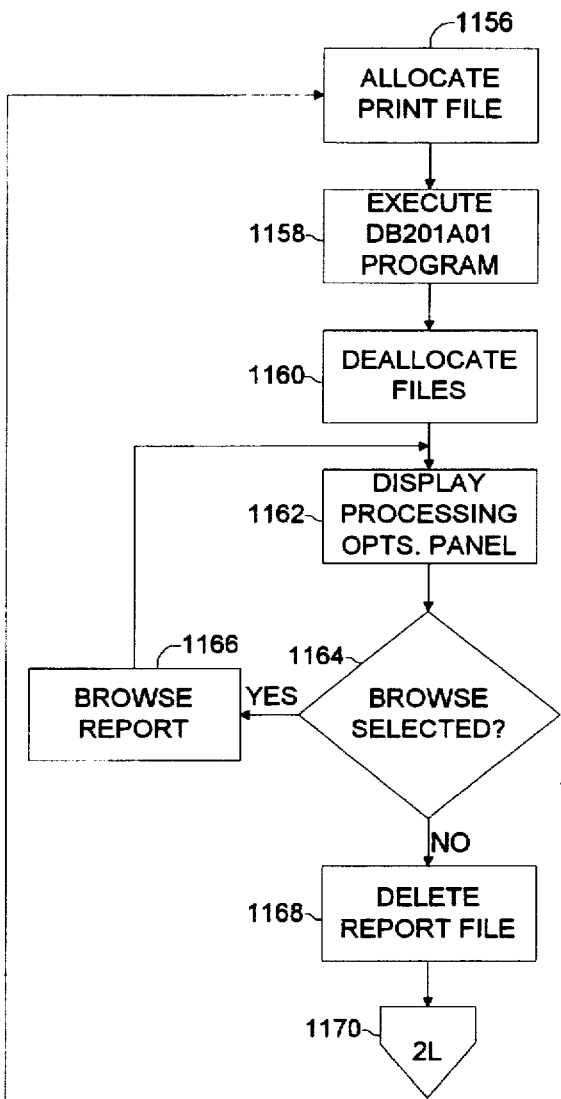
FIGURE 42

DATABASE AUTOMATED RECOVERY SYSTEM

BACKGROUND

1. Field of the Invention

This invention relates generally to the field of computer integration and communication. More particularly, the invention concerns an automated menu driven computer process and system that allows recovery of corrupted or lost data from a computer database. The standardized and mechanized approach used in analysis, setup, and recovery of data and related processes insures data and system integrity.

2. Prior Art

Computer systems have internal and external memory locations for storage of information. These memory locations are either volatile or non-volatile, wherein volatile memory such as Random Access Memory (RAM) or Bubble Memory are non-static and disk memory or some other Direct Access Storage Device (DASD) are typical types of static non-volatile memory. Data that is similar in nature, function, or informational degree is stored in specified locations known as databases. Databases are thus "bases" or groups of data whose function is analogous to a file drawer or file can in a file cabinet. Once the computer system is appropriately configured to recognize database memory locations, operational data used by the computer and informational data used by the computer operator are stored in the databases so that it may be retrieved and used at a later time.

Unfortunately, databases can be corrupted, resulting in a loss of the data. This occurs in many situations including loss of power to the Central Processing Unit (CPU), hardware and software occurring errors, cancellation of a computer command execution when the execution is working in a database file, or by entering wrong data. Retrieval of data stored prior to corruption is necessary to allow computer subsystems to return to efficient and proper operations and to allow the computer operator to work with previously stored informational data.

Prior to this invention, recovery of a corrupted computer database was a tedious, manual process that was subject to errors of omission. An experienced programmer had to use the computer program control language to retrieve the stored database. This required extensive knowledge of the mainframe program control language and a technical understanding of the mainframe computer system and of the operation of the mainframe under the program control language. Therefore, the degree of accuracy of the recovery was largely dependent upon the expertise of the individual operator.

Under the previous method, a technician first had to identify the database which was corrupted. The technician then searched through a technical reference book to determine the correct programming sequences, entered the program sequences into the computer, and executed the program. Execution of the program retrieved information from a Database Recovery and Control Repository (DBRC) which holds information in a time log format.

The time log is a record of each change in data along a linear time line. This record holds an image "picture" of the database before and after any data operation or change, and that record is "stamped" with the exact time as specified by the year, day, hour, minute, second, and tenths of a second. This time stamp is used to determine when the database was corrupted.

Using the estimated time stamp and database name retrieved by the first program execution, the technician again manually identified instructions from the technical reference book and formulated another sequence of program instructions with the program control language. Execution of this second computer program recovered database information which was stored prior to the time of the time stamp. The process involved much human work and is subject to a high risk of error and time delay.

Accordingly, it is desirable to have an automated system that would standardize the approach used by individual operators to provide consistency for recovery procedure and eliminate the risk of error and delay.

It is desirable that the system would be easy for the computer operator to use and would not require the operator to have technical expertise in the program control language or in the underlying computer operation.

A further desire is that there would be a reduction in analysis and database setup time and databases would have a high integrity factor.

Additional desirable features of the invention will be set forth in the description which follows and will be apparent from the description or may be learned from the practice of the invention.

SUMMARY

The present invention is directed to a method and apparatus that satisfies the foregoing needs. The invention eliminates the high risk of human error and delay by automating the database recovery process.

Unlike the old process, a person not technically skilled in the use of a computer can operate the new procedure. The process operates under a system in which menus known as "panels" prompt the user for information and process selection. The user merely selects one of the panels to start and operate the system. Each recovery procedure follows the same general series of steps comprising of initialization of system location and variables, selection by the operator of major functions including research, recovery, and cleanup, process of the function and function options, and execution of the mode in which the function will be processed. This panel driven system results in a significant reduction of the amount of time required for recovery, at least a twenty percent decrease for the period.

In accordance with the present invention, the user identifies the corrupted database and enters the database name and estimated time stamp into the computer. The database recovery system automatically creates program control language and executes the language wherein the result provides a new, more accurate time stamp. The recovery system then creates additional program control language using the new time stamp and executes the program control language which then recovers the uncorrupted data. The user does not need to look up, write, or enter any program control language. These functions are fully automated.

A system for automatically recovering data from a database comprises an information database that stores data, and a log database that stores image copies of the data. The image copies are each loaded with a time stamp that corresponds to when that image copy was made. The system includes an interface to input an information database designation and a time stamp value which are both associated with particular data to be recovered. The system includes a database recovery routine to create program control language based in part on the input. The system also includes a processor to control the interface, execute the database recovery routine, and execute the program control language. This restores an image copy of the particular data to the designated information database.

The database recovery routine may be comprised of a research-recovery routine and a data recovery routine. The research recovery routine locates a particular entry to the log database that has a particular time stamp corresponding to when the particular data was lost. The data-recovery routine creates program control language based in part on the particular entry and the particular time stamp.

A method for automatically recovering data from a database comprises researching an identified database and an identified time stamp to provide subsystem information needed for the recovery of a database. The method includes automatically creating initial program control language sequences to locate an image copy of database information that is stored in a database recovery repository. The database information is held in a time log format. The method includes recovering database information by using the located image copy stored in the database recovery repository and automatically formulating a sequence of job control language for automatically recovering the identified database information stored prior to the time of the identified time stamp.

BRIEF DESCRIPTION OF THE DRAWINGS

The invention will be described with respect to a preferred embodiment thereof which is further illustrated and described in the drawings. The drawings together with the general description above and the detailed description of the preferred embodiment explain the principles of the invention.

In the drawings:

FIG. 4 depicts an IMS Automated Recovery system panel in accordance with one embodiment of the present invention.

FIG. 5 depicts a Job Execution Options system panel in accordance with one embodiment of the present invention.

FIG. 6 depicts a Foreground Output Options system panel in accordance with one embodiment of the present invention.

FIG. 7 depicts an IMS Recovery Research system panel in accordance with one embodiment of the present invention.

FIG. 8 depicts a List History system panel in accordance with one embodiment of the present invention.

FIG. 26 is a flow diagram illustrating the flow for both the list recon status routine and the list olds status routine in accordance with one embodiment of the present invention.

FIG. 27 is a flow diagram illustrating the close log option in accordance with one embodiment of the present invention.

FIG. 28 is a continuation of the flow diagram of FIG. 27.

FIG. 38 is a continuation of the flow diagram of FIG. 37.

FIG. 42 is a flow diagram illustrating the cross reference of procedure option in accordance with one embodiment of the present invention.

DETAILED DESCRIPTION OF THE PREFERRED EMBODIMENT

The following description of the preferred embodiment of the present invention and the illustrations in the accompanying drawings are exemplary and do not limit the implementations of the present invention. The present invention may be realized by other implementations.

A. Overview

The present invention overcomes the problems and disadvantages of prior conventional methods by automating the process. As used in this application, "user" or "operator" refer to a person using the system to test, modify, create, recover, or otherwise operate on data.

The preferred embodiment operates on an International Business Machine (BM) mainframe computer which uses Information Management System (IMS) full function databases and the associated Job Control Language (JCL). A mainframe computer can be thought of as to contain a hierarchy for hardware, software, and operations. Operations include communication of the software to all portions of the mainframe utilizing the hardware as input, output, and control devices. The hierarchy is a top-down development which determines the relative position and task of each system, subsystem, or other portion of the computer.

Figure 1:
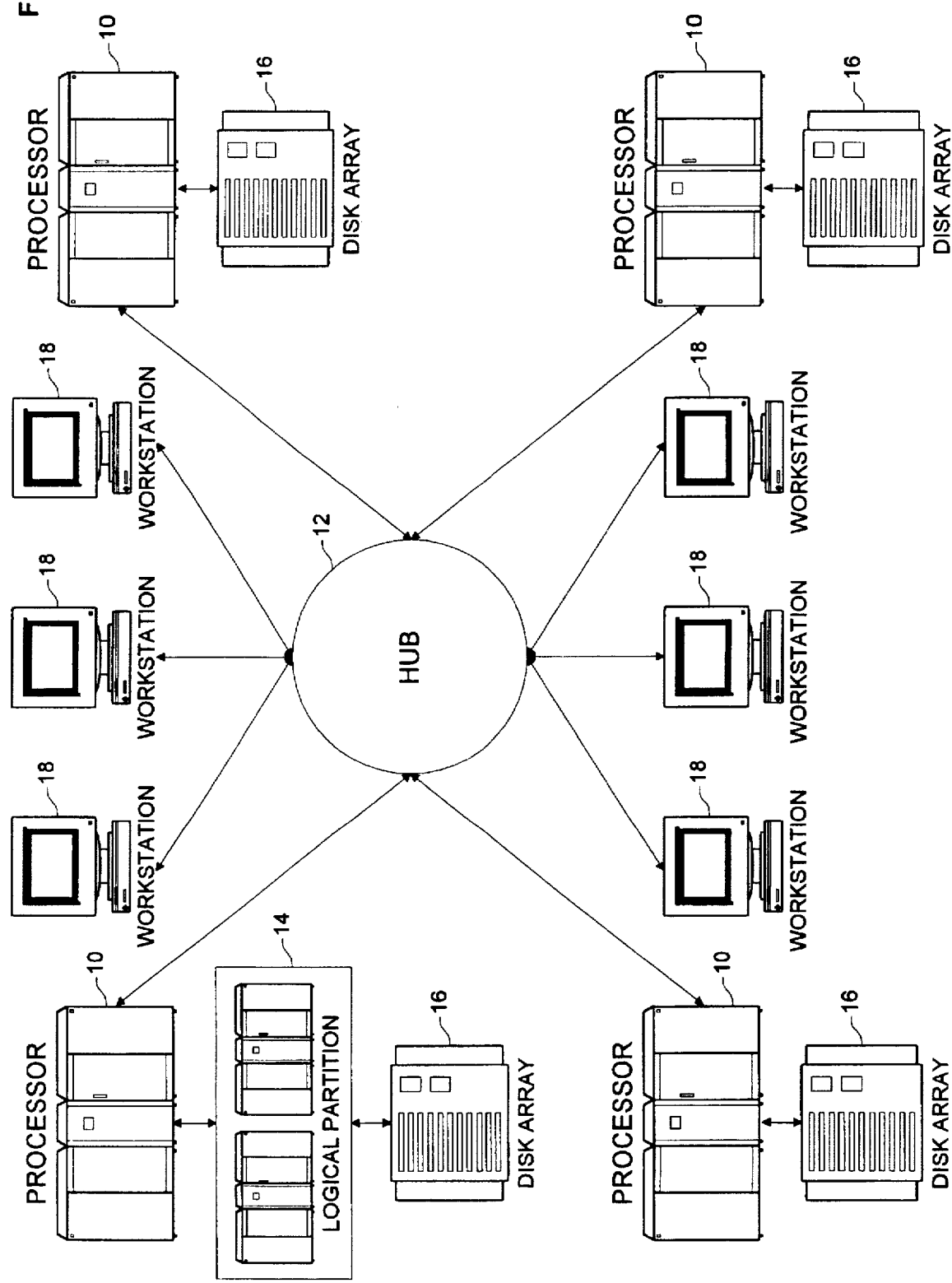
FIG. 1 illustrates a multi-system mai na me hardware hierarchy.

As illustrated by FIG. 1, the mainframe hardware hierarchy contains one or more individual processor machine nodes 10 linked to a central hub 12. The hub is either software or hardware that allows a user to be logged onto multiple computer systems concurrently. One or more of the processors may be logically partitioned into two or more separate configurations 14 so that it appears as multiple systems.

Disk arrays 16 or other DASD may be connected to one or more processors so that information may be permanently stored in non-volatile memory. Workstations 18, containing one or more input devices, such as a keyboard or mouse, and output devices, such as a monitor, extend from the central hub so that the workstations may reach any of the processors.

Figure 2:
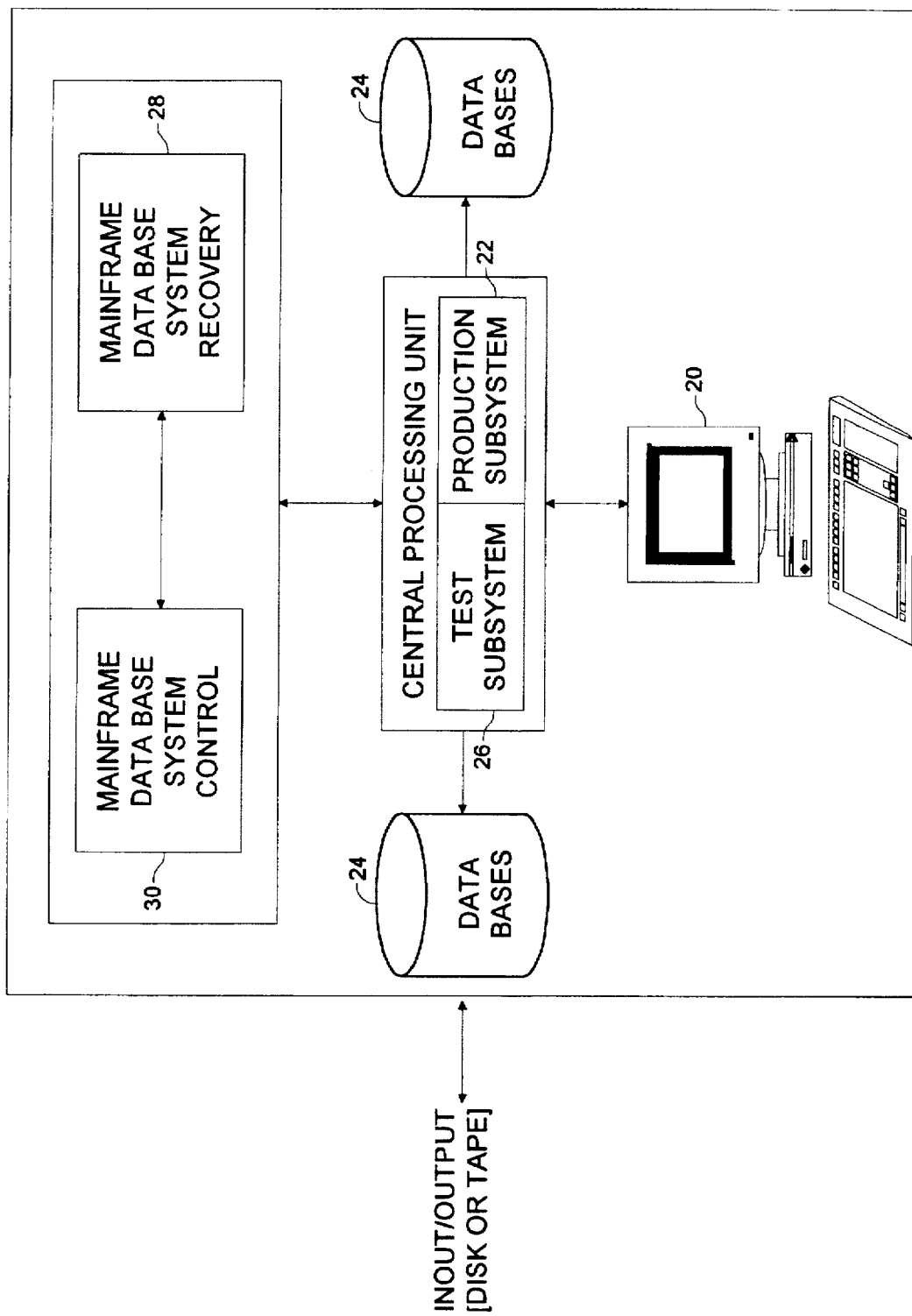
FIG. 2 illustrates a mainframe system hierarchy.

The mainframe system hierarchy is illustrated in FIG. 2. Information is input and output to and input from the processor through a workstation 20. Each processor may contain a production subsystem 22 used to control data centers and databases 24 and a test subsystem 26 used for development of software applications. The operating system hierarchy may contain several operating subsystems, such as the recovery system 28 and the control system 30. The recovery system 28 manages the operations recovery and storage in the databases. The control system 30 controls the mainframe as a whole including mainframe program control utilities and log control utilities. Although this invention works mainly with the management portion, it does interact with the control f unctions.

Software is loaded at both the operations system and user application levels. The IMS recovery process software of the preferred embodiment is dialogue written in the REstructured eXtended eXecuter (REXX procedure language for the Time Sharing Option Extended (TSO/E) and Interactive System Productivity Facility (ISPF) environment on the IBM Multiple Virtual Systems/Extended System Architecture (MVS/ESA) residing on an IBM mainframe at the operations system level but accessible at the user application level. The main software procedure is split into the functions of data error research, data recovery, and system cleanup.

However, the software and hardware hierarchy is not limited to the above preferred illustration. Dialogue applications using one or more functions can be written in other media, for example ROSCOE, and for other types of computers such as minicomputers and mid-range machines.

Figure 3:
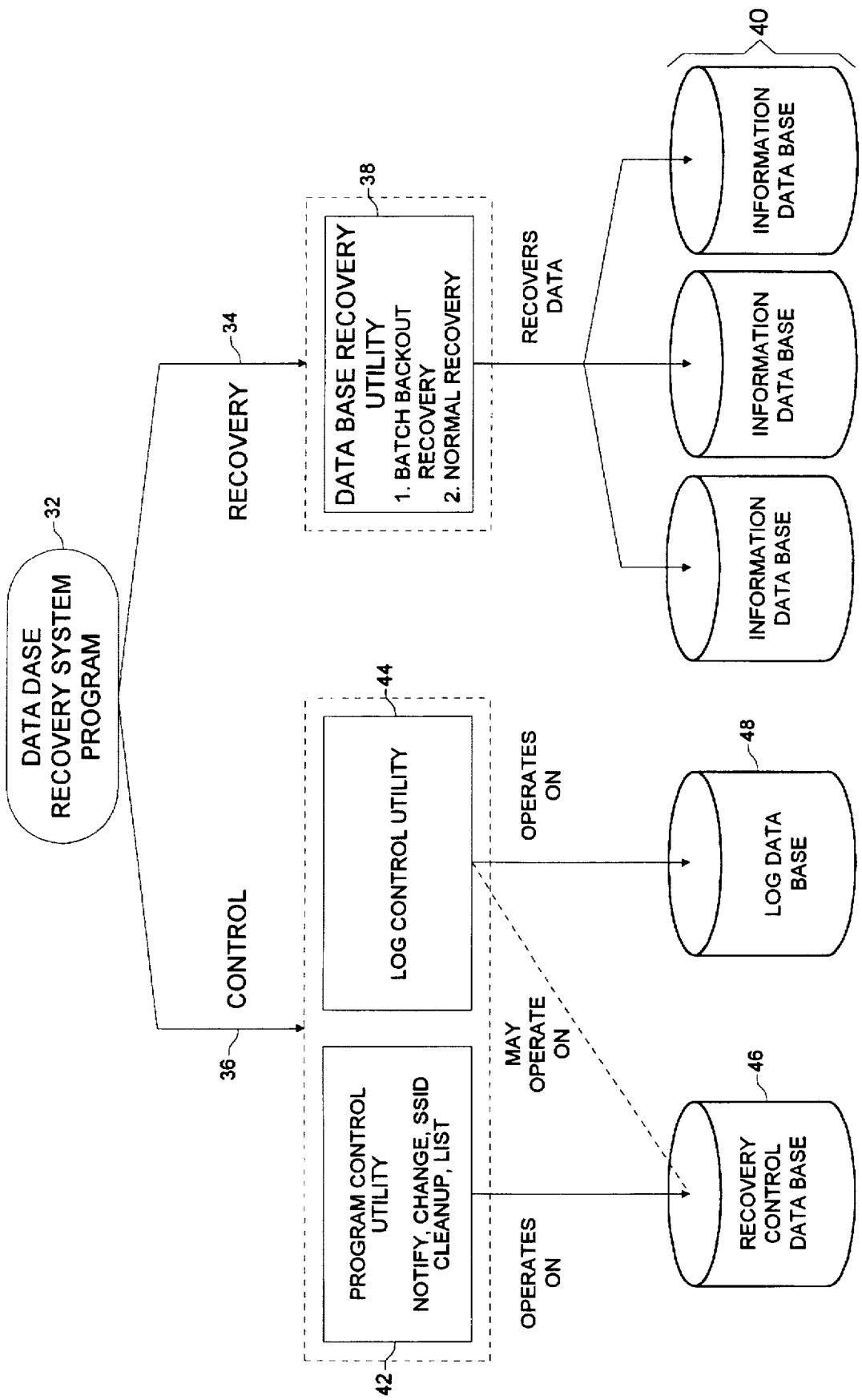
FIG. 3 illustrates a mainframe database recovery system.

As illustrated in FIG. 3, the mainframe database recovery system 32 has a recovery management portion 34 and a control portion 36. The recovery management portion 34 of the operating system has a utility 38 that provides for recovery of database information 40. Recovery is generally accomplished in one of two ways. The Batch Backout Recovery (BBO) operates on all databases not specified in the computer user's information entry. This option is used when the computer does not complete execution successfully, and all update activity must be backed out, that is restored to the state that it was in before the job began execution. The normal recovery operates on all databases in the system. Thus, the BBO is a more narrow recovery search procedure.

The control portion 36 has two main functions, program control 42 and log control 44. The program control utility 42 operates only on the recovery control databases 46, implementing such functions as List files and Subsystem Identification cleanup. The log control utility 44, also under the control portion 36, generally operates only on the log databases 48, storing and retrieving time stamp information. However, the log utility 44 may sometimes operate on the recovery control databases 46.

One of the most important functions of the computer control is that of the system log file. The log is a record of each computer transaction where a transaction is composed of a series of actions focused on an end result. All the actions must complete or the transaction is aborted. Since the log provides information about the progress and development of transactions, it is vital to data recovery. Subsystem cleanup and file listing are just two examples of transactions.

When a transaction is commenced, the computer system records a first "image" of the data If the transaction is completed, a second image of the data is recorded at the "close." Each of these initial images are stored in volatile memory but are later written to non-volatile memory once the computer recognizes that the transaction has completed. Since two images are taken for each transaction, one at the commencement and one at the close, the system can recognize whether a transaction completed or whether it resulted in a "no close" situation. If the log does not contain the second image, the system returns the operations and data to the pre-transaction state. Such a "no close" may result from an error or an abort occurring during a transaction.

As a system security measure, each time a data operation occurs, a log entry is written to memory. If the data is later corrupted or a "no close" situation occurs during operation, the system may retrieve an image saved prior to one or more operations. In order to distinguish between these data images, the computer uses a series of pointer variables known as "time stamps." When each data image is taken, a pointer value corresponding to the date and time that the image was taken is loaded on the image. As a further security measure, the system has redundant logs. Both a primary log and a secondary log are written to memory in case one log is damaged.

B. Software Architecture and User Interface Panels

In the preferred embodiment, the Database Recovery software has three main automated functions related to the three operations a user would normally manually enter. Recovery Research provides the functions that will provide all of the information that is needed to perform a recovery of a database. It allows the user to locate the log entry with the most appropriate time stamp. This time stamp provides the basis for the recovery operations. Recovery is the second part of the recovery system. After the necessary research has been performed, Recovery provides the f unctions that will generate a jobstream for the recovery and the retrieval of the database. Recovery Clean-up is a semi-automated procedure that provides ancillary functions that are not directly needed to support the recovery of databases. These functions are used to update information maintained by the DBRC′ and generally allow a user to organize the databases and the data within each database.

Each of the three main functions have further levels of options and functions. The information in each panel level may be processed after it is entered and all of the functions and options are iterative. The iterative function allows the user to process information for several databases because, after an individual has completed an execution at a function or option in the hierarchy, the individual will be returned to that function or option so that it may executed again if desired. When the user has completed a function or option, execution of the "END KEY" will return the user to the previous panel level.

1. Program Initialization Panel Options

Upon execution of the software, the system enters an initialization routine where it queries the user for variable information. Information such as operating location, user identification, and System Measurement Facility (SMF) account information allow the software to determine billing information and to determine which set of system variables the computer must use in a multi-system mainframe such as that shown in the example of FIG. 1. Since the hardware hierarchy may contain one or more mainframe machine nodes or logically partitioned machines, the system variables narrow the scope of the log and time stamp search so that only one system log is searched.

After initialization, the software enters a first level panel illustrated by FIG. 4, Automated Recovery. The user is asked which subsystem will be used (i.e. the test subsystem or the production subsystem). The user then chooses one of the three second level panel functions, where each second level panel is related to one of the three main automated operations: Recovery Research, Recovery, or Recovery Clean-up. Each second level function has several steps comprising up to three additional levels of panel queries. Each of the functions within this panel prompt the user to enter information that will allow the software to create JCL in the Recovery stage. These are discussed in detail below.

FIG. 5 represents a second first level panel option, Job Execution Options, at which the individual has the option of executing the generated commands as a job in the foreground or to submit a batch job in the background. Generally, most software jobs can run in the foreground or the background. However, since some foreground options require tasks such as loading tapes or tasks that otherwise require a technician to complete at the main computer site, the job may be restricted to the foreground.

All foreground activity occurs at the user terminal and the terminal is non-operational until the job executes. Such a job is sent to a main operations area where the job description is displayed on a computer screen, printout, or other output device. The job is put onto a queue, and when the tape is loaded or another required task is completed by the technician, or if the computer can complete the task without a technician, the job is executed from the queue. Only five operations are batch only tasks: Recover Database, Current IC Restore, Outage by DBD Analysis, Outage by PSB Analysis, and List Transactions for a Database Definition (DBD). All other options can be run in the foreground, where the user submits job activity that will occur at the main computer site, but the user can continue operating the terminal before and during job execution.

Since no other information is required for background execution, there are no other related panels. However, if the foreground option is chosen, Foreground Output Options, a third first level panel illustrated by FIG. 6, allows the user to send data generated by a job execution to an output device.

This panel allows the user to "KEEP it" and store the output; "Route to Sysout, then delete," where the output is sent to a system output device such as a disk or printer with an identification corresponding to a System Output name; "Print on a VPS printer, then delete," where the output is sent only to a printer with a printer identification corresponding to a VPS printer; or the output can be deleted with no other function. Since no other information is required to delete the generated data or send it to a destination device, there are no related second level panels.

2. Main Options

As stated, the three main operations of Research, Recovery, and Clean-up are provided by second level panels. Since each second level panel has up to 3 sublevels of panels, this description follows a top-down development of each panel to subpanel.

FIG. 7 illustrates an example of preferred functions for the Recovery Research procedure. Eleven functions are given to the user to choose from: List History, List Log, List SUBSYS, List CAGRPS/DBDSGRPs, List BKOUT, Outage by DBD Analysis, Outage by PSB Analysis, List Transactions for a Database Definition, List RECON Status, DBD/PSB Information, and List OLDS Status. Note that the Outage Analysis function allows the system to analyze datasets for information beyond RECON database information before the databases can be restored. Each function on the second level panel has an associated third level panel that provides options for additional information and describes the operation.

Thus, FIG. 8 illustrates third level panel options that correspond to option one of FIG. 7, List History. The panel prompts the user to enter information about the list history of the database from which the user wishes to recover data. The user enters the processing type, an indication of a DBD or DBDGRP, the Database Definition Name, a map or description of a database format that indicates where information is located within a record, and the "envelope of error," the time the user wishes to start and end the recovery search of the database log.

Likewise, the other ten third level functions are demonstrated by their respective third level panel options. The List Log option prompts entry of the subsystem identification (SSID) for a job name, whether the list should specify "OPEN/ERROR," and the time the user wishes to start and end the recovery search of the database log. The List SUBSYS option, which lists the subsystem log with the named identification, asks for the subsystem identification, whether all of the log should be listed, whether the user wants a list of batch information, and whether the user wants the list on-line. The option for List CAGRPs/DBDSGRPs (List Change Accum Group/Database Definition Group) prompts input of whether the group is a change accum, which is merely a merger of database update activity that is contained on multiple log databases, or a database definition group. It also requests whether operation is on a single group or all groups, and if operation is only on a single group, the name of the single group must be specified. List BKOUT, a listing of database backouts, only requires the subsystem identification. For the Outage by DBD Analysis option, the user must enter the time to start and end the search of the databases and all database definitions that the user would like searched. For the Outage by PSB Analysis option, the user must enter the time to start and end the search of the PSBs and all PSBs that the user would like searched. At the List Transactions for a Database Definition panel, one must specify the Database Definition to be searched and indicate if this is the last DBD selected or if more DBDs are to be entered. Processing of this third level panel creates the JCL language and the panel has an associated fourth level panel, Processing Options, which actually executes the JCL. Upon entering the fourth level panel, the user may Browse the created JCL, Cancel and Exit with no further processing, Edit the JCL, or Submit the JCL for processing. The List Recon Status option executes in the foreground and hence has no third level panel. For the DBD/PSB Information option, the user specifies which one of the five processing options is wanted and the DBD or PSB name if one of the first three options is chosen. The fourth processing option is the same as the List Transactions for a Database Definition as previously described. The fifth processing option is the XREF of Procs to PSBs and it causes a fourth level panel to display. The user must enter the name of the JCL procedure library and the individual JCL procedures that are to be cross referenced. Finally, the last third level function, List OLDS Status, executes in the foreground and has no third level panel.

The Recovery procedure, chosen from the first level panel, uses information derived from the above described panels to assist in the recovery and has no third level panel. However, the user must first step through a series of panels and provide recovery information. The second level panel appearing under the Recovery function allows the user to choose from five options: Close LOG, Recover Database, Change Accum or Database Dataset Groups, Current IC Restore, or IC Delete.

The Close Log option refers to the activity log and, upon its selection, a third level panel is displayed. The user can close the log via the Notify or DFSULTR0 options in the third level panel and selection of either causes a fourth level panel to be displayed. The NOTIFY option is a mechanism that allows information to be updated in the RECON databases. For example, if a job execution ends, wherein the log does not get "closed," once the log is closed by the system, the RECON databases are sent a message that the error condition has been removed. Therefore, it is used to change the information contained in the activity log to indicate that the selected log is closed. When Notify is selected, a fourth level panel opens and the user must specify whether the Primary Log, the Secondary Log, or Both Logs are to be changed. The user also enters the subsystem identification to be used and the time to start and end the search of the databases. The DFSULTR0 option uses the system resident log control utility to close the log. When it is selected, the identification of the subsystem log to be closed is entered. A fifth level panel opens, where log entries of the subsystem are displayed and the user selects the appropriate entry to close. A batchjob is submitted which creates a new log by using the contents of the old log.

The second Recovery option, Recover Database, opens a third level panel requiring information which, when executed, will actually recover the database data. The panel requests entry of the Database Data Set Group Name/Database Definition Name, confirmation whether it is a Database Data Set Group or Database Definition Name, the time stamp of the recovery, SMF account number information for billing purposes, whether the job is to be run on the production system or test system, and the name of the programmer executing the job. The last entry is the job execution class which indicates the environment under which the job will be run on the computer. Execution of the panel without entering a time stamp introduces one additional panel requiring the user to confirm that leaving the time stamp null was intentional. In the alternative, the user may return to the prior, fourth level panel and enter a time stamp.

A third Recovery option, Change Accum or Database Data set Groups, introduces a third level panel with functions that change the composition of database data of the RECON database and that, when selected, exhibit fourth level panels. Two of the functions allow the user to List or Delete the Change Accum Group (CAGRP) or Database Data Set Group (DBDSGRP) listed by the user. An Initialize/Add function adds Database Definitions/Data Definitions (DBD/DD) to a CAGRP when both are specified. The DD is a part of the JCL that acts as a link between the internal operations/information and external operations/applications. Each DD is a part of a DBD. A forth function allows the user to generate JCL for only CAGRPs. To process this function, the user enters a CAGRP name, Change Accum time stamp, SMF account number for billing purposes, Name of Programmer, and the Execution Class. A fifth function permits the user to change the composition of a CAGRP by adding or deleting specified DBDs/DDs for a specified CAGRP.

The final two second level Recovery options are Current IC Restore and IC Delete. They allow recovery and deletion, respectively, of an Image Copy (IC) in a log. To process either of the functions, an operator enters the DBDSGRP, SMF account number for billing purposes, Job Run Type (Production or Test), Programmer Name, and Job Execution Class.

The final procedure that is available in the first level panel is Recovery Clean-up. Unlike the other two functions, Clean-up is mainly a manual function in the illustrated embodiment. Since the possible combinations of variable options are so great and because Clean-up is not normally done, this procedure is not fully automated. However, any one or more options may be automated as in the illustrated embodiments of the Research and Recovery procedures.

The Recovery Clean-up procedure has the semi-automated functions of SUBSYS Clean-up, Change, DBRC Commands, Batch Back Out Clean-up, and SUBSYS Delete. Selection of any of the functions causes a third level panel to be displayed. When the SUBSYS Clean-up option is used, the user enters a subsystem identification and the abnormal, STARTRCV, ENDRECOV, and Delete functions automatically occur. During the course of the SUBSYS Clean-up option, operation on an abnormal job (one that was not correctly terminated) is automatically terminated, a recovery of the subsystem data is implemented, and the job name is deleted from the log. If the user does not want all four of the functions to be performed, then DBRC commands are used, as explained below, instead of the SUBSYS Clean-up option.

The Change option allows the user to update log information in the RECON database for log datasets after the user enters a time stamp start time. The user determines whether to display errors or not display errors from the primary and secondary logs.

The DBRC Commands option allows the user to enter Database Recovery and Control Commands that will manually cause clean-up operations. Since these are system commands, access to enter the commands is restricted and is generally accomplished by experienced programmers. This option gives system flexibility while providing a degree of security.

The Batch Back Out Clean-up option provides the opportunity to use four system control information log and DBRC utilities: List Batch Back Out, Change, Notify, and Delete Batch Back Out. Selection of any of the utilities opens a fourth level panel. The system Lists or Deletes a subsystem after entry of the subsystem identification. However, the other two functions require more information.

Change Batch Back Out accomplishes the functions of addition, change, or deletion of a unit of recovery in a Back Out block. The user enters a subsystem identification, unit of recovery (UOR) identifying which interval to which the system recovers, a time to begin recovery, a group to delete, one or more Program Specification Blocks (PSB) which correspond to the DBDs used by the program, DBDs which correspond to the program, and the Back Out blocks (BKO) that the program won't operate on.

The Notify Batch Back Out option allows the user to create a Back Out block with a single unit of recovery. The user enters a subsystem identification, UOR, a time to begin recovery, one or more PSBs to Notify, DBDs which correspond to the program, and Back Out blocks (BKO) that the program won't operate on.

When the SUBSYS Delete option is used, the user enters a subsystem identification and the abnormal, STARTRCV, ENDRECOV, and Delete functions automatically occur. During the course of the Delete operation, an abnormal job, one that was not correctly terminated, is automatically terminated, a recovery of the subsystem data is implemented, and the job name is then deleted from the log. If the user does not want all four of the functions to be performed, then, as explained above, DBRC commands are used.

C. Software Operations Flow

The operations of the preferred software embodiment can be described with reference to a series of flowcharts. For the preferred embodiment, IBM mainframe program names will be referenced to completely and accurately disclose the flow operations. The program names, as hereafter shown in all-capital letters, will be readily recognized by individuals skilled in the art. Like programs in other systems may be alternatively used.

Figure 9:
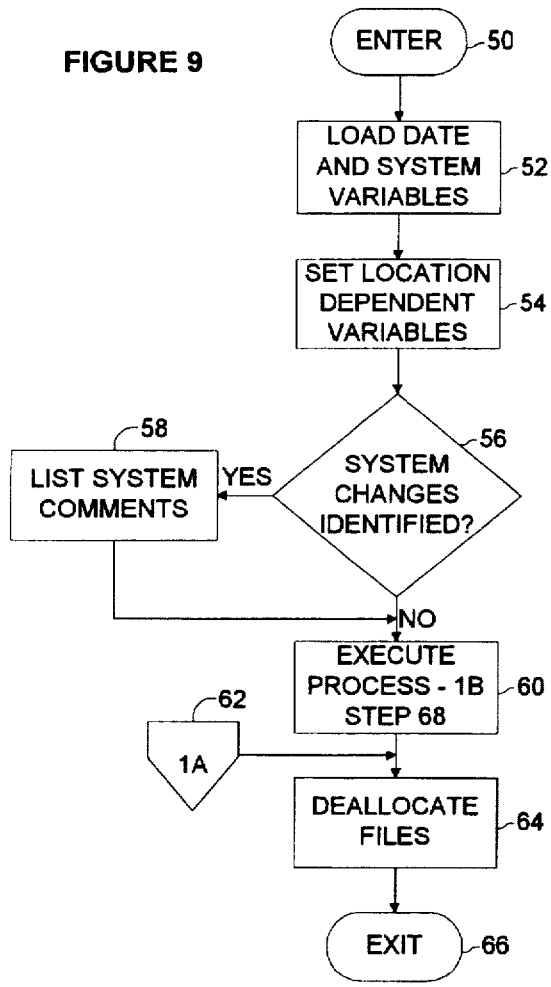
FIG. 9 is a flow diagram illustrating the system entry in accordance with one embodiment of the present invention.

As illustrated in FIG. 9, the program software enters the system 50 and immediately loads date and system variables 52, including mainframe time sharing option specific components, via the IBM DM100A01 program. Location dependent variables are set 54 based upon the execution program. If system changes are to be identified 56, system comments are listed 58, comprising up to fifteen comment lines on the monitor or other output device. If no system changes are identified 56, the process 60 of recovering the database data begins. At this point, the program proceeds to step 68 at FIG. 10 (labeled 1B). Note that when the program portion completes, it returns to the portion illustrated in FIG. 9 at step 62 (labeled 1A). At that point, the program files are deallocated 64 and the program exits 66.

Note that the initial step of each subroutine, subroutine part, or subroutine continuation is labeled with a consecutive alphanumeric value. The label is illustrated for purposes of clarity so that the reader may more easily follow the program flow. The labels will not be hereinafter referenced in the body of the description, and the labeled boxes themselves, although numbered for clarity, are not part of the actual program.

Figure 10:
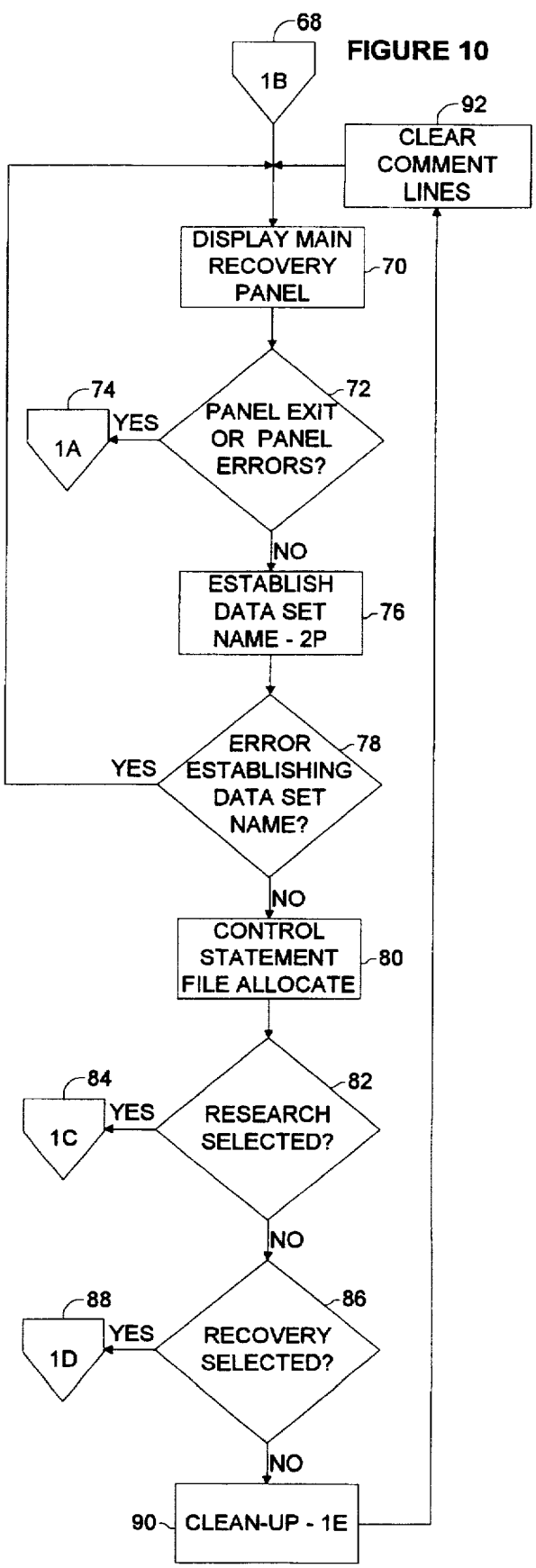
FIG. 10 is a flow diagram illustrating the main recovery process routine in accordance with one embodiment of the present invention.

At FIG. 10, the main recovery process is illustrated initially at step 68. The main recovery panel, as illustrated in FIG. 4, is displayed 70 to the user. Note that prior to each panel being displayed, system variables are set as well as the individual panel defaults. At step 72, the program determines if panel errors exist or if the user has elected to exit the panel. An exit, or end process, occurs if the user presses the "END KEY." If either situation occurs, the system returns to the routine from which it was called 74. In this case, it returns to step 62 illustrated in FIG. 9. For all panels, if any panel errors exist, an error message is set prior to the return.

Figure 11:
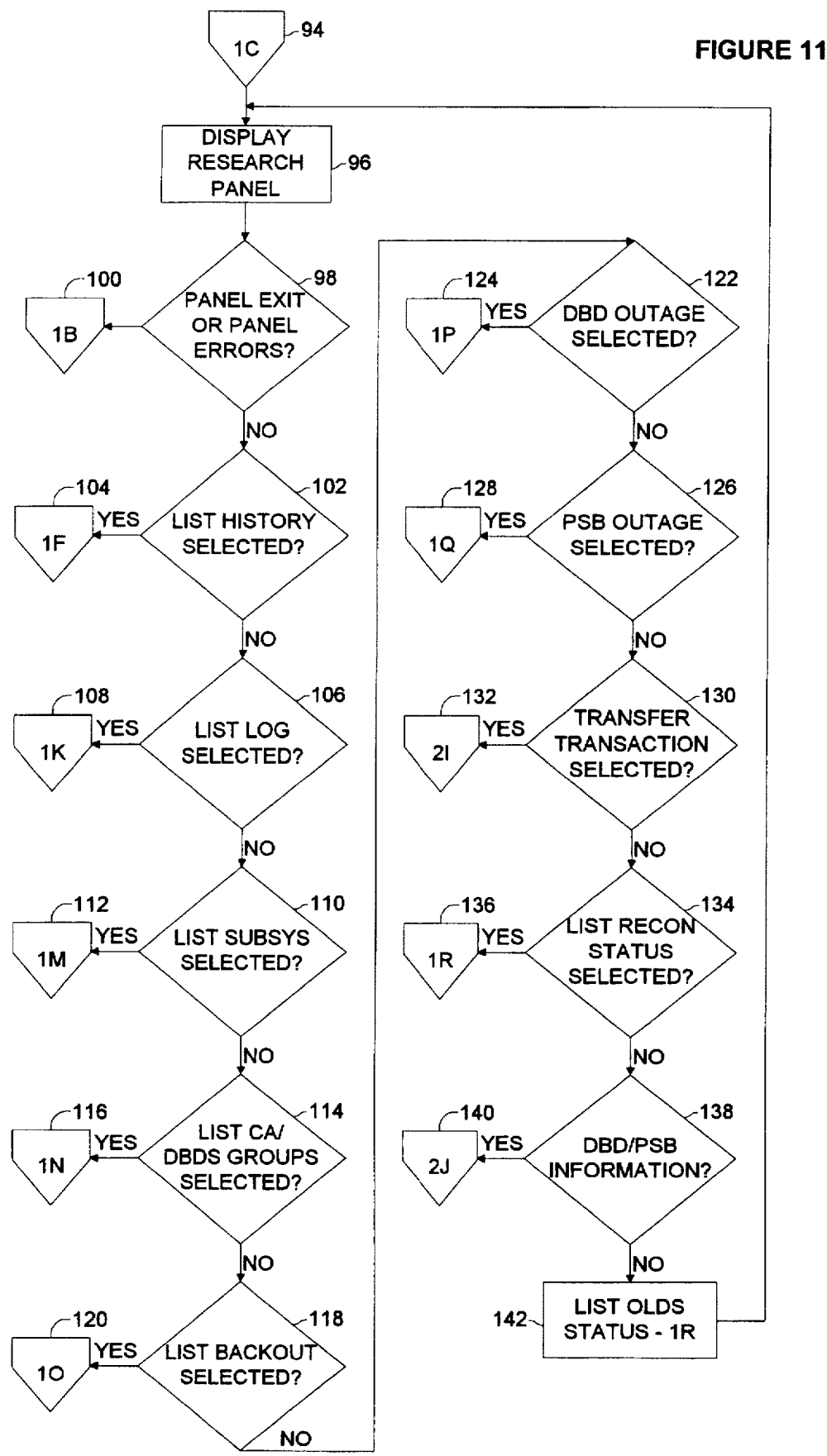
FIG. 11 is a flow diagram illustrating the research option in accordance with one embodiment of the present invention.
Figure 47:
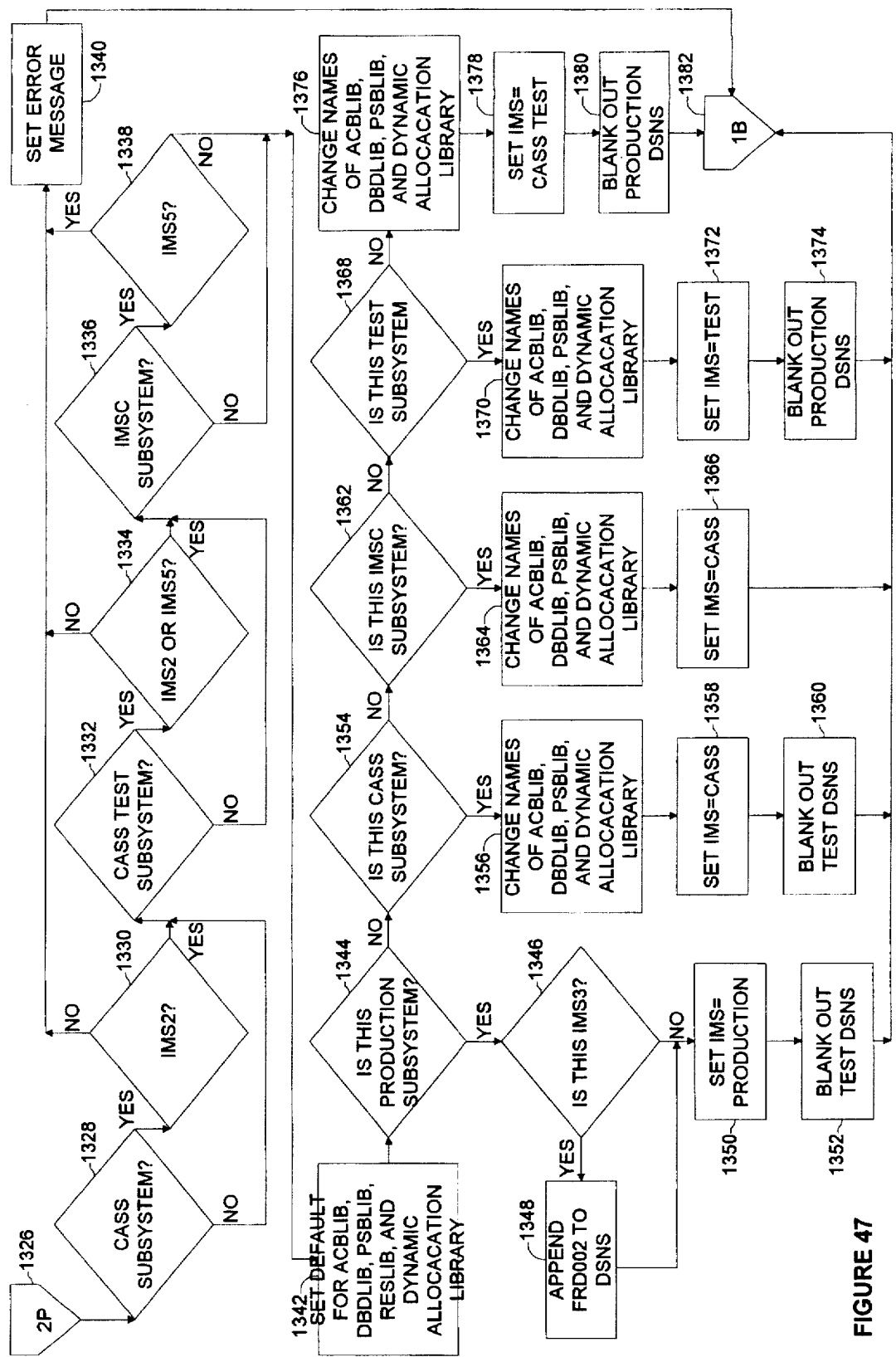
FIG. 47 is a flow diagram illustrating the fix DSN routine in accordance with one embodiment of the present invention.

If the answer to the query of step 72 is "no," the FIX DSN routine executes, as illustrated at step 1326 in FIG. 47, and the data set name is established 76. The FIX DSN routine returns upon completion and the system checks to determine if an error occurred while establishing the data set name 78. If the answer is "yes," there is a system jump back to the initial routine step 68. If the answer is "no," a control statement file is allocated 80. There is a determination of whether the user selected the Research option 82. If "yes," the program jumps to step 94 of FIG. 11 (step 84). If "no," it is determined if Recovery was selected 86. If selected, the system jumps to step 144 of FIG. 12 (step 88). If not selected, the Clean-up procedure, illustrated in FIG. 13 at step 172, is executed 90. Comment lines are cleared 92 and the routine returns to the beginning, at step 68.

Figure 21:
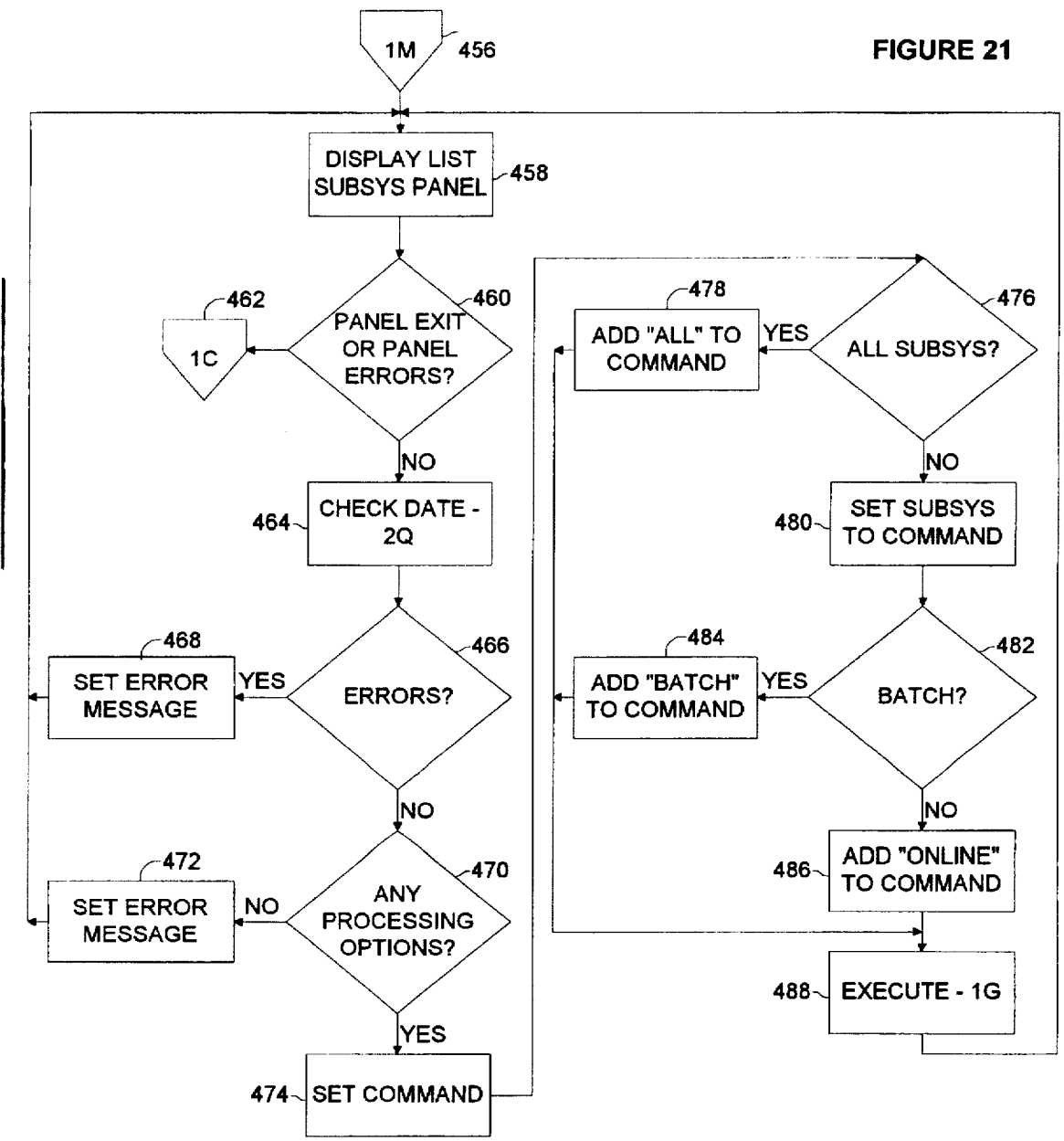
FIG. 21 is a flow diagram illustrating the list subsystem option in accordance with one embodiment of the present invention.
Figures 22, 23:
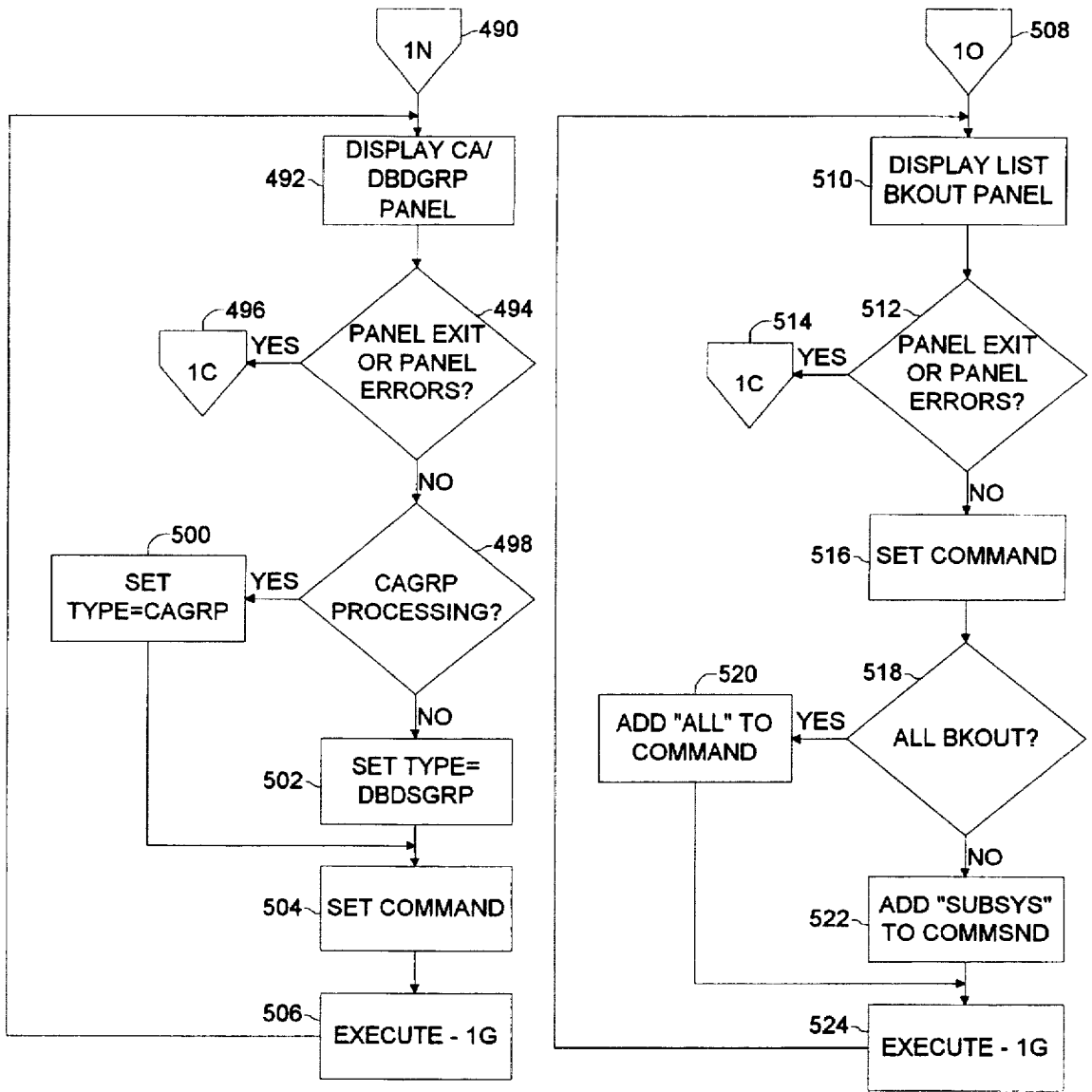
FIG. 22 is a flow diagram illustrating the list CAGRPs/DBDGRPs option in accordance with one embodiment of the present invention.
FIG. 23 is a flow diagram illustrating the list backout option in accordance with one embodiment of the present invention.

The Research routine is illustrated at step 94. Initially, the research panel is displayed 96. If there are panel errors or a panel exit is requested 98, the program jumps back to step 68 of FIG. 10 (step 100). If no errors exist and no exit was requested, the system determines if List History was selected 102. If so, the List History routine is executed at step 204, FIG. 14 (step 104). If not selected, the system determines if List Log was selected 106. If it was selected, the List Log routine is executed at step 372, FIG. 19 (step 108). If not, the system determines if List Subsys was selected 110. If selected, the List Subsys routine, at step 456, FIG. 21, is executed 112. If List Subsys is not selected, next is a determination of List CA/DBDS Groups 114. If chosen, the List CA DBDS Groups routine at step 490, FIG. 22, is executed 116. If not chosen, there is a determination of whether the List Backout was selected 118. If selected, the List Backout routine at step 508, FIG. 23, is executed 120.

Figure 24:
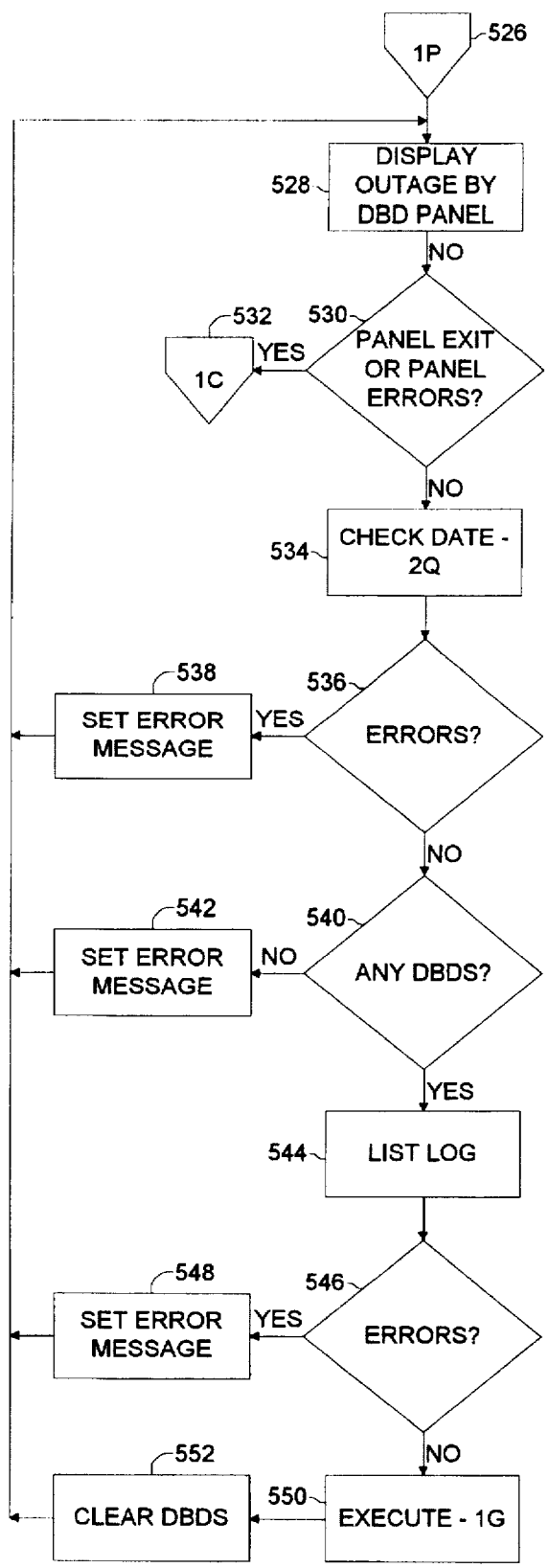
FIG. 24 is a flow diagram illustrating the outage by DBD option in accordance with one embodiment of the present invention.
Figure 25:
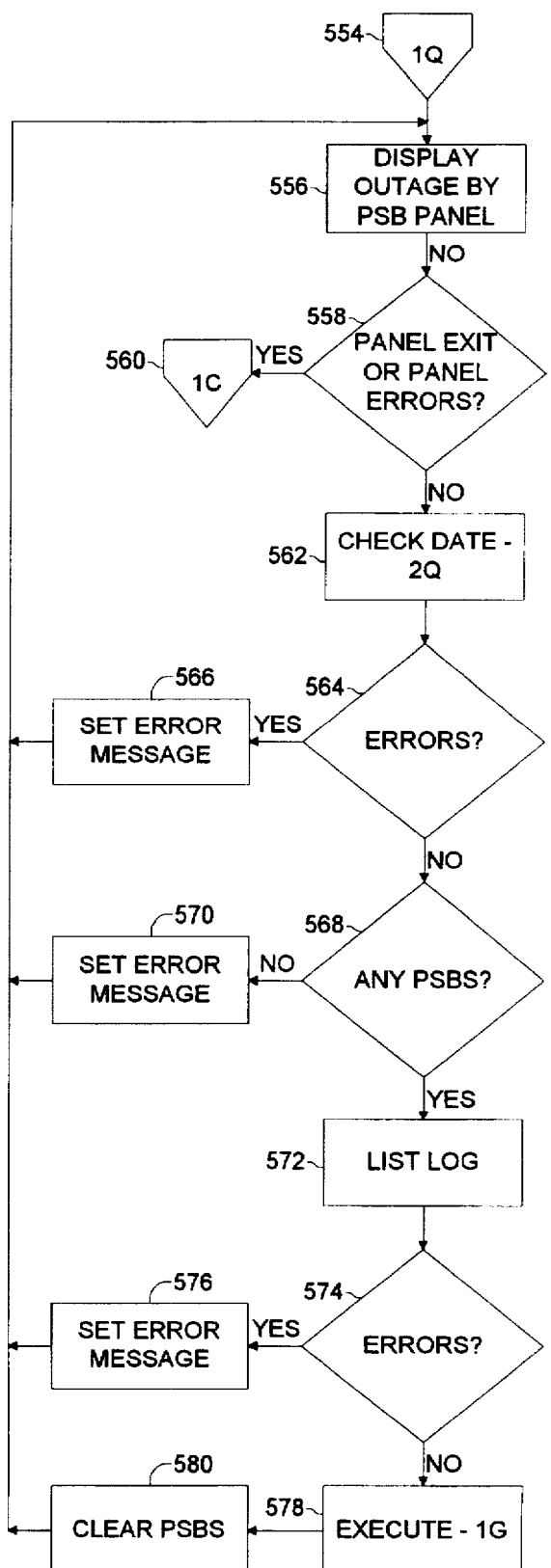
FIG. 25 is a flow diagram illustrating the outage by PSB option in accordance with one embodiment of the present invention.
Figure 40:
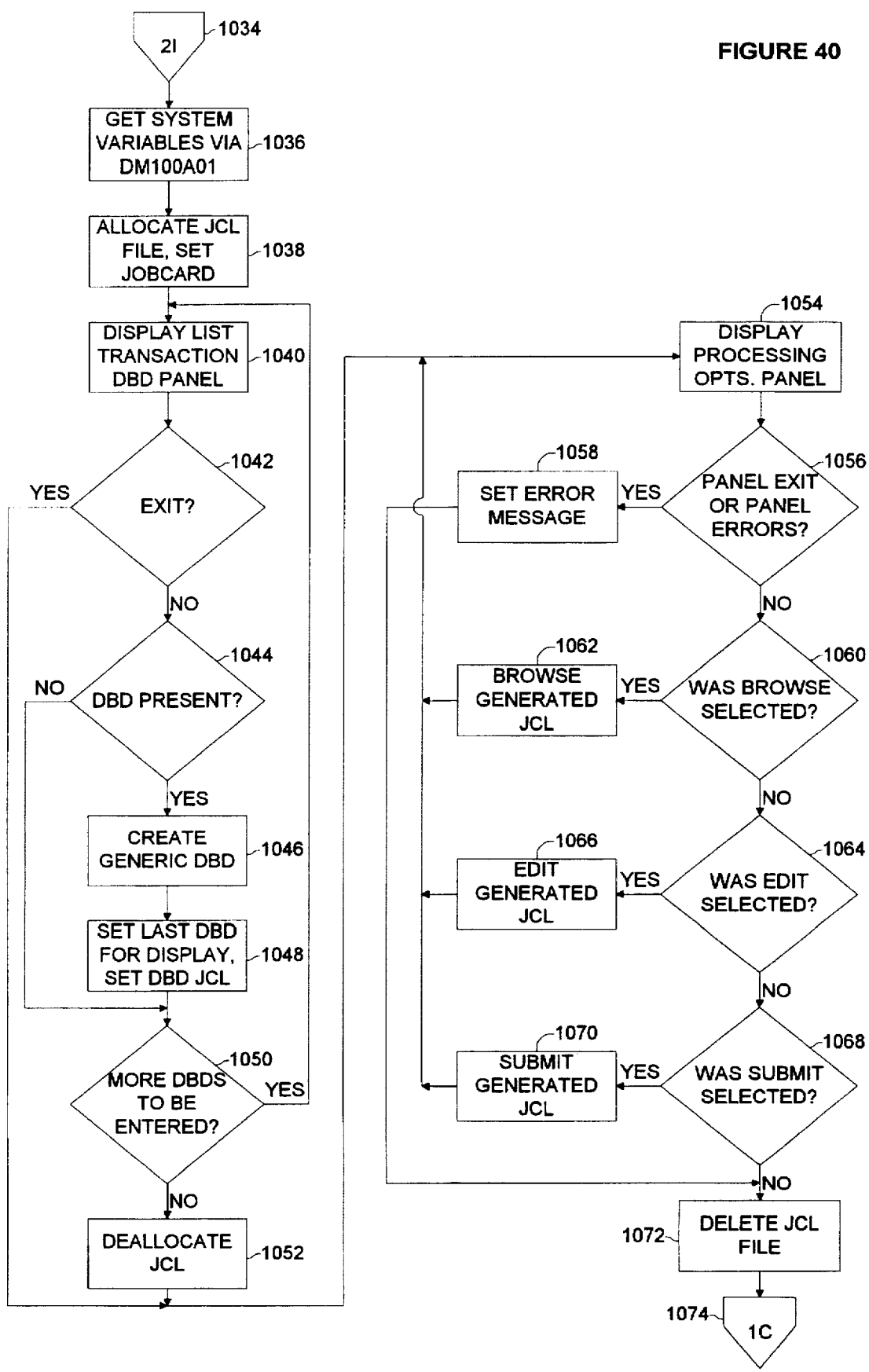
FIG. 40 is a flow diagram illustrating the transaction transfer reference option in accordance with one embodiment of the present invention.

If the answer to step 118 is "no," the system determines if DBD Outage was selected 122. If selected, the DBD Outage routine, at step 526 of FIG. 24, is executed 124. If not selected, the system inquires if PSB Outage was selected 126. If selected, the PSB Outage routine, at step 554 of FIG. 25, is executed 128. If not selected, the system determines if Transfer Transaction was selected 130. If selected, the Transfer Transaction routine, illustrated at step 1032 in FIG. 40, is executed 132. If not selected, the system questions if List Recon Status was chosen 134. If chosen, the List Recon Status routine, illustrated in FIG. 26, step 582, is executed 136. If the List Recon Status routine is not to be executed, the system queries whether DBD/PSB Information was chosen 138. If chosen, the DBD/PSB Information routine, shown in FIG. 41, step 1074, is executed 140. Otherwise, the List OLDS Status routine is executed 142. The List OLDS Status routine has the same flow as FIG. 26 and therefore shares its illustrated flow. After execution, the system returns to step 94, FIG. 11.

Figure 12:
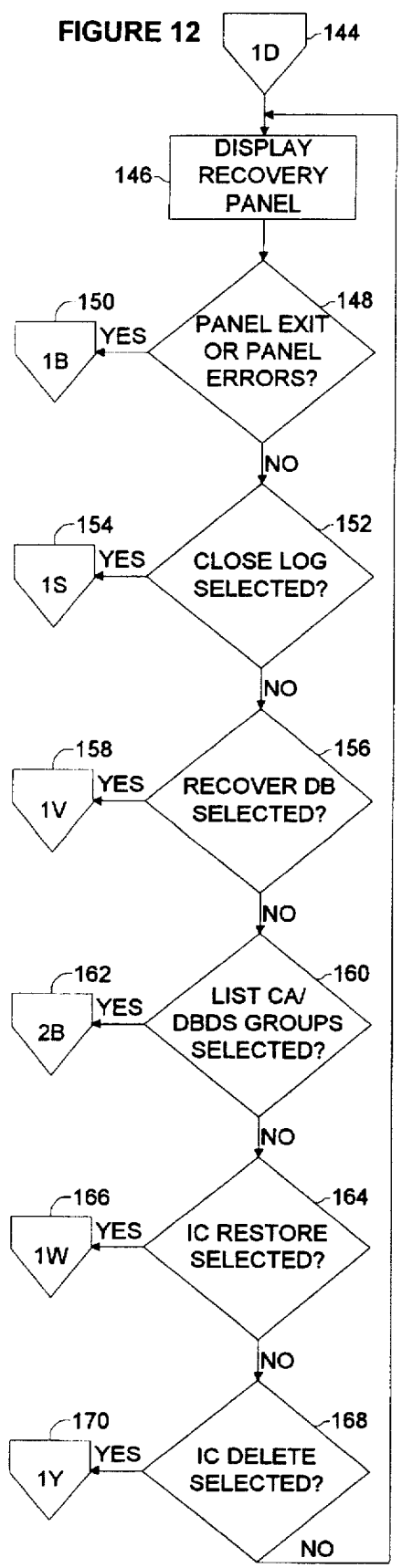
FIG. 12 is a flow diagram illustrating the recovery option in accordance with one embodiment of the present invention.
Figure 32:
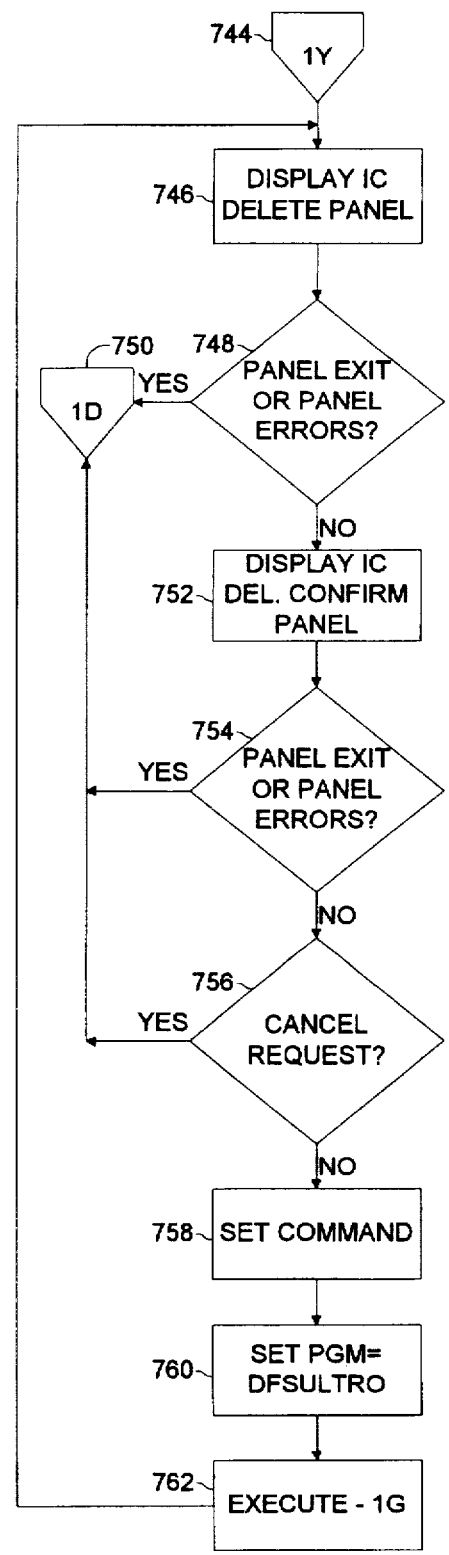
FIG. 32 is a flow diagram illustrating the IC delete option in accordance with one embodiment of the present invention.
Figure 35:
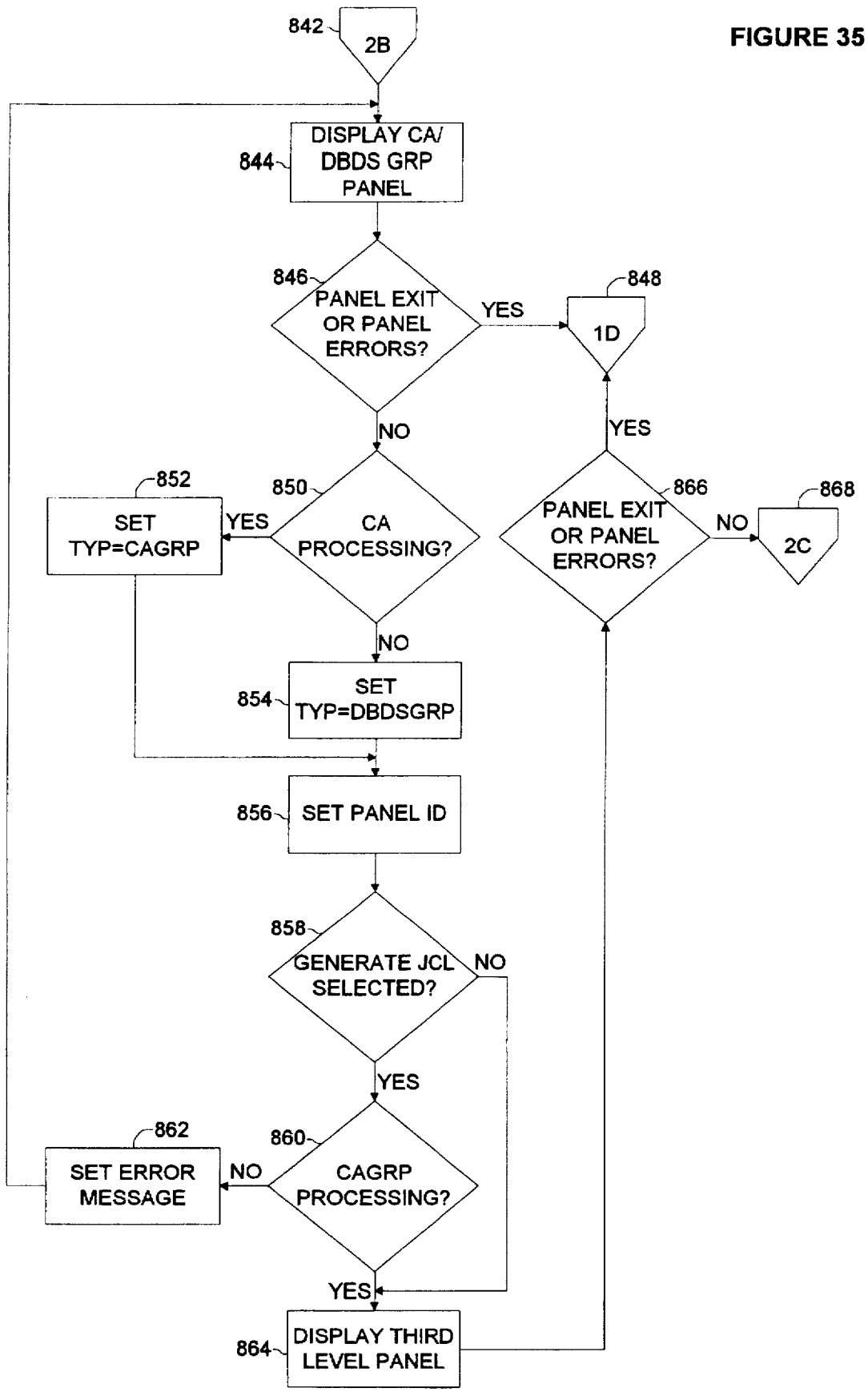
FIG. 35 is a flow diagram illustrating the CAGRP/DBDSGRP option in accordance with one embodiment of the present invention.

The Recovery routine is illustrated at step 144, FIG. 12, and it first displays a Recovery panel 146. If there are panel errors or a panel exit request 148, the program jumps back to step 68, FIG. 10. If no errors exist and no exit was requested, and the system determines a Close Log was selected 152, the routine moves to step 594 of FIG. 27 (step 150). If the Close Log was not selected, the system determines if Recover DB was selected 156. If it was selected, that routine is executed at step 678, FIG. 29 (step 158). If not, the system determines if List CA/DBDS Groups was selected 160. If selected, the CA/DBDS Groups routine, at step 842 of FIG. 35, is executed 162. If the IC Restore option was chosen 164, its routine, at step 716 of FIG. 30, is executed 166. If not chosen, there is a determination of whether the IC Delete was selected 168. If selected, the IC Delete routine, at step 744 of FIG. 32, is executed 170. If not selected, the system returns to step 144.

Figure 13:
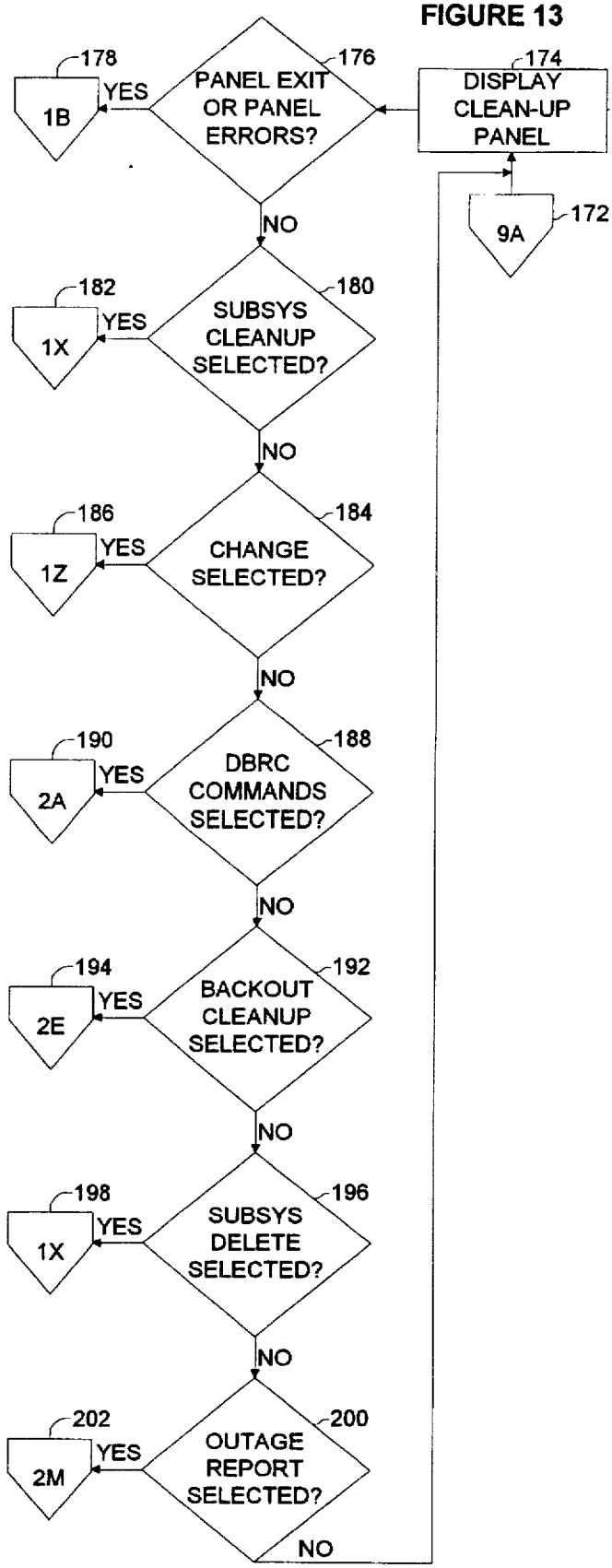
FIG. 13 is a flow diagram illustrating the clean-up option in accordance with one embodiment of the present invention.
Figure 31:
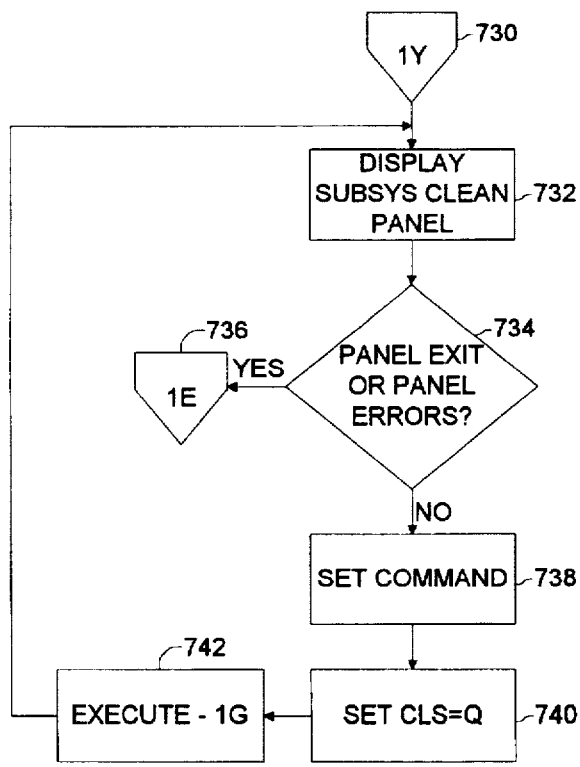
FIG. 31 is a flow diagram illustrating the subsystem clean-up option in accordance with one embodiment of the present invention.
Figure 37:
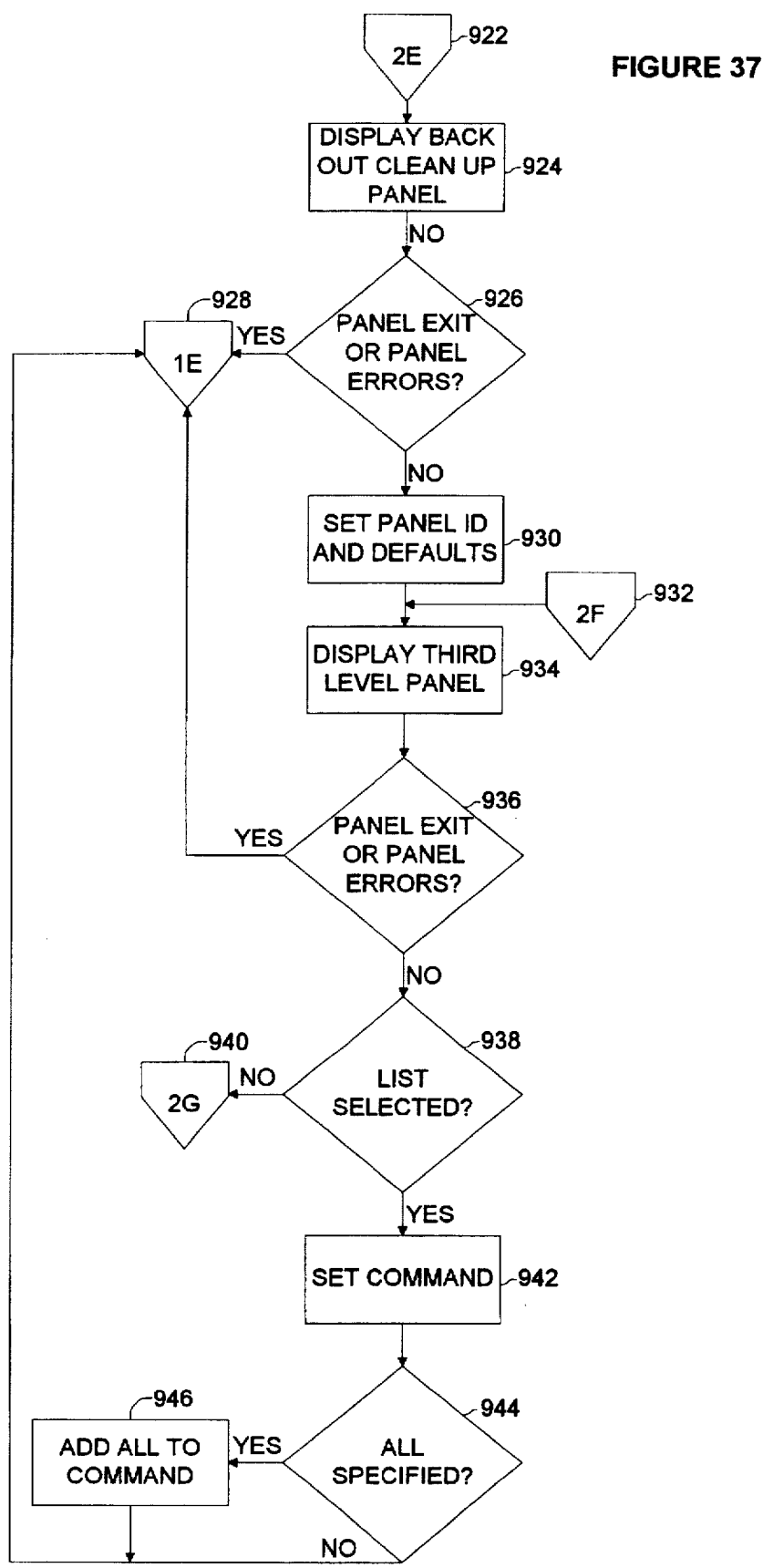
FIG. 37 is a flow diagram illustrating the backout clean-up option in accordance with one embodiment of the present invention.

The Clean-up routine enters at step 172 of FIG. 13 and displays a Clean-Up panel 174. If there are panel errors or a panel exit request 176, the program jumps back to step 68, FIG. 10. If no errors exist and no exit was requested, the system determines if Subsys Clean-Up was selected 180. If so, that routine is executed at step 730, FIG. 31 (step 180). If not selected, the system determines if Change was selected 184. If it was selected, the Change routine is executed at step 762, FIG. 33 (step 186). If unselected, but the DBRC Commands was selected 188, the Commands routine, at step 804 of FIG. 34, is executed 190. If not selected, next is a determination of Backout Clean-Up 192. If chosen, the routine at step 922, FIG. 37, is executed 194. If not chosen, there is a determination of whether the Subsys Delete was selected 196. If selected, the Subsys Delete routine at step 730, FIG. 31 is executed 198. Note that the Subsys Delete option is the same as Subsys Clean-up, for this particular embodiment, but allows expandability. If Subsys Delete was not chosen, the system determines if Outage Report was selected 200. If the answer is "yes," the Outage Report routine is executed 202, as illustrated at step 1200 of FIG. 44. If not selected, the system returns to step 172.

Figure 14:
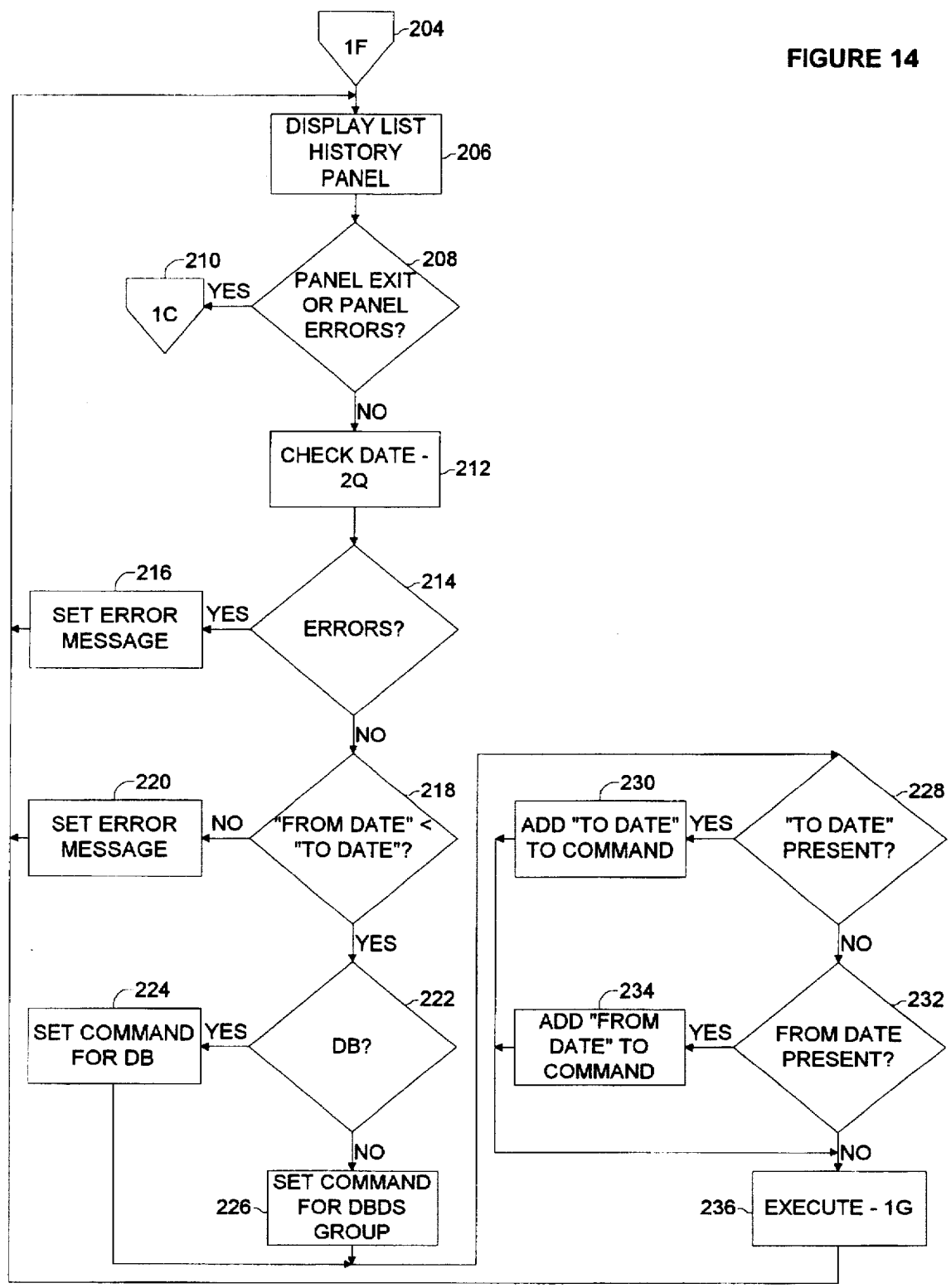
FIG. 14 is a flow diagram illustrating the list history option in accordance with one embodiment of the present invention.

The List History routine, at step 204 on FIG. 14, first displays the List History panel 206. It then questions whether panel errors or a panel exit request exist 208. If either exist, the routine exits back to step 94 at FIG. 11. Otherwise the system executes the Check Date routine at step 1384, FIG. 48 (step 212). After the system returns back to the List History routine, it checks for errors in the data 214. If errors are detected, an error message is set 216, and the system returns to step 204. If no errors exist, the dates which were entered are checked to determine if the date given for the start of the search ("FROM DATE") is lower than the date given for the end of the search ("TO DATE") 218. Date refers to the estimated time stamp of the data. Therefore, this query determines if a valid estimated time stamp was entered.

If the answer to step 218 is "no," an error message is set 220, and the system returns to step 204. If the answer is "yes," the system determines if the database option was selected 222. If it was selected, the command option for the JCL is set for DBD 224. If not selected, the option is set for DBDS Group 226. The next query, after either step 224 or step 226, is whether the end date ("TO DATE") is present 228. If so, the JCL for the ending date is added to the commands list 230. Otherwise, it is determined if the starting date ("FROM DATE") is present 232. If present, the JCL for the starting date locator is added to command 234. The Job Executions executable process at step 238, FIG. 15, is performed 236, and the routine returns to step 204.

Figure 15:
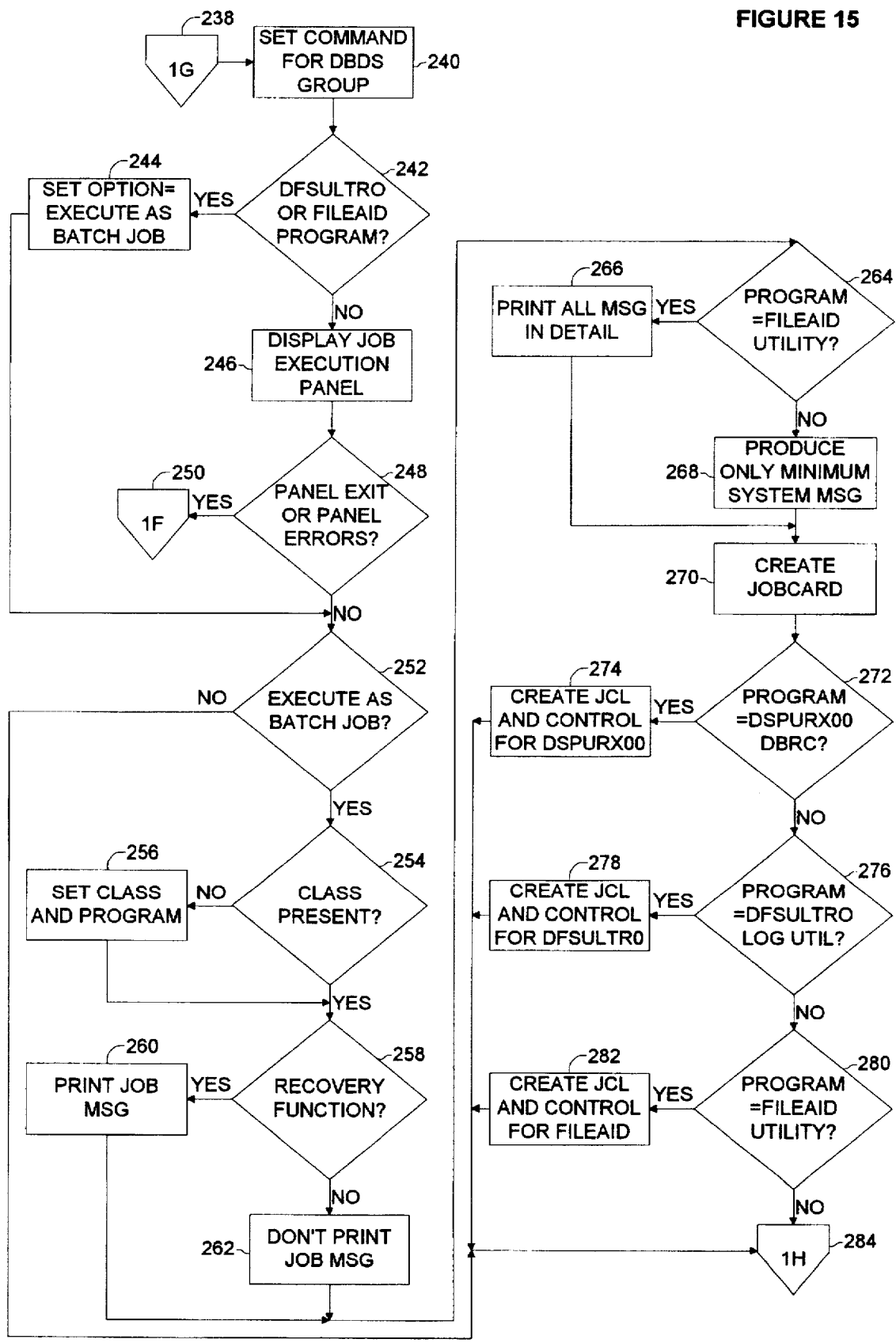
FIG. 15 is a flow diagram illustrating the job execution routine in accordance with one embodiment of the present invention.

The Job Executions executable process in FIG. 15 enters at step 238 and initializes by setting the commands for the DBDS Group 240. The system queries whether either of the IBM programs DFSULTR0 or FILEAID are to be used 242. If either is used, command options are set to execute as a batch job 244, and the system jumps to step 252. If the answer is "no," the job execution panel, as illustrated in FIG. 5, is displayed 246. Step 248 determines if there are panel errors or an exit request. If either exist, the system returns to step 204, as illustrated in FIG. 15 (step 250). If neither exist, the system then determines if execution is to be in batch mode 252. If a batch job is not chosen, the system routine continues at step 286 of FIG. 16 (step 284). If batch is chosen. the system determines if a class which is to be printed is present 254. If no class is present, the class and program are set 256, and step 258 is executed. If the class is present. the program moves to step 258 where the system determines if the recovery function was chosen. If the recovery function was chosen. print job messages are to be output 260. If not chosen, the system is set to not print job messages 262. It is then determined if the FILEAID utility is used 264. If used, the system is set to print all messages in detail 266. Otherwise, the system will produce only minimum system messages 268. A jobcard is created 270. If the program selected is the DSPURX00 for DBRC 272. DFSULTR0 for the Log Utility 276, or the FILEAID utility 280, then JCL and control are created for the respective DSPURX00 274, DFSULTR0 278, or FILEAID 282. If none are selected, or if one is selected and the JCL and control are created, the system jumps to the routine continuation at step 286 of FIG. 16 (step 284).

Figure 16:
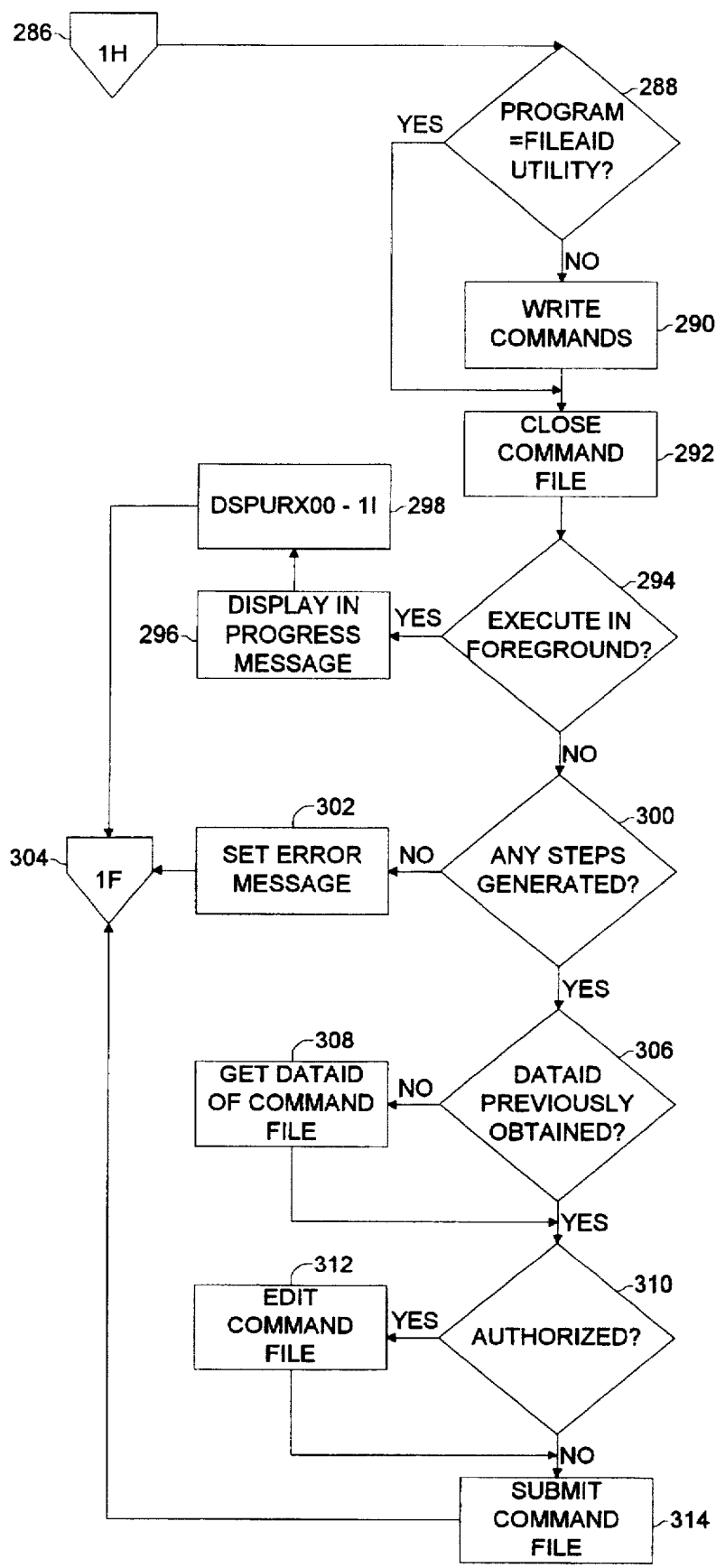
FIG. 16 is a continuation of the flow diagram of FIG. 15.

Step 286 of FIG. 16 is the continuation of the Job Executions routine of FIG. 15. Step 288 determines if the prograin is the FILEAID utility. If the answer is "yes," the system moves to step 292. If the answer is "no," the system writes the commands 290. At step 292, the command file is closed.

Figures 17, 18:
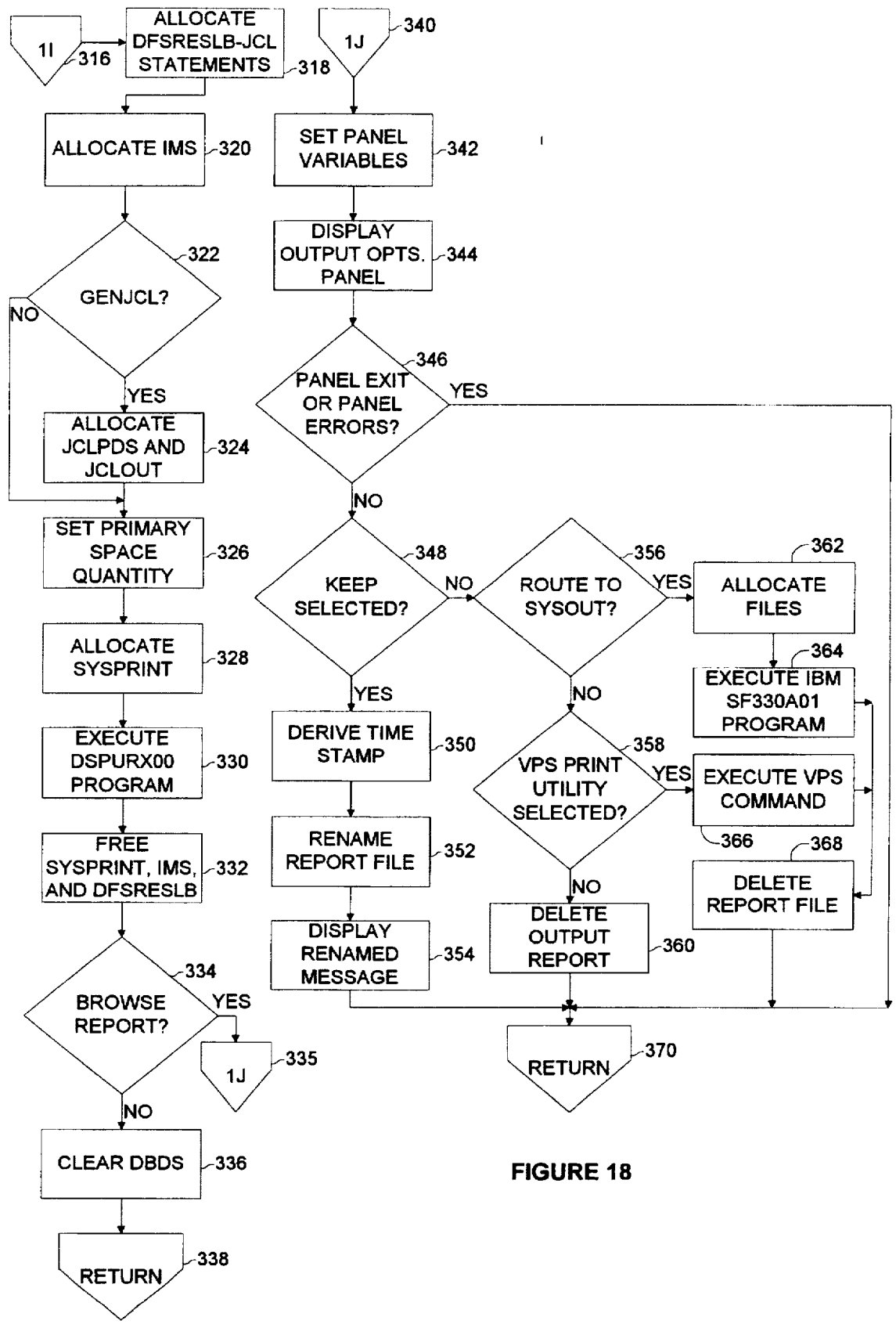
FIG. 17 is a flow diagram illustrating the DSPURX00 routine in accordance with one embodiment of the present invention.
FIG. 18 is a flow diagram illustrating the browse routine in accordance with one embodiment of the present invention.

If the execution is to be in the foreground 294, an execution in progress message is displayed 296, and the DSPURX00 routine, at step 316 of FIG. 17, executes, initiating the IBM DSPURX00 program 298. After the DSPURX00 routine executes, the system returns to the calling routine and exits to step 204 of FIG. 14 (step 304).

If execution is not to be in the foreground (step 294 of FIG. 16), then the system determines if any JCL steps are to be generated 300. If no steps are to be generated, an error message is set 302. and the system returns to step 204 of FIG. 14 (step 304). If steps are to be generated 300, and no DataID was previously obtained 306, the DataID of the command file is retrieved 308 and routine passes to step 3.10. If the DataID was already obtained 306, step 310 determines if there is authorization for a command file edit. If authorized 310, the command file is edited 312 and the command file is submitted for execution 314. If not authorized 310, the command file is not edited, but is still submitted for execution 314. Finally, the system returns to step 204 of FIG. 14 (step 304).

FIG. 17, which enters at step 316, illustrates the DSPURX00 subroutine. First, the DFSRESLB is allocated for JCL statements 318. Then IMS is allocated 320. If general JCL is to be used 322, then JCLPDS and JCLOUT (both IBM functions) are allocated 324. Otherwise, step 324 is skipped. Next, the quantity for primary space allocation is set 326. SYSPRINT is allocated 328 and the IBM DSPURX00 utility is executed 330. Following execution, the Sysprint, IMS, and DFSRESLB are de-allocated 332. If the Browse utility is to be used, the system proceeds to step 340 of FIG. 18 (step 335). If the Browse utility is not used, the DBDS is cleared 336, and the system returns to the calling subroutine 338.

The Browse JCL routine is illustrated by FIG. 18, at step 340. This routine allows the user to Browse the output report. The Browse panel variables are set 342, and the Foreground Output Options panel, as illustrated in FIG. 6, for Browse JCL Output is displayed 344. If the panel has errors or the end process key was selected 346, the system returns to the calling subroutine 370. If not, the routine determines if the panel's Keep option was selected 348. If selected, the time stamp is derived 350. The output report file is renamed 352, and the renamed report file message is displayed 354. At this point, the system returns to the calling subroutine 370.

If the Keep option was not selected, but Route to Sysout was chosen 356, the files are allocated 362 so that the IBM program SF330A01 can be executed 364. The report file is deleted after execution 368, and the system returns to the calling subroutine 370. If Route to Sysout was not chosen, it is determined if the VPS Print Utility was selected 358. If not selected, the output report is deleted 360 and the system returns to the calling subroutine 370. Otherwise, the VPS command is executed 366 before the report file is deleted 368, and the system returns to the calling subroutine 370.

Figure 19:
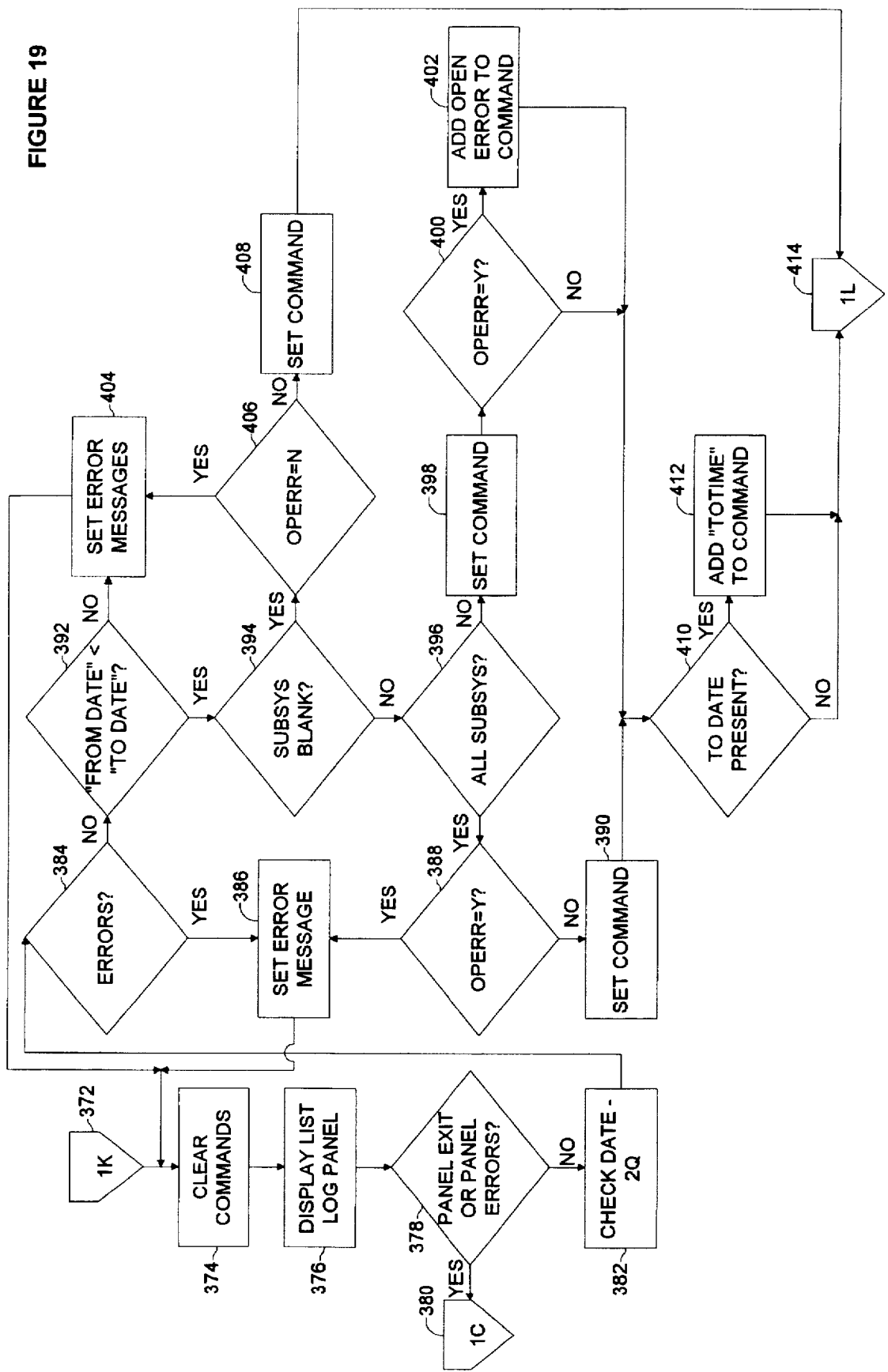
FIG. 19 is a flow diagram illustrating the list log option in accordance with one embodiment of the present invention.

FIG. 19 illustrates the List Log routine which enters as step 372. First, the commands are cleared 374. Then the List Log panel is displayed 376. If the panel has errors or the end process key was selected 378, the system returns to step 94 of FIG. 11 (step 380). If not, the date is checked 382 by executing the Check Date routine at step 1380 of FIG. 48. Upon the return to the List Log routine, the system checks for errors 384. If errors exist, an error message is set 386, and the system returns to step 372. If no errors exist, the system determines if the start date of the estimated time stamp is less than the end date 392. If the answer is "no," an error message is set 404, and the system returns to step 372. If the answer is "yes," step 394 queries whether the subsystem identification was left blank. If left blank, it is determined whether the open/error selection was set for "no" 406. If it was set for "no," an error message is displayed 404, and the routine returns to step 372. If "no" was not selected, the command is set 408, and the routine proceeds to step 416 of FIG. 20 (step 414).

If the answer to step 394 was "no," the system determines if all subsystems were selected 396. If all were selected, and the open/error option was "yes" 388, then an error message is set 386 and the system returns to step 372. If all subsystems were selected and the open/error option was not "yes" 388, then the command is set 390, the process moves to step 410.

If all subsystems were not selected 396, the command is set 398. If the open/error option was set to "yes" 400, open/error is added to the command 402, and step 410 is executed. If not, step 410 is executed without any change in the command. Step 410 asks if the start date is present. If it is present, the start date of the time stamp is added to the command 412, and the system proceeds to step 416 of FIG. 20 (step 414). If the start date is not present, no change is made in the command JCL, but the system moves to step 416 of FIG. 20 (step 414).

Figure 20:
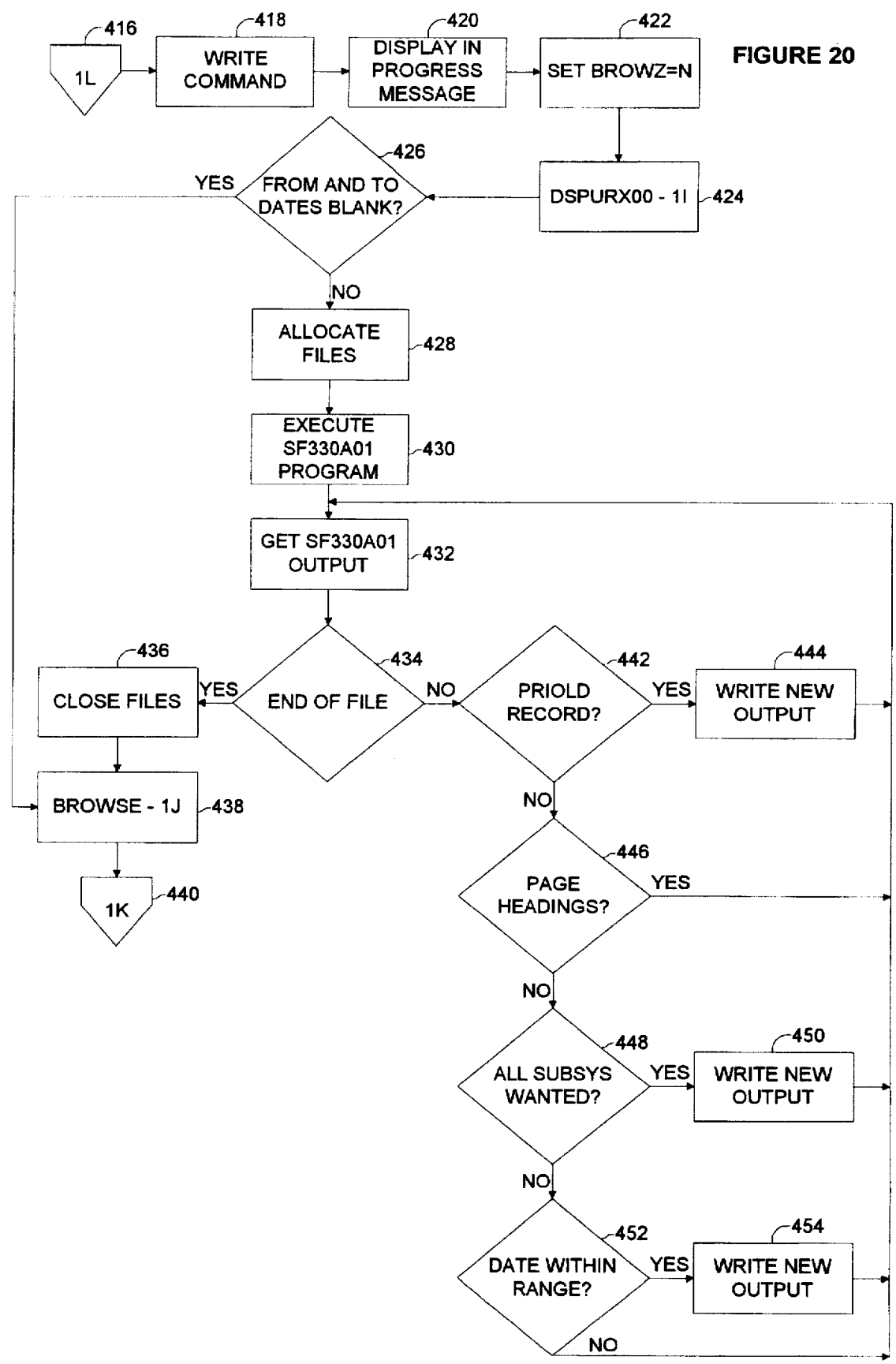
FIG. 20 is a continuation of the flow diagram of FIG. 19.

Step 416 of FIG. 20 is the continuation of the List Log routine of FIG. 19. The command JCL is written 418, and an in progress message is displayed 420. The "BROWZ" command is set to "N" 422, and the DSPURX00 routine at FIG. 17, step 316, is executed 424. Upon return, the system determines if the dates were left blank 426. Blank dates causes step 438 to execute the Browse subroutine of step 340, FIG. 18 (step 438). The system returns to step 372 of FIG. 19(step 440).

If the dates are not blank 426, files are allocated to space 428, the SF330A01 program executes 430, and the output obtained 432. If an end of file exists 434, the files are closed 436, and the Browse routine executes at step 340, FIG. 18 (step 438). Otherwise, step 442 determines if the primary old record was selected 442, if all subsystems are to be used 448, and if the date is within range 452. If any question is answered affirmatively, the new output is written at steps 444, 450, and 454 respectively, and the system returns to step 432. If the answer to all is "no," the system determines if page headings were selected 446. If page headings were selected 446, the system proceeds to step 448. If not, the routine returns to step 432.

FIG. 21 at step 456 demonstrates the entry of the List Subsys routine. As with the other routines, the system first displays the panel for List Subsys 458. If the panel has errors or the end process key was selected 460, the system returns to step 94 of FIG. 11 (step 462). If not, the Check Date routine, illustrated in FIG. 48 at step 1384, is executed 464. Upon return from the Check Date routine, if errors exist 466, an error message is set 468, and the routine returns to step 456. If there are no errors 466, the system determines if processing options have been selected 470. An absence of selected options causes an error message to be set 472 and a return to step 456. If options were selected, the command JCL is set for the options 474. If all the subsystems were chosen 476, "all" is added to the command 478, and the system skips to step 488. If all subsystems were not chosen 476, the chosen subsystem is set to the command 480. If batch mode is selected 482, "Batch" is added to the command 484. Otherwise, "Online" is added to the command 486. In step 488, the Job Executions routine, illustrated on FIG. 15 at step 238, is executed. Upon return from the executed Job Executions routine, the system moves to step 456.

FIG. 22 illustrates the routine for List CAGRPs/DBDGRPs, where the routine enters as step 490. The system first displays the panel for the List CAGRPs/DBDGRPs 492. If the panel has errors or the end process key was selected 494, the system returns to step 94 of FIG. 11 (step 496). If not, it is determined if CAGRP processing will occur 498. If CAGRP processing was chosen, set the type equal to CAGRP 500 and jump to step 504. If the CAGRP was not chosen, set the type to DBDSGRP 502. At step 504, the command is set. Next, the Job Executions routine at step 238 of FIG. 15 is executed 506. Finally, the system loops back to step 490.

FIG. 23 illustrates the List Backout routine. The routine enters at step 508, and displays the panel to the user 510. If the panel has errors or the end process key was selected 512, the system returns to step 94 of FIG. 11 (step 514). If not, the command is set 516. If all Backout blocks are to be used 518, then "ALL" is added to the command 520. Otherwise, "SUBSYS" is added to the command 522. Next, the Job Executions routine, at step 238 of FIG. 15, is executed 524, and the system returns to step 508.

If the Outage by DBD Analysis option was selected, the routine enters as step 526 of FIG. 24, whereupon the panel is displayed to the user 528. If the panel has errors or the end process key was selected 530, the system returns to the step 94 of FIG. 11 (step 532). If not, the Check Date routine of FIG. 48, step 1384, is executed 534. If errors exist in the date 536, an error message is set 538, and the routine returns to step 526. If no errors exist, but no DBDS are selected 540, then an error message is set 542, and the routine returns to step 526. If any DBDS blocks were selected 540, and there were no errors with the date 536, then the log is listed 544. If errors exist with the log 546, an error message is set 548, and the routine returns to step 526. If no errors exist, the Job Executions routine at step 238 of FIG. 15 is executed 550, the DBDS are cleared 552, and the system returns to step 526.

The Outage by PSB Analysis routine is illustrated at step 554 of FIG. 25. Initially, the routine panel is displayed 556. If the panel has errors or the end process key was selected 558, the system returns to step 94, FIG. 11 (step 560). If not, the date is checked 562. If errors exist in the date 564, and error message is set 566, and the routine returns to step 554. If no errors exist, but no PSBS are selected 568, then an error message is set 570, and the routine returns to step 554. If any PSBS blocks were selected 568, and there were no errors with the date 564, then the log is listed 572. If errors exist with the log 574, an error message is set 576, and the routine returns to step 554. If no errors exist, the Job Executions routine at step 238, FIG. 15, is executed 578, the PSBS are cleared 580, and the system returns to step 554.

FIG. 26, at step 582, represents the flow of both the List Recon Status routine and the List Olds Status Routine. The same instructions are used for both. For each, first, the command is set 584, and an "In Progress" message is displayed 586. Then, the "BROWZ" is set to "Y" 588, and DSPURX00 at step 316 of FIG. 17 is executed 590. Finally, the system returns to the calling routine 592.

The Close Log routine is demonstrated at FIG. 27, represented at step 594. The panel is displayed to the user 596. If the panel has errors or the end process key was selected 598, the system moves to step 144 of FIG. 12 (step 616). If not, the date is checked 600. If errors exist in the date 602, an error message is set 604, and the routine returns to step 594. If no errors exist, and "Notify" was not selected 606, the routine moves to step 638 of FIG. 28 (step 608). Otherwise if "Notify" was selected 606, the "Close Log" panel defaults are set 610, and that panel is displayed 612. If the panel has errors or the end process key was selected 614, the system moves to step 144 of FIG. 12 (step 616). If not, the command is set 618. If the primary log was selected for use 620, "PRILOG" is added to the command 622, and the routine jumps to step 626. Otherwise, "SECLOG," representing the secondary log, is added to the command 624. At step 626, the subsystem and times are added to the command. If both the primary and secondary logs are to be used 628, another command is created for "SECLOG" with the subsystem and times 630, and the routine proceeds to step 634. Otherwise, the routine merely proceeds to step 634 which executes the Job Executions routine at step 238 of FIG. 15. Finally, the routine returns to step 594. Note that step 632 represents the continuation of the routine from step 676 of FIG. 28. Step 632 enters just prior to the execution of the Job Executions option of step 634.

After the entry point of the Close Log DFSULTR0 routine of FIG. 28 at step 638, the panel is displayed 640. If the end process key was selected 642, the system determines if the library definition has been specified 644. If specified, the tables are deallocated 646, and the system jumps to step 144 of FIG. 12 (step 648). If no library definition is specified, the system jumps to step 144 of FIG. 12 (step 648) without deallocating the tables.

If the end process key was not selected 642, the log is retrieved 650. If errors exist in the log 652, the system returns to step 144 of FIG. 12 (step 648). If there are no errors in the log, the tables are allocated 654, wherein the system temporarily executes the "ALLOC TABLES" routine at step 1500 of FIG. 52. After the tables are allocated 654, if errors exist in the tables 656, the system returns to step 144 of FIG. 12 (step 648). Otherwise, the tables are built 658 in a routine illustrated at FIG. 53, step 1524. If errors exist in the tables 660, the system exits to step 144 of FIG. 12 (step 648). If there are no errors in the tables, they are displayed 662.

Figures 55, 56:
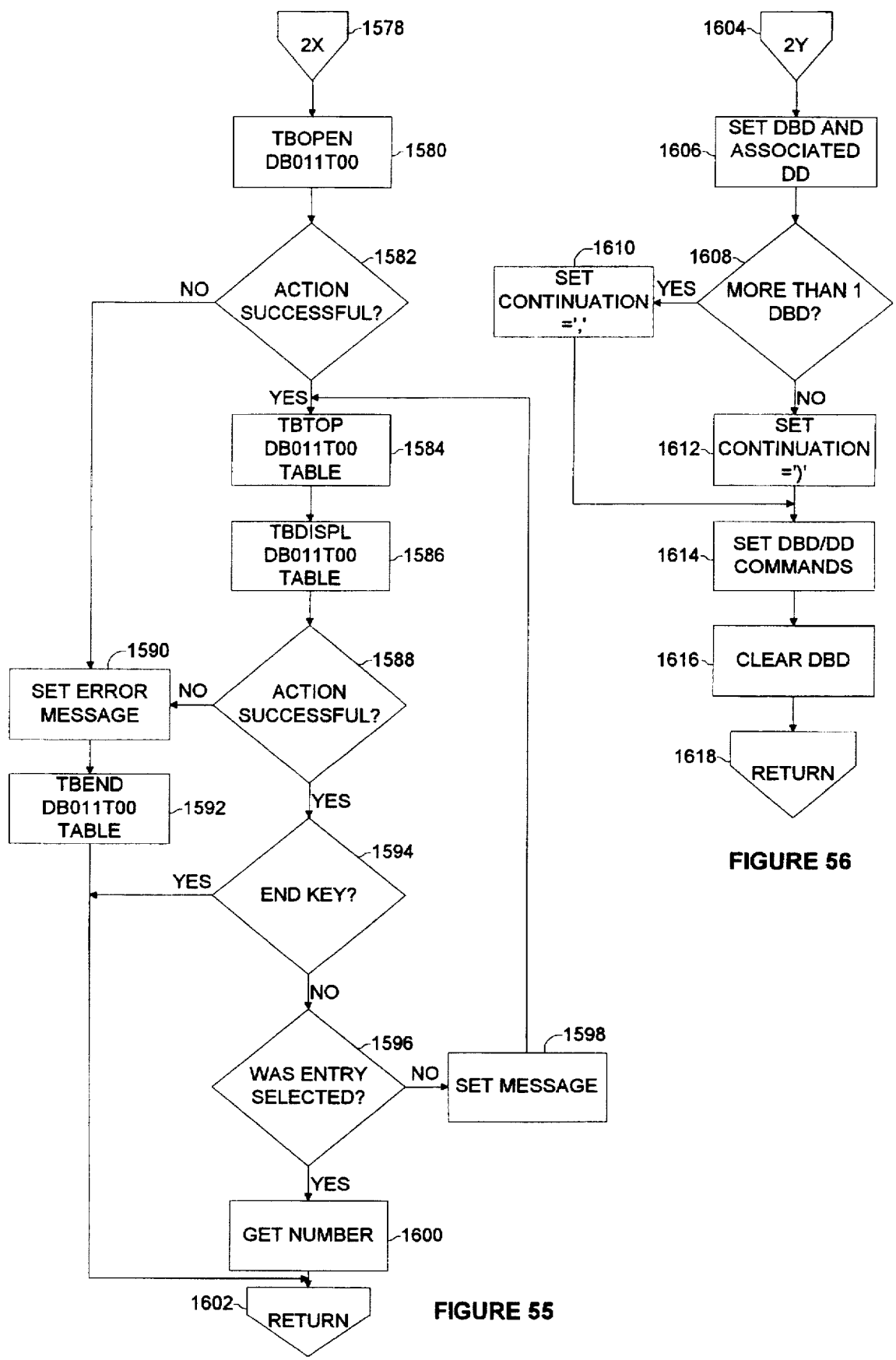
FIG. 55 is a flow diagram illustrating the display routine in accordance with one embodiment of the present invention.
FIG. 56 is a flow diagram illustrating the member retrieval routine in accordance with one embodiment of the present invention.

For the display, the routine executes the Display subroutine exhibited at FIG. 55, step 1578. If the display has errors 664, or no entries were selected at the display 666, the routine exits to step 144 of FIG. 12 (step 648). Otherwise, the PRILOG DSN and times are set 668. If the secondary log is chosen 670, the SECLOG DSN and times are set 672, and the command is set 674. In the alternative, if the SECLOG was not chosen, only the command is set 674. The routine then moves back to step 632 of FIG. 27 (step 676).

Figure 29:
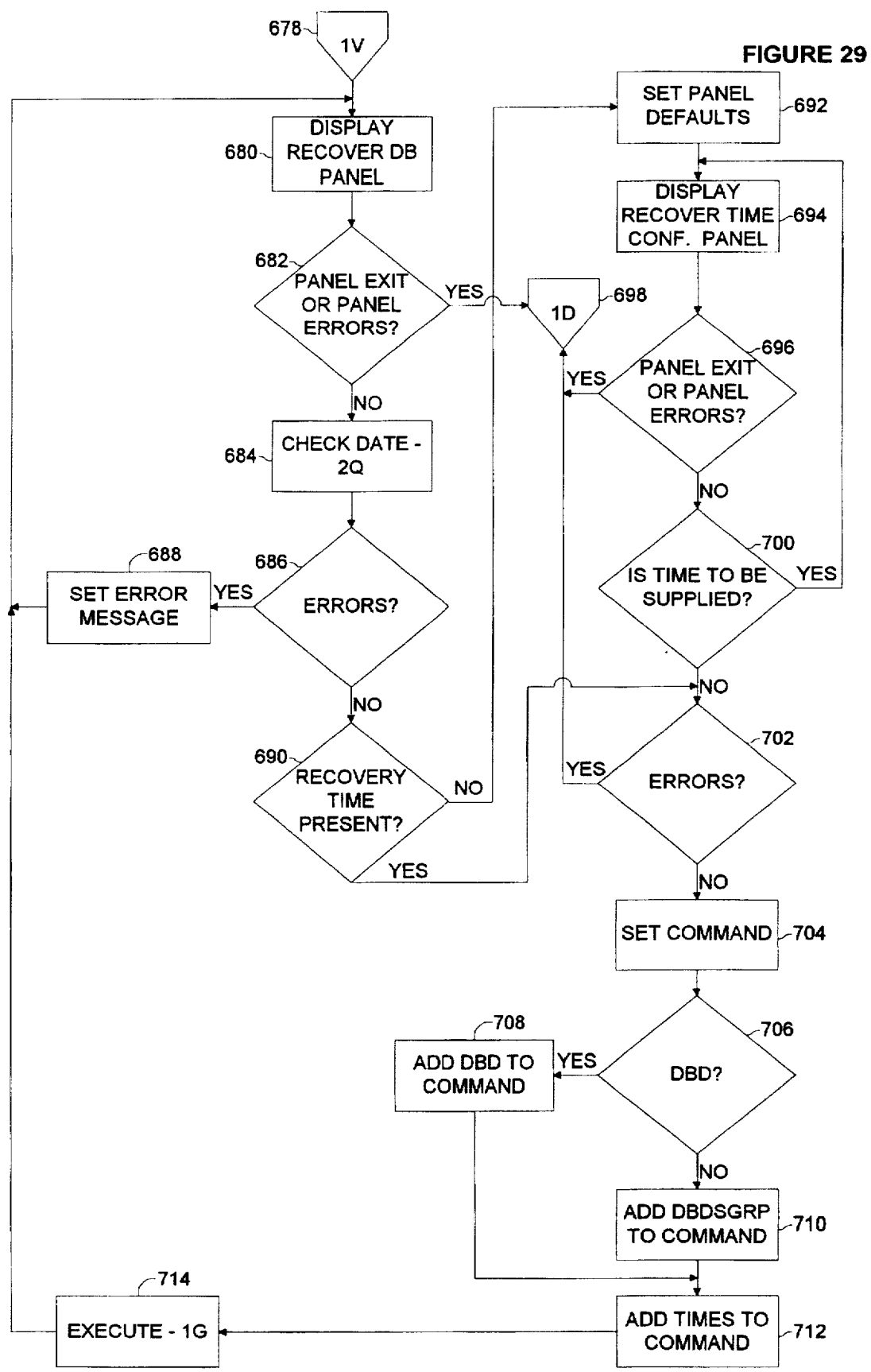
FIG. 29 is a flow diagram illustrating the recover database option in accordance with one embodiment of the present invention.
Figure 30:
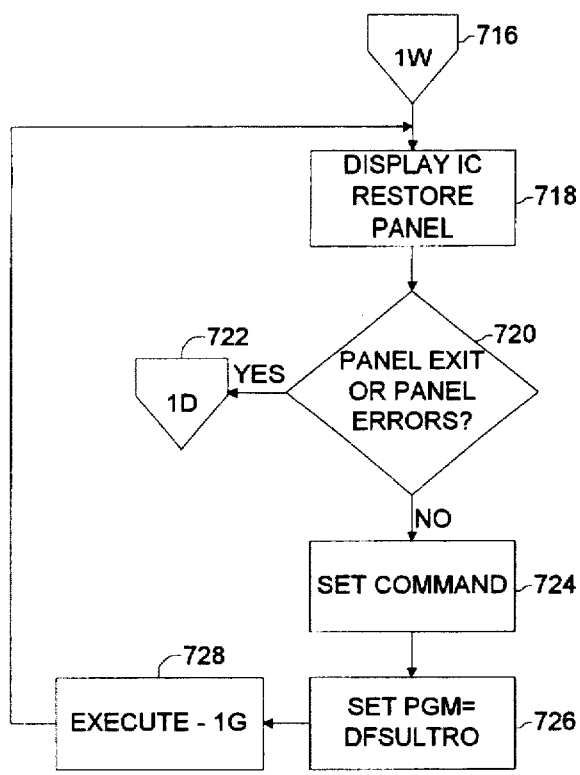
FIG. 30 is a flow diagram illustrating the IC restore option in accordance with one embodiment of the present invention.

The Recover Database routine, as illustrated in FIG. 29 entering as step 678, first displays the Recover Database panel 680. If the panel has errors or the end process key was selected 682, the system returns to step 144 of FIG. 12 (step 698). If not, the Check Date routine is executed 684. If errors exist in the date 686, an error message is set 688, and the routine returns to the beginning 678. If there are no errors, it is determined if the recovery time is present 690. If there is a recovery time, the routine jumps to step 702. If no recovery time had been entered, the panel defaults for the Recover to Time Confirmation panel are set 692. This panel is displayed 694 to determine whether the user actually meant for the recovery time to be left null. First, as with all panels, if the end process key is chosen or panel errors exist, the routine exits to step 144 of FIG. 12 (step 698). Otherwise, the panel prompts the user whether the Recover Time was intentionally left blank 700. If the time is to be supplied, the routine returns to step 694. If the time is not to be supplied, step 702 determines if errors exist. If errors, the routine exits to step 144 of FIG.12 (STEP 698). If no errors, the command is set 704. If DBD are selected 706, "DBD" is added to the command 708, and the routine jumps to step 712. In the alternative, "DBDSGRP" is added to the command 710. Then, the times are added to the command 712, the Job Executions routine at step 238 of FIG. 15 is executed 714, and the routine returns to step 678.

The IC Restore, shown in FIG. 30 at step 716, and the SUBSYS Cleanup, shown in FIG. 31 at step 730, have mirror image processes. For IC Restore, the panel is displayed 718. If the panel has error or the user has elected to exit the panel 720, the routine moves to step 144 of FIG. 12 (step 722). If neither is true, the command is set 724, PGM is set to DFSULTR0 726, and the Job Executions routine of FIG. 15 at step 238 is executed 728, followed by a return to the routine beginning 716.

Likewise, for SUBSYS Cleanup, the panel is initially displayed 732. If the panel has error or the user has elected to exit the panel 734, the routine moves to step 172 of FIG. 13 (step 736). If neither is true, the command is set 736, CLS is set to "Q" 740, and the Job Executions routine of FIG. 15 at step 238 is executed 742, followed by a return to the routine beginning 730.

The IC Delete routine, illustrated in FIG. 32 at step 744, has a secondary panel to protect against accidental deletion. After the initial panel is displayed 746, there is a determination if there are panel errors or an exit request from the user 748. If either occurs, the routine exits to step 144 of FIG. 12 (step 750). If neither occur, the process displays another panel 752, requiring the user to confirm the deletion. There is another determination of whether panel errors exist or whether the user has requested to exit the panel 754. If either occur, the routine moves to step 144 of FIG. 12 (step 750). If neither occur, the user is asked if the request should be canceled 756. If canceled, the routine exits to step 144 of FIG. 12 (step 750). Otherwise, the command is set 758, the PGM is set to DFSULTR0 760, and the Job Executions routine of step 238 at FIG. 15 executes 762. After the execution, the routine returns to its beginning at step 744.

Figure 33:
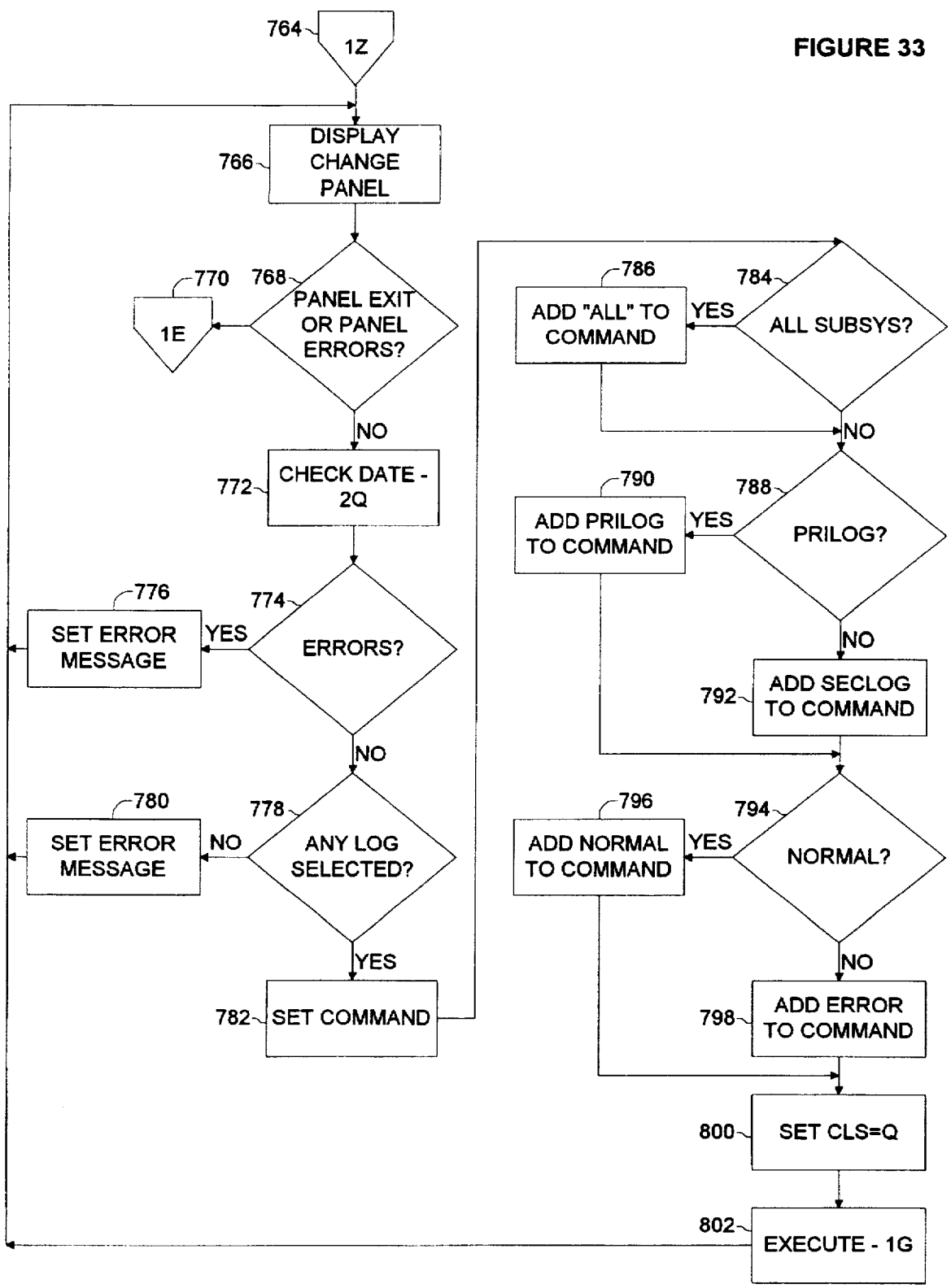
FIG. 33 is a flow diagram illustrating the change option in accordance with one embodiment of the present invention.
Figure 34:
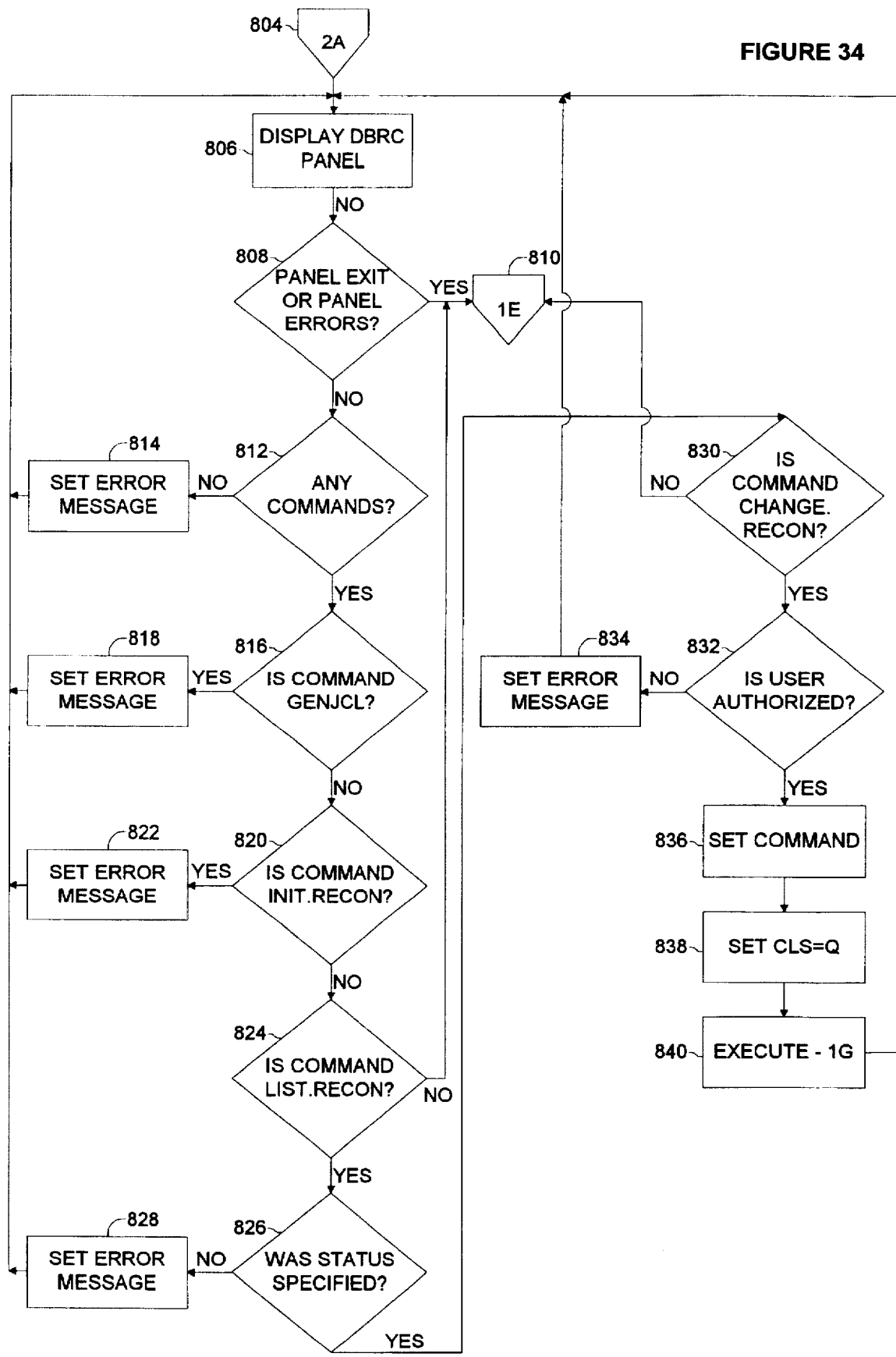
FIG. 34 is a flow diagram illustrating the database recovery commands routine in accordance with one embodiment of the present invention.

The Change routine enters at FIG. 33, step 764. First, the panel is displayed 766. If the panel has error or the user has elected to exit the panel 768, the routine moves to step 172 of FIG. 13 (step 770). Otherwise, the date is checked 772. If there are errors in the date 774, an error message is set 776, and the routine returns to the beginning 764. If neither the primary log nor the secondary log has not been selected 778, an error message is set 780, and the routine returns to the beginning 764. If neither of the above occur, a command is set 782. If all subsystems have been selected 784, "ALL" is added to the command 786. If the primary log is selected 788, "PRILOG" is added to the command 790. Otherwise, "SECLOG" is added to the command 792. If the process is normal 794, "NORMAL" is added to the command 796. If not normal, "ERROR" is added to the command 798. After either step 796 or step 798, CLS is set to "Q" 800, and the Job Executions routine at step 238 of FIG. 15 executes 802. Finally, the routine returns to its starting point 764.

The DBRC Commands routine, shown in FIG. 34 at step 804, allows free-form entry of DBRC commands. This routine steps through a series of queries to see if the entered commands are acceptable. However, no syntax checking is done for the commands. At the initial stage the panel is displayed 806. As is standard for all panels, the routine determines if the panel has errors or if the user has selected the exit 808. If either occurred, the routine exits to step 172 at FIG. 13 (step 810). If neither occurred, but no commands were selected 812, an error message is set 814, and the system returns to the routine beginning 804. If commands were selected but the commands were general JCL 816, an error message is set 818, and the routine returns to step 804. If the commands are not general JCL, but the command is "INIT.RECON" 820, an error message is set 822, and the routine returns to step 804. However, if the command is not "INIT.RECON" but it is "LIST.RECON" 824, then the routine exits to step 172 of FIG. 13 (step 810). In addition, if the status was not specified 826, an error message is set 828, and the routine returns to step 804. If the status was specified but the command is not "CHANGE.RECON" 830, the routine exits to step 172 of FIG. 13 (step 810). If the command is "CHANGE.RECON," but the user is not authorized to enter these commands 832, an error message is set 834, and the routine returns to step 804. Otherwise, the command is set 836, CLS is set to "Q" 838, and the Job Executions routine at step 238 of FIG. 15 executes 840. Finally, the routine returns to step 804.

The user may also choose the Change Accum or Database Dataset Groups selection, illustrated by FIG. 34 at step 842. Initially, the panel is displayed 844. If the panel has errors or the end process key was selected 846, the system returns to step 144 at FIG. 12 (step 848). If neither condition exists, and "CAGRP" was selected for processing 850, then the processing type is set to "CAGRP" 852. If "CAGRP" was not selected 850, then the processing type is set to "DBDS-GRP" 854. Next, the panel identification is set 856. If the user chose the Generate JCL option (CAGRPS only) 858 but the "CAGRP" was not selected as the processing type 860, then an error message is set 862, and the routine returns to step 842. If the Generate JCL option was not chosen 858, or if it was chosen and the processing type was selected as "CAGRP" 860, then the chosen third level panel is displayed 864. These panels consist of options for List, Delete, Initialize, Generate JCL, and Change. If the chosen third level panel has errors or the end process key was selected 866, the system returns to step 144 at FIG. 12 (step 848). Otherwise, the routine moves to step 870, shown in FIG. 36, to complete the chosen option 868.

Figure 36:
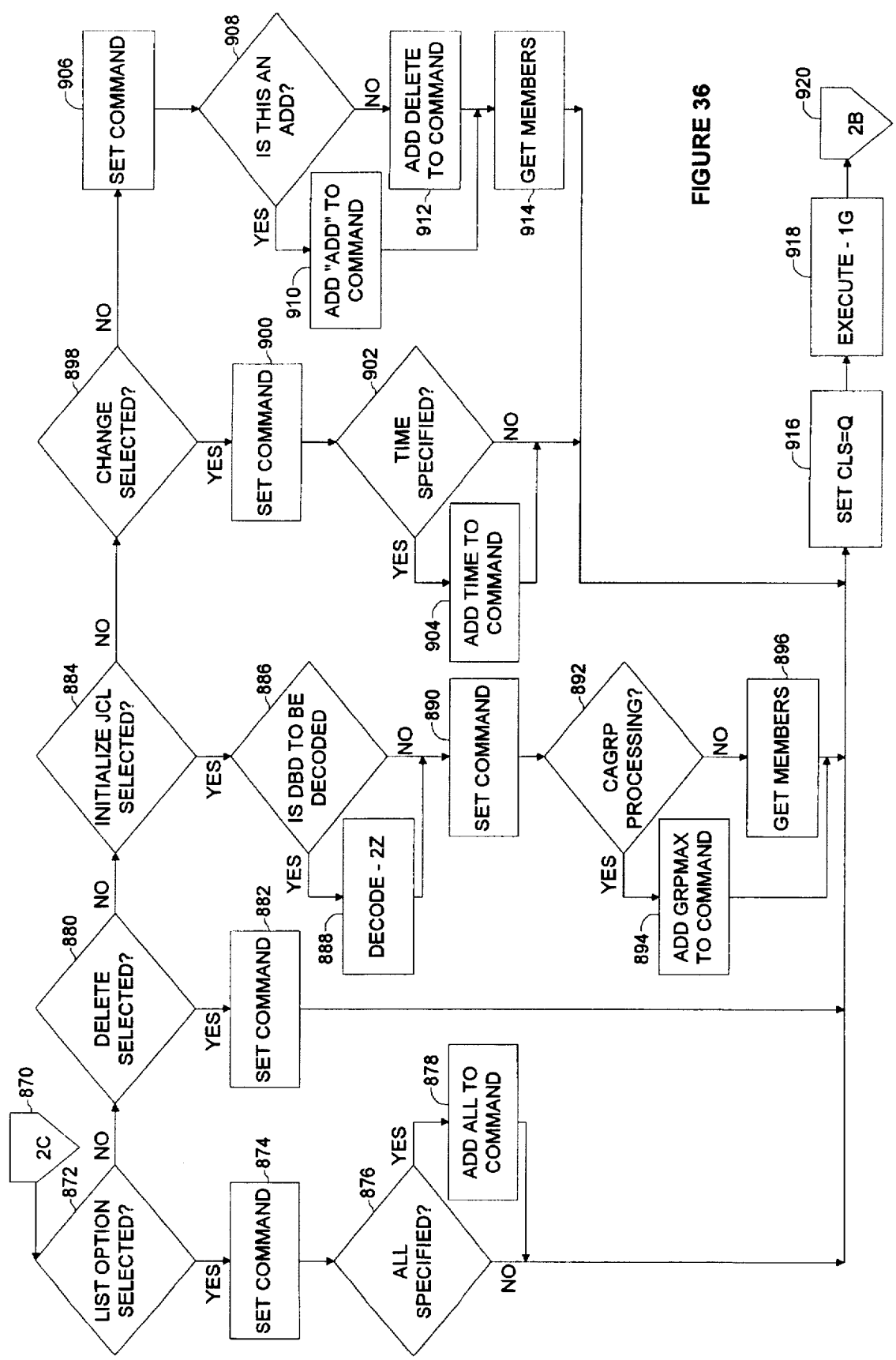
FIG. 36 is a continuation of the flow diagram of FIG. 35.

At FIG. 36, if the List option was selected 872, the command is set for a List of the chosen group 874. Note that the group, either CAGRP or DBDSGRP, was chosen in the previous panel. If all groups are specified 876, "ALL" is added to the command 878. If all groups are not selected, or if selected and the command is added, the routine moves to step 916.

If the Delete option was selected 880, the delete command is set 882, and the routine moves to step 916. If Delete was not selected 880, but the Initialize JCL option was selected 884, the system queries whether the DBD is to be decoded 886. If the DBD is to be decoded, the Decode routine executes 888, as illustrated at step 1620 of FIG. 57, and the command is set 890. Otherwise, only the command is set 890. If CAGRP processing was selected 892, "GRPMAX" is added to the command 894, and the routine moves to step 916. If CAGRP processing was not selected 892, the members of the group are retrieved 896, and the routine moves to step 916.

If the Change option was selected 898, the command is set for "Change" 900. If a time was specified 902, the time is added to the command 904. If no time was specified 902, or after time is added to the command if specified 904, the routine moves to step 916. If, however, Change had not been selected as an option 898, the command is set for Generate JCL 906. If this is an "Add" command 908, "Add" is added to the command 910. Otherwise, "Delete" is added to the command 912. After either, the members of the group are retrieved 914, and the routine moves to step 916.

At step 916, the CLS is set to "Q," and the Job Execution routine of FIG. 15 at step 238 executes 918. The routine then returns back to step 842 of FIG. 35 (step 920).

The Batch Back Out Cleanup is a second level routine exhibited at step 922 of FIG. 37. The panel is displayed 924, whereupon a panel error or the end process selection 926 will cause the routine to exit to step 172 of FIG. 13 (step 928). If those conditions do not exist, the panel identification and panel defaults are set 930, and the chosen third level panel is displayed 934. Note that step 932 enters back into the program before step 934. Step 932 is a continuation from FIG. 38 at step 960 and FIG. 39 at step 1006.

The third level panel choices consist of List, Change, Notify, and Delete. If panel errors exist or the end process key was selected 936, the routine exits to step 172 of FIG. 13 (step 928). If those conditions do not exist 936, and the List option was not selected 938, the routine jumps to step 948 of FIG. 38 (step 940). If the List option was selected 938, the command is set for List 942. If all the blocks were chosen, "ALL" is added to the command 946. The routine, after either "ALL" is added or if all groups were not selected, moves back to step 172 illustrated in FIG. 13 (step 928).

Figure 49:
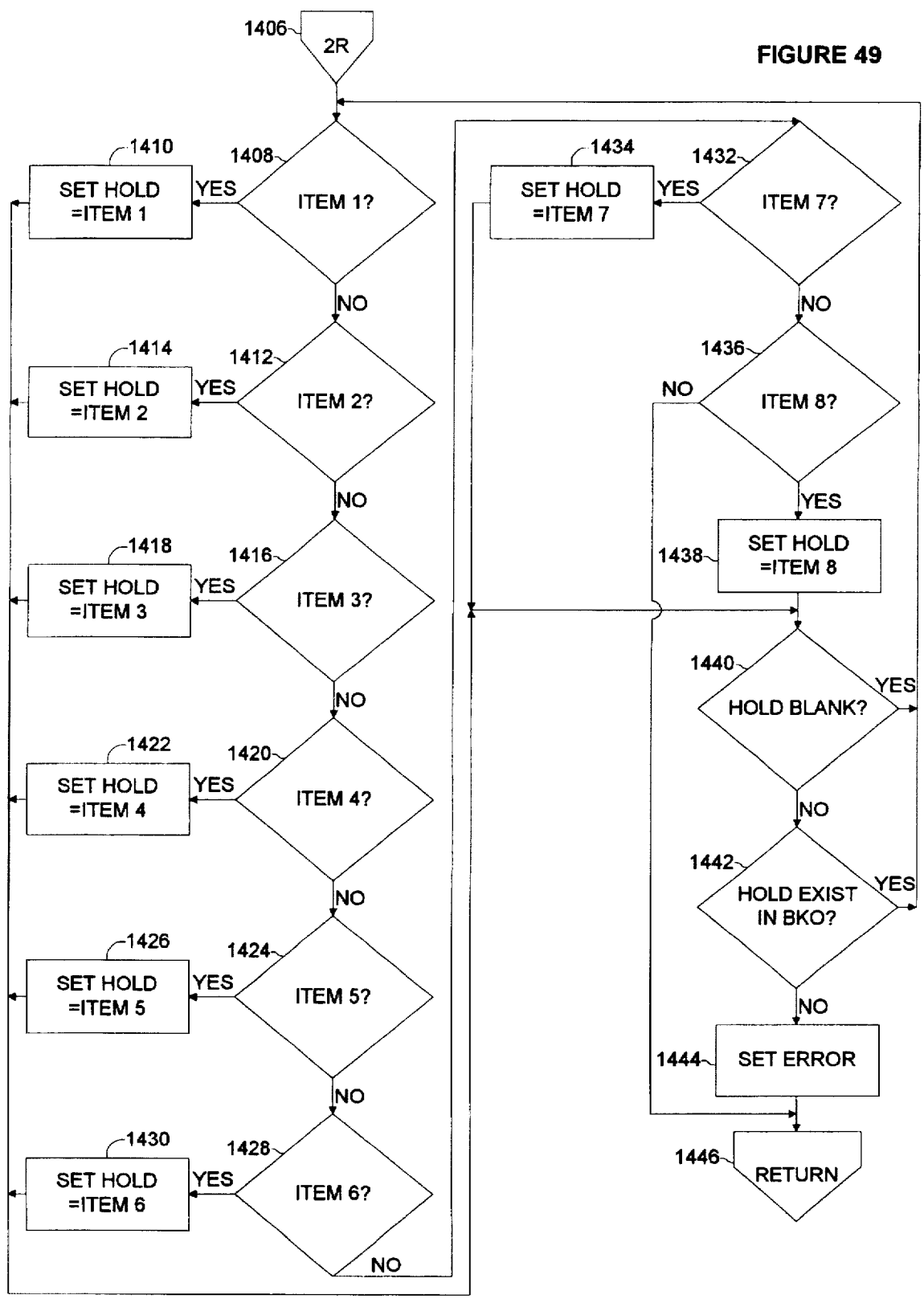
FIG. 49 is a flow diagram illustrating the routine which controls selection of DBD and BKO blocks in accordance with one embodiment of the present invention.

If the List option had not been selected 938, the routine, at step 948 of FIG. 38, determines if one of the remaining three options was selected. If the Change option was not selected 950, the system jumps to step 996 of FIG. 39 (step 952). If selected, the date is checked 954. If errors exist in the date 956, an error message is set 958 and the system returns to step 932 of FIG. 37 (step 960). If the DBD or BKO block entries were not left blank 962, the blocks are checked in the CHECK34 subroutine 964 at step 1406 of FIG. 49. If errors exist in the block 966, the routine exits to step 932 of FIG. 37 (step 960). If there are no block errors 966 or the DBD and BKO entries were left blank 962, then the command is set for the DBD and BKO blocks 968.

If the Delete function had been specified 970, that is also added to the command 972. If PSBs were selected 974, delete is added to the command 976. If DBDs are present 978, the SPREAD34 subroutine illustrated at 1448 of FIG. 50 executes 980, and upon return to the calling routine, the DBDs are added to the command 982. If either no DBDs were present 978 or after the DBDs are added to the command 982, it is determined if BKOs are present 984. If present, once again the SPREAD34 subroutine executes 986, and the BKOs are added to the command 988. Afterward, or if no BKOs had been selected, CLS is set to "Q" 990, and the Job Execution routine of FIG. 15 at step 238 executes 992. All DBDs and BKOs are cleared 994, and the routine returns to step 932 of FIG. 37 (step 960).

Figure 39:
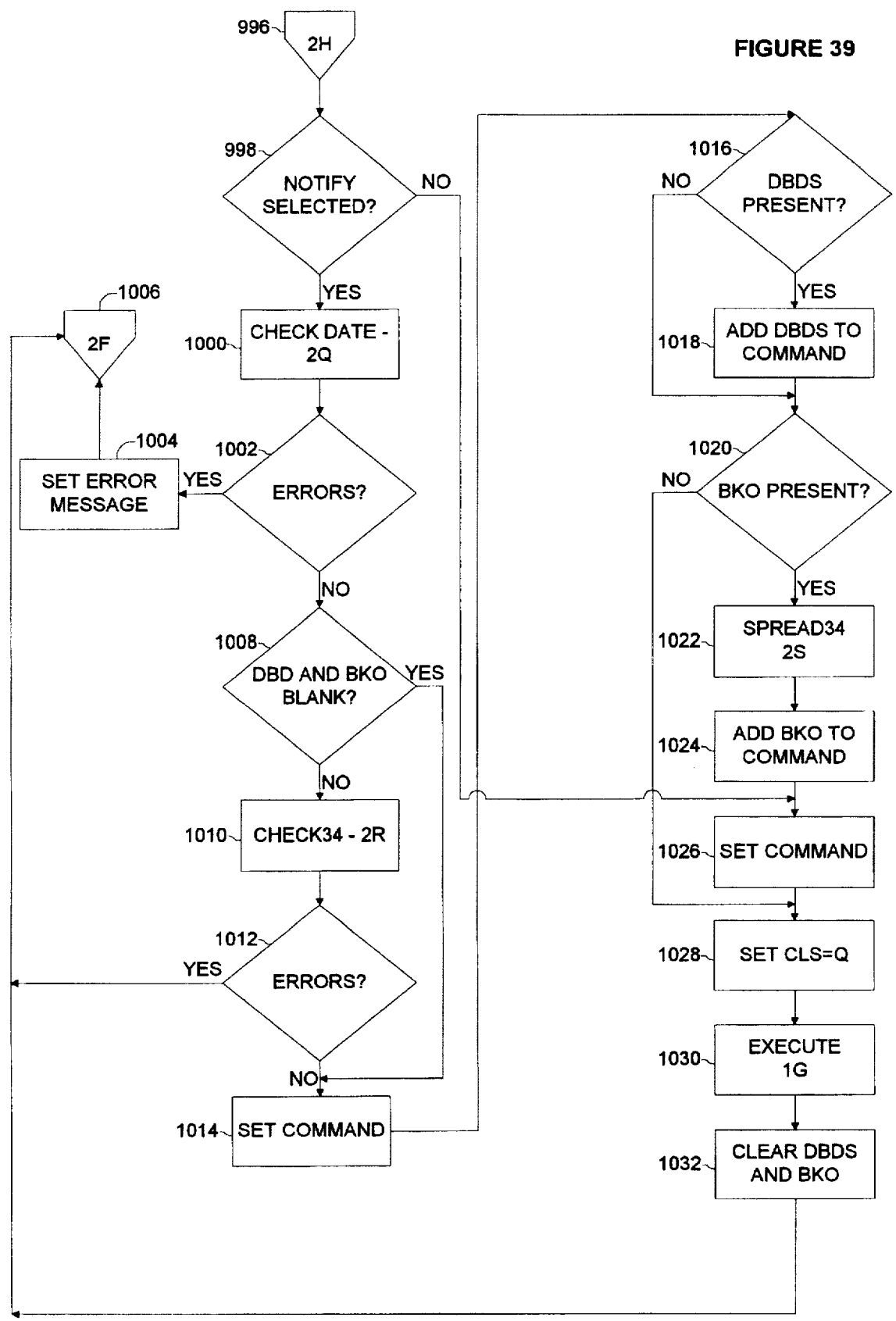
FIG. 39 is a continuation of the flow diagram of FIG. 38.

The third level queries continue at step 996 of FIG. 39. If the Notify option was selected 998, the date is checked 1000. Otherwise the routine jumps to step 1026. If there were errors in the date 1002, an error message is set 1004, and the system exits to step 932 of FIG. 37 (step 1006). If there were no errors in the date 1002, and the DBD and BKO entries were not left blank 1008, the entries are checked 1010. If there are errors in the block entries 1012, the system exits to step 932 of FIG. 37 (step 1006). If the entries contained no errors 1012, or if the DBD and BKO entries were left blank 1008, the command is set, respectively 1014.

The system checks for DBDs 1016. If they exist, "DBD" is added to the command 1018. Then, regardless of the prior query, the system checks for BKOs 1020. If BKOS are present 1020, the SPREAD34 routine, of FIG. 50 at step 1448, executes 1022. "BKO" is added to the command 1024. At step 1026, the command is set. After the command is set 1026, or if no BKOs were present 1020, CLS is set to "Q" 1028, and the Job Execution routine at step 238 of FIG. 15 executes 1030. All DBDs and BKOs are cleared 1032, and the system returns to step 932 of FIG. 37 (step 1006).

FIG. 40, step 1034, represents the flow of the List Transactions for a DBD routine. First, the system variables are retrieved via the mainframe function DM1001A01 1036. The JCL file is allocated and the jobcard is set 1038. Finally, the panel is displayed 1040 whereupon a request by the user to exit 1042, will cause the routine to jump to step 1054. If there is no exit request 1042 and DBDs are present 1044, generic DBD is created 1046. Next, the last DBD for the display and the JCL for the above generic DBD are set 1048. After the DBD are set 1048, or if no DBD were present 1044, it is determined if more DBDs are to be entered 1050. If they are, the routine returns to step 1040. Otherwise, JCL is deallocated 1052, and the Display Processing Options panel is displayed 1054.

The routine next steps through a series of processing questions. First, was a panel error detected or did the user end the process 1056. If either is true, and error message is set 1058 and the routine jumps to step 1072 where the JCL file is deleted. If Browse was selected 1060, then the user may browse the generated JCL 1062. If Edit was selected 1064, then the user may edit the generated JCL 1066. If Submit was selected 1068, the generated JCL is submitted 1070. After any of the above three selections, the routine returns to step 1054 and the panel is redisplayed. However, if none are selected, the JCL file is deleted 1072 and the system exits to step 94 of FIG. 11 (step 1074).

Figure 41:
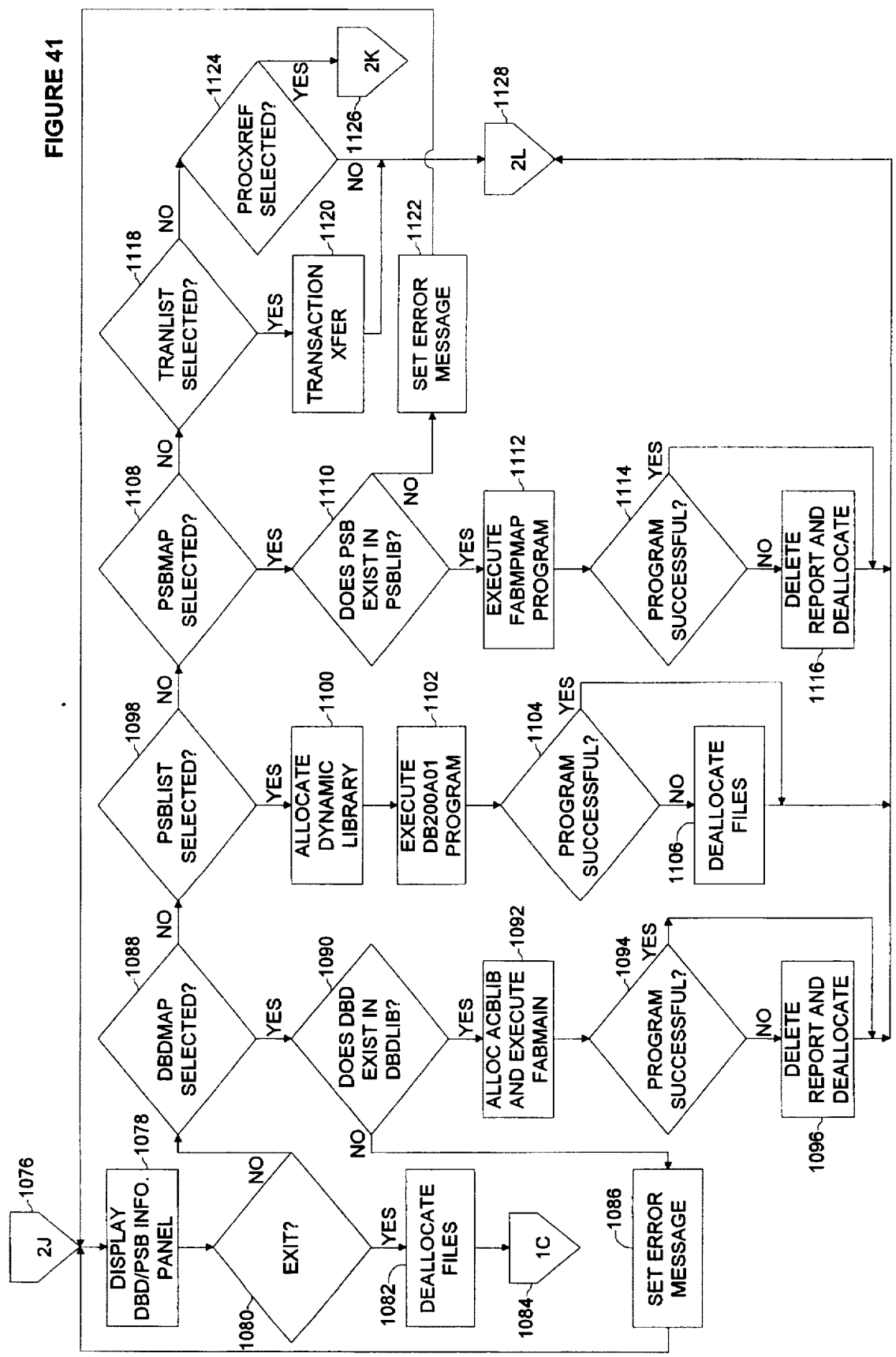
FIG. 41 is a flow diagram illustrating the DBD/PSB information option in accordance with one embodiment of the present invention.

The user can also input and retrieve special information for DBD and PSB, as the flow of FIG. 41 at step 1076 demonstrates. The user is shown the DBD/PSB information panel 1078. If the end process key was selected 1080, files are deallocated 1082, and the system returns to step 94 at FIG. 11. However, if the user did not choose to exit 1080, the routine determines if one of five choices was selected. These choices include DBD map, PSB list, PSB map, Transactions for a DBD, and Cross Reference of Procedures to PSBs.

If DBD map was selected 1088, there is a determination of whether DBD exist in the DBDLIB 1090. If not, an error message is set 1086, and the routine returns to step 1076. If the DBDLIB does exist 1090, there is an allocation of mainframe ACBLIB and the mainframe program FABM-MAIN is executed 1092. If the program execution was not successful 1094, the report file is deallocated and the report file is deleted 1096, and the routine moves to step 1172 of FIG. 43 (step 1128). If the program was successful 1094, the routine moves to step 1172 of FIG. 43 (step 1128) with the report file intact.

If PSB List was selected 1098, then the dynamic library is allocated 1100. The mainframe program DB200A01 executes 1102. If the mainframe program is unsuccessful 1104, the files are deallocated 1106, and the routine moves to step 1172 of FIG. 43 (step 1128). If successful 1104, the files remain allocated while the system moves to step 1172 of FIG. 43 (step 1128).

If the PSB map option was selected 1108, the system determines if the PSB exist in the mainframe PSBLIB 1110. If nonexistent, an error message is set 1122, and the routine returns to step 1076. If the PSB exist 1110, the mainframe FABMPMAP program executes 1112. If the program is unsuccessful 1114, the files are deleted and deallocated 1116 before the system moves to step 1172 of FIG. 43 (step 1128). Otherwise, the system moves to step 1172 of FIG. 43 (step 1128) with the files allocated.

Figure 43:
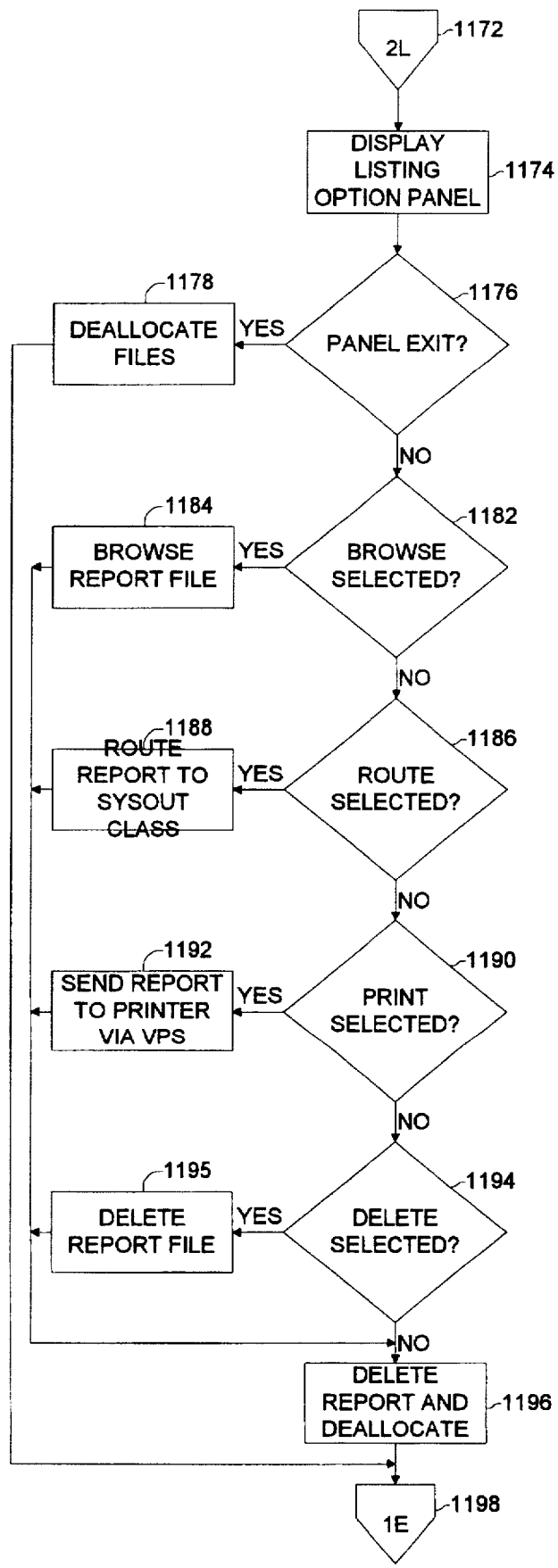
FIG. 43 is a flow diagram illustrating the listing options routine in accordance with one embodiment of the present invention.

If Transaction for a DBD is selected 1118, the mainframe program TRANSACTION XREF executes 1120 before the system moves to step 1172 of FIG. 43 (step 1128). If the Cross Reference of Procs to PSB is unselected, the system moves to step 1172 of FIG. 43 (step 1128). In the alternative, if it is selected 1124, the system moves to step 1130 of FIG. 42 (step 1124).

For Cross Reference of Procs to PSB, as illustrated in FIG. 42 at step 1130, the routine first displays a third level panel 1132. If the panel has errors or the user selects the end process key, the routine exits to step 1172 of FIG. 43 (step 1136). If those conditions do not occur, it is determined of any members are selected 1138. If none are selected, an error message is set 1140, and the routine returns to step 1130. If members were selected 1138, but the mainframe PROCLIB is not available 1142, an error message is set 1144, and the routine returns to step 1130. If the PROCLIB is available 1142, a series of functions are set. First, a work file is allocated 1146 and the members are written to the file 1148. The PROCLIB is allocated 1150 along with the PSBLIB and the DBDLIB 1152, the dynamic library 1154, and a print file 1156. The mainframe program DB201A01 is executed 1158, and the files are deallocated 1160. Next, the Processing Options panel is displayed 1162. If Browse is selected 1164, the user may BROWSE the report 1166 and is returned to the Processing Options display 1162. If Browse is not selected 1164, the report file is deleted 1168, and the system moves to step 1172 of FIG. 43 (step 1170).

Step 1172 of FIG. 43 represents a continuation of the Cross Reference of Procs to PSB routine of FIG. 42. At the outset, the Listing Option Panel is displayed 1174. If the end process key is selected 1176, the files are deallocated 1178, and the system exits to step 172 of FIG. 13 (step 1198). In the alternative, if the Browse option is selected 1182, the user may BROWSE the report file 1184. If Route is selected 1186, the report is routed to the SYSOUT class 1188. If print is selected 1190, the report is sent to the printer via the mainframe VPS 1192. If the last option, Delete, is selected 1194, the report file is deleted 1195. After the execution of the above four selections, the report file is deleted and all files are deallocated 1196 before the system exits to step 172 of FIG. 13 (step 1198).

Figure 44:
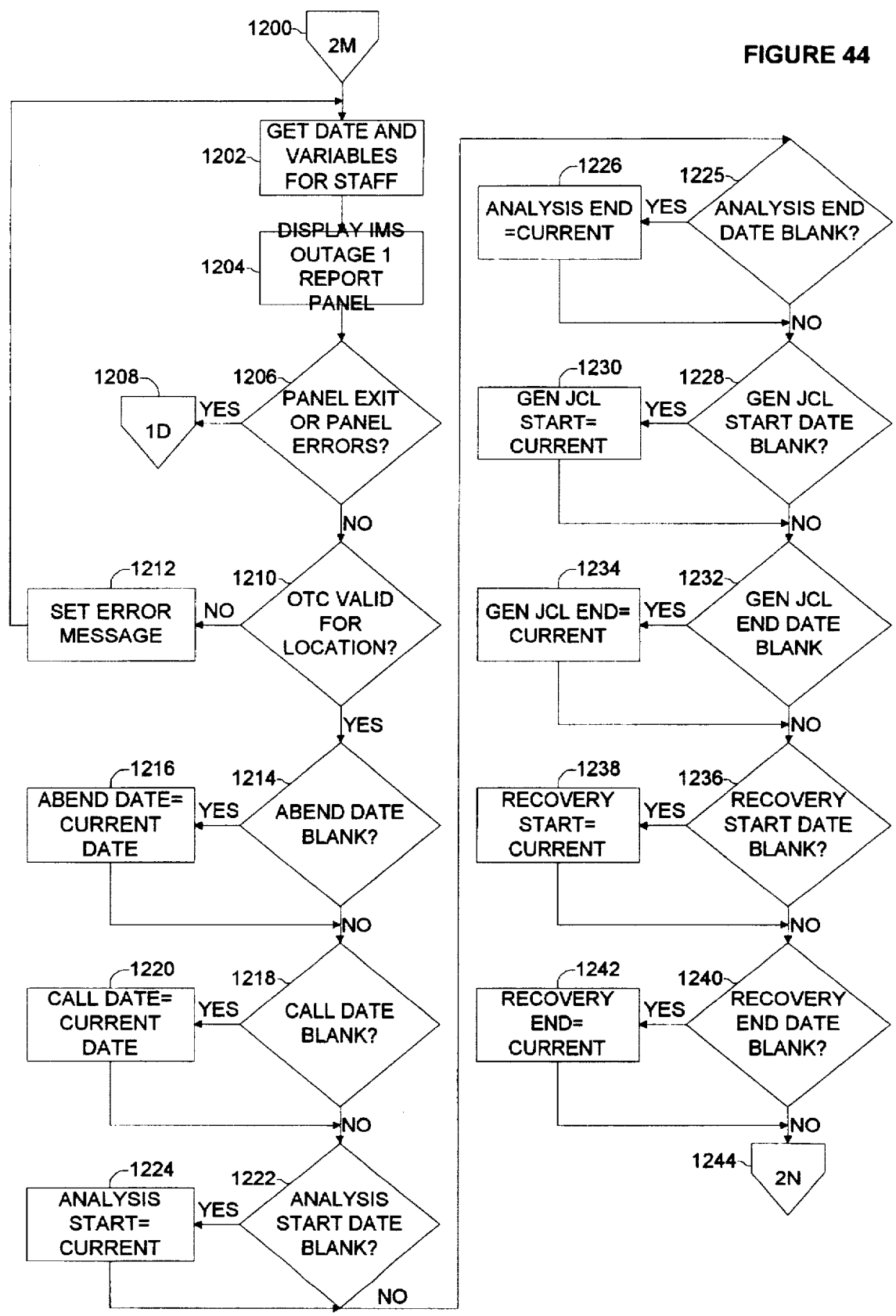
FIG. 44 is a flow diagram illustrating the IMS outage 1 report routine in accordance with one embodiment of the present invention.

IMS Outage consists of two parts. The first is illustrated in FIG. 44, beginning at step 1200. Prior to the IMS Outage 1 Report panel being displayed 1204, the system gets the current date and sets variables for the DBA staff 1202. If the panel has errors or the end process key was selected 1206, the system exits to step 144 of FIG. 12 (step 1208). In addition, if the OTC is not valid for the current location 1210, an error message is set 1212, and the routine returns to step 1200. If the two above conditions do not lead to an error or exit, the routine steps through a series of queries. Only positive responses to the queries lead to action.

First, if the abend date was left blank 1214, the abed date is set to the current date 1216. If the call date is blank 1218, then the call date is set to the current date 1220. If the analysis start date is blank 1222, it is set to the current date 1224. Likewise, if the analysis end date is blank 1225, the analysis end date is set to the current date 1226. If the general JCL start date is blank 1228, it is set to the current date 1230. The same is true 1234 for the general JCL end date 1232. If the recovery start date is blank 1236, it is set to the current date 1238. Finally, if the recovery end date is blank 1240, it too is set to the current date 1242. The routine continues at step 1246 of FIG. 45 with more queries (step 1244).

Figure 45:
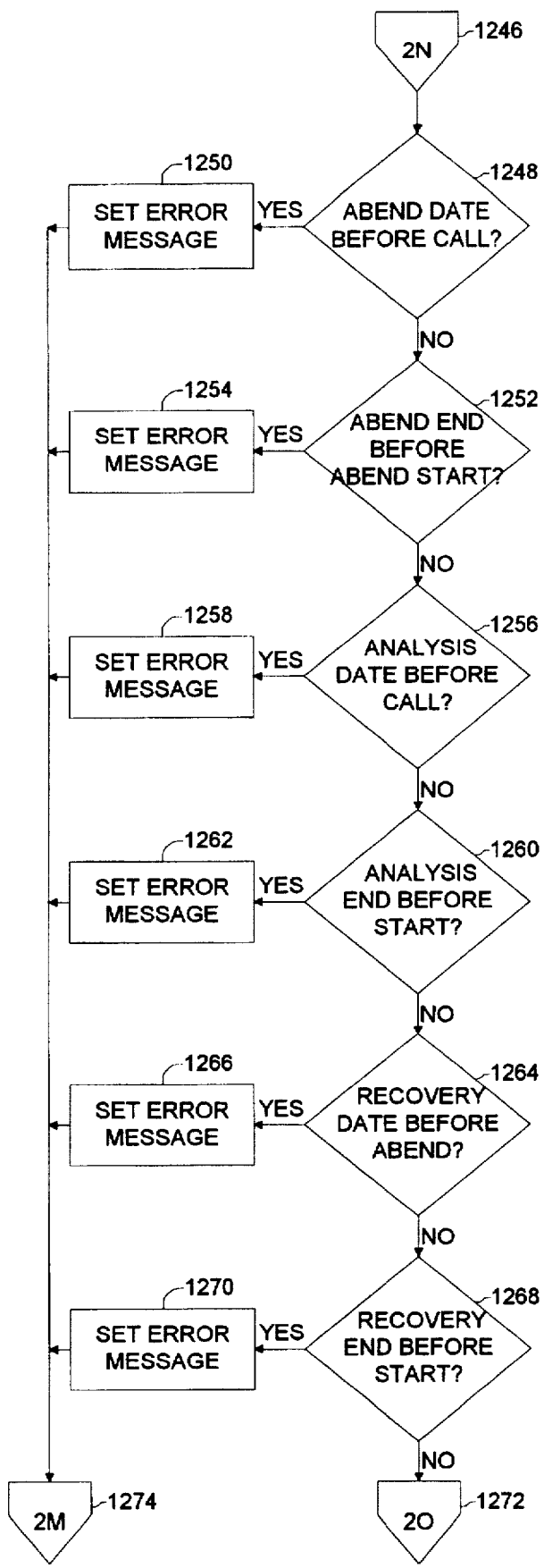
FIG. 45 is a continuation of the flow diagram of FIG. 44.

At FIG. 45, if the abed date is prior to the call 1248, an error message is set 1250. An error message results 1254 if the abed end is prior to the abed start 1252. If the analysis date is prior to the call 1256, it results in an error message 1258. Similarly, a listed analysis end which is prior to an analysis start 1260 results in an error message 1262. A recovery date prior to an abed date 1264 results in an error message 1266. Finally, if the recovery end is before the recovery start 1268, an error message is set 1270. After each error message, the system returns back to step 1200 of FIG. 44 (step 1274). However, if no errors exist, the routine continues at step 1276 of FIG. 46 (step 1272).

Figure 46:
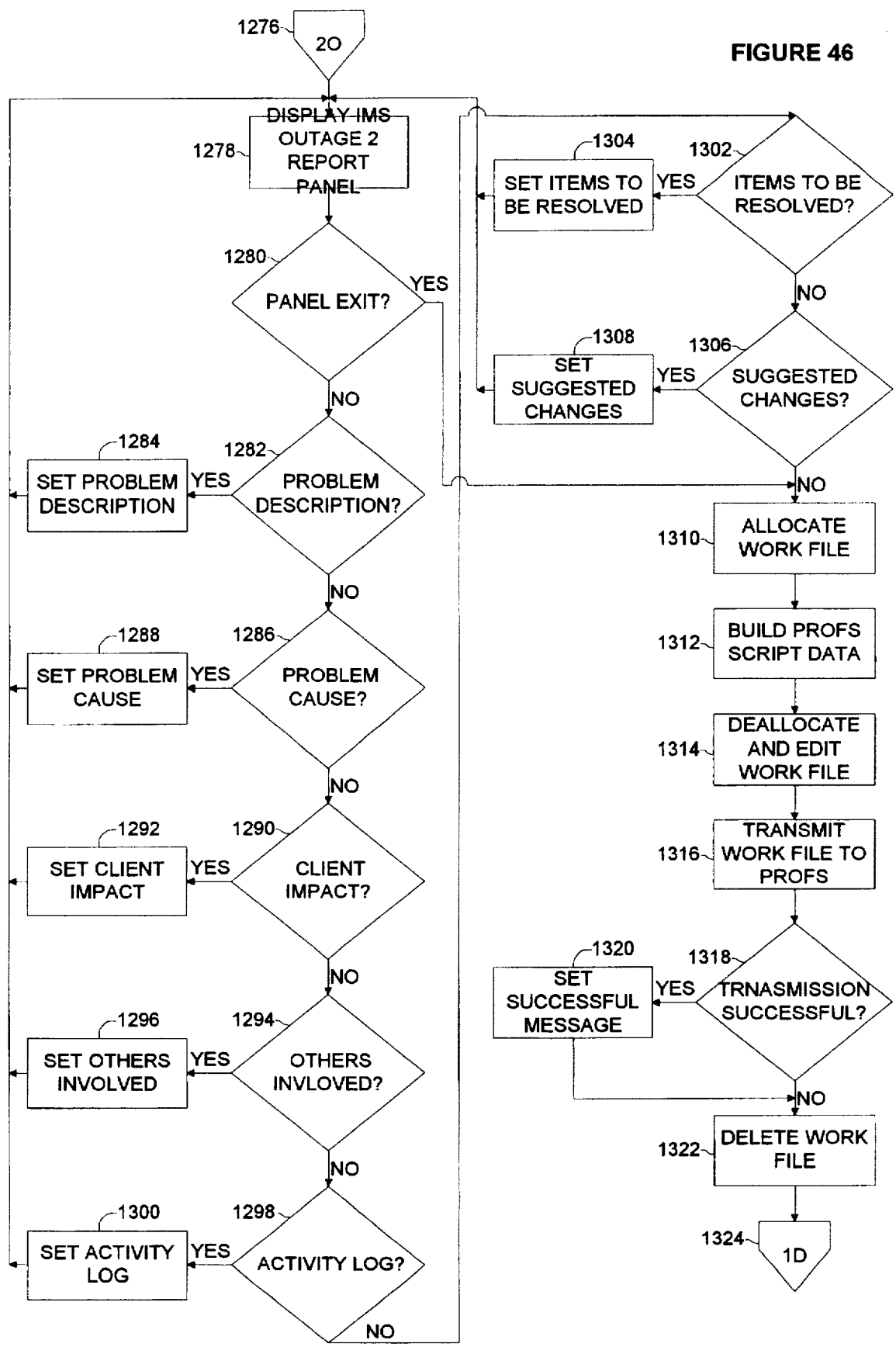
FIG. 46 is a flow diagram illustrating the IMS outage 2 report routine in accordance with one embodiment of the present invention.

FIG. 46, at step 1276, represents the second part of IMS Outage. The routine starts by displaying the IMS Outage 2 Report panel 1278. If the end process key was selected 1280, the routine moves to step 1310. If not selected, a series of queries are initiated. If a problem description was entered 1282, the problem description is set 1284. If a problem cause is entered 1286, the problem cause is set 1288. If there is a client impact 1290, the client impact is set 1292. If others are involved 1294, others are set 1296. A selected activity log 1298 causes the activity log to be set 1300. A positive response for items to be resolved 1302 results in the items set 1304. Finally, if changes are suggested 1306, the suggested changes are set 1308. After each of the above seven queries, if a positive response and a subsequent command setting result, the routine returns to step 1276. If the result of all inquiries are negative, the work file is allocated 1310. Then the PROFS data script is built 1312. The work file is first deallocated and then edited 1314. The work file is finally transmitted to PROFS 1316. If the transmission was successful 1318, set a successful message 1320 and delete the work file 1322. If unsuccessful, the work file is deleted 1322 without a message being set. Finally, the routine exits to step 144 of FIG. 12 (step 1324).

The Fix DSN routine, as illustrated by FIG. 47 at step 1326, is perhaps the most complex of the system. At its entry, a series of queries determine which subsystem will be used. If the CASS subsystem is to be used 1328 but the IMS2 is not 1330, an error message is set 1340. The same will occur if the CASS TEST subsystem is chosen 1332, but neither the IMS2 nor the IMS5 systems were chosen 1334. Likewise, if the IMSC subsystem was chosen 1336, and the IMS5 subsystem was chosen 1338, and error message will be set 1340. However, any other combination of outcomes to the queries results in the system setting defaults for the ACBLIB, DBDLIB, PSBLIB, RESLIB, and the dynamic allocation library 1342. If this is a production subsystem 1344, and it is using IMS3 1346, then append the mainframe program FRD002 to DSNS 1348. If not using the IMS3 1346, do not append. In either case, the next step is to set IMS to "Production" 1350, blank out the test DSNS 1352, and return to step 68 of FIG. 10 (step 1382).

If the CASS subsystem is used 1354, change names of ACBLIB, DBDLIB, PSBLIB, RESLIB, and the dynamic allocation library 1356. Next, set IMS to "CASS" 1358, blank out the test DSNS 1360, and return to step 68 of FIG. 10 (step 1382).

If the IMSC subsystem is used 1362, change names of ACBLIB, DBDLIB, PSBLIB, RESLIB, and the dynamic allocation library 1364. Next, set IMS to "CASS" 1366, and return to step 68 of FIG. 10 (step 1382).

If the TEST subsystem is used 1368, change names of ACBLIB, DBDLIB, PSBLIB, RESLIB, and the dynamic allocation library 1370. Next, set IMS to "TEST" 1372, blank out the production DSNS 1374, and return to step 68 of FIG. 10 (step 1382).

Finally, if the TEST subsystem was not chosen 1368, change names of ACBLIB, DBDLIB, PSBLIB, RESLIB, and the dynamic allocation library 1376. Next set IMS to "CASS TEST" 1378, blank out the production DSNS 1380, and return to step 68 of FIG. 10 (step 1382).

Figure 48:
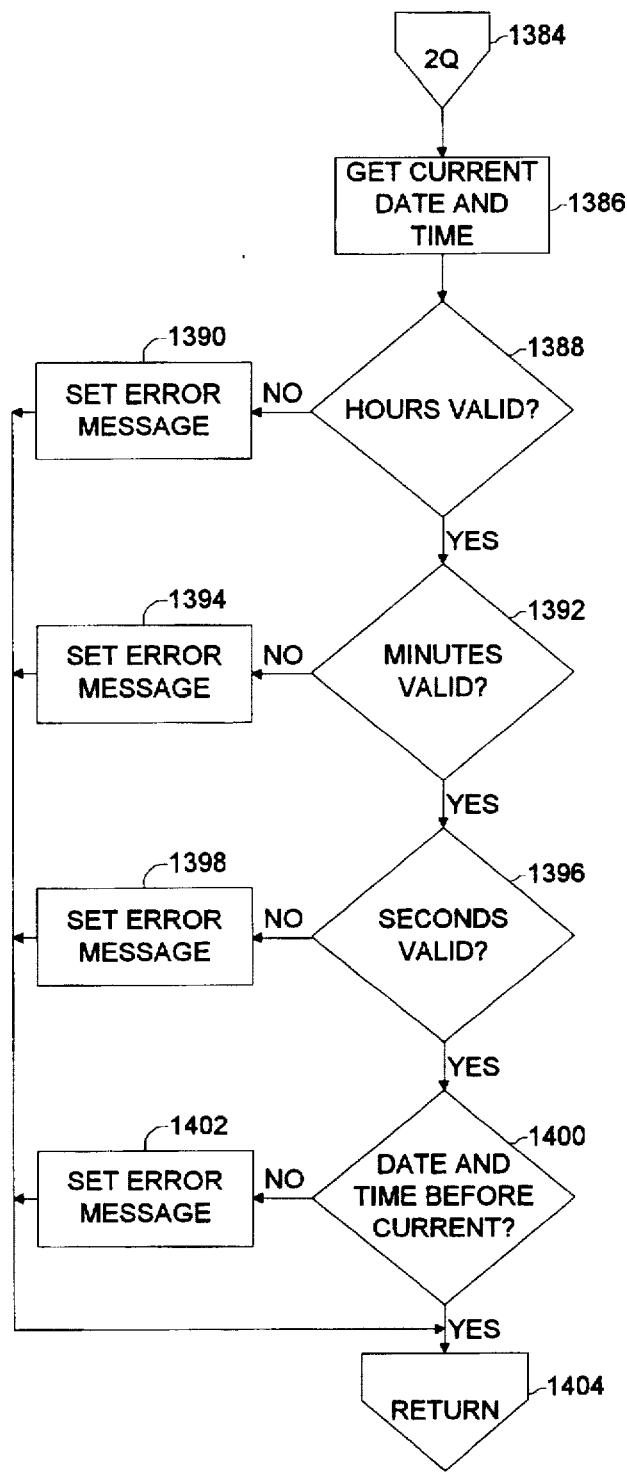
FIG. 48 is a flow diagram illustrating the check date routine in accordance with one embodiment of the present invention.

FIG. 48 at step 1384 represents the Check Date routine. The system initially gets the current system date and time 1386. If the hours are not valid 1388, an error message is set 1390. If the minutes are not valid 1392, an error massage is set 1394. The routine also checks the seconds to determine if they are valid 1396. If not valid, an error massage is set 1398. The final query determines if the date and time are prior to the current date and time 1400. An error message results if the condition does not occur 1402. If the date and time are prior to the current date and time, or after an error message, the system returns to the calling routine 1404.

When an operator chooses either the Notify option or the Change option from the Batch Back Out Clean-up panel, the respective third level panel is displayed. Each of these third level panels allow the operator to enter either eight DBDs or eight BKOs which will be operated on. The routine illustrated in FIG. 49, at step 1406, controls the selection of one or more of the sixteen entrees. When one of the eight items is present for either of the DBD blocks or the BKO blocks, that item is added to the system information.

Thus, if the first item has an entry 1408, that entry is held 1410. If item two exists 1412, set hold for item two 1414. If item three exists 1416, set hold for item three 1418. If item four exists 1420, set hold for item four 1422. If item five is present 1424, it is held 1426. If item six had been entered 1428, it is held 1430. If either item seven is present 1432 or item eight is present 1436, then item seven 1434 or item eight 1438, respectively, is set to hold. Note that after any item is set to hold, the routine determines if it should hold the item blank 1440. If it is to be held blank, the routine returns to step 1406. If not held blank and the hold exists in BKO 1442, then the routine also returns to step 1406. If neither held blank 1440 nor held in BKO 1442, then an error message is set 1444 and the routine returns to the calling routine 1446. Finally, if no items were present, the system returns to the calling routine 1446.

Figure 50:
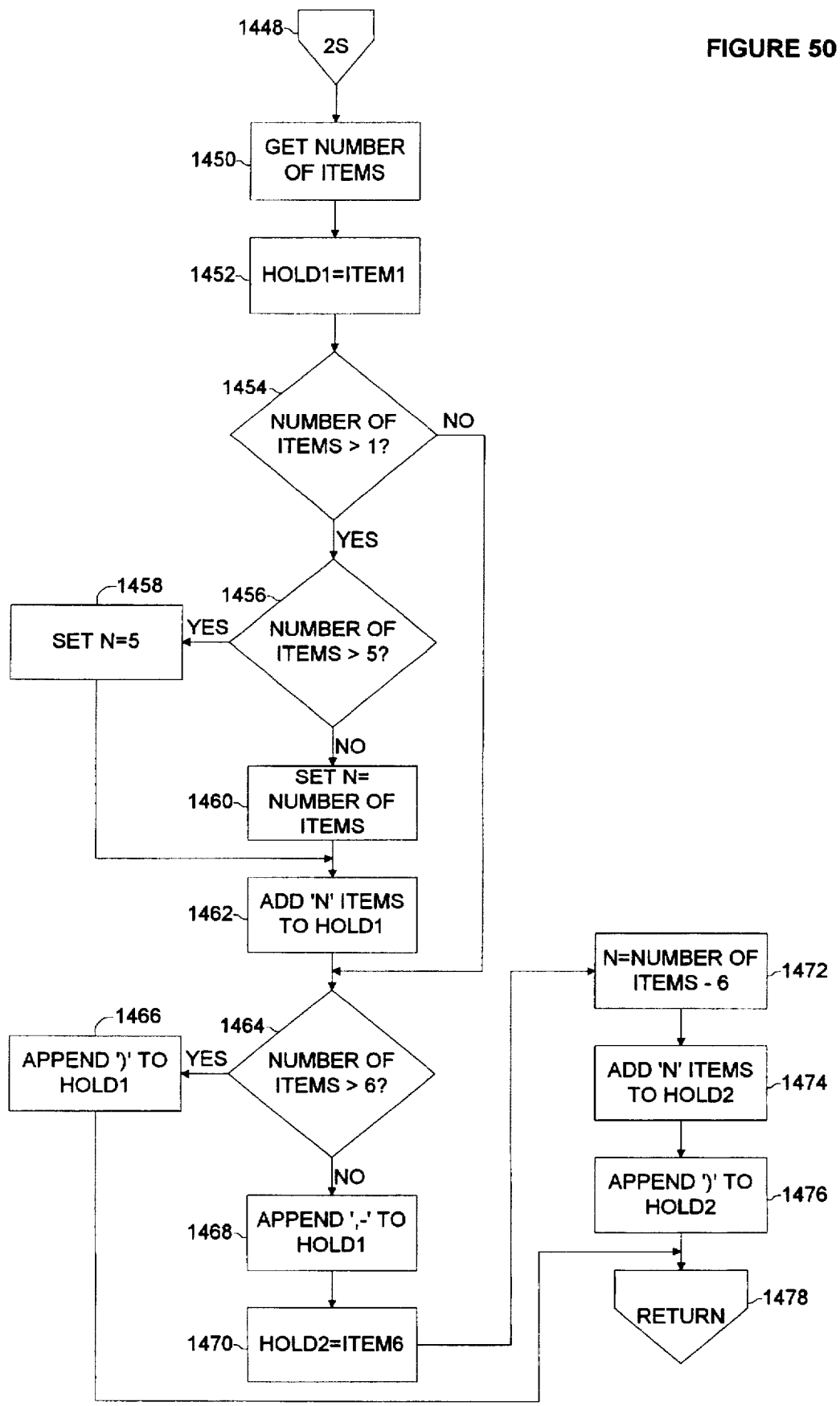
FIG. 50 is a flow diagram illustrating the SPREAD34 routine which gets the number of items of blocks in accordance with one embodiment of the present invention.

FIG. 50, at step 1448, illustrates the SPREAD34 routine. The system first retrieves the number of items 1450. It assigns "hold1" to item one 1452. If the number of items is not greater than one 1454, the routine moves to step 1464. If the number of items is greater than one 1454 and greater than five 1456, the system sets "N" to five 1458 and moves to step 1462. If the number if items is not greater than five 1456, then "N" is set to the number of items 1460. Then, the "N" items are added to "hold1" at step 1462.

If the number of items is greater than six 1464, ")" is appended to "hold1" 1466, and the system returns to the calling routine 1478. If, however, it is not greater than six 1464, "," is appended to "hold1" 1468. "hold2" is set to item six 1470, and "N" is set to the number of items subtracted by six 1472. The "N" items are added to "hold2" 1474, and ")" is appended to "hold2" 1476. Finally, the system returns to the calling routine 1478.

Figure 51:
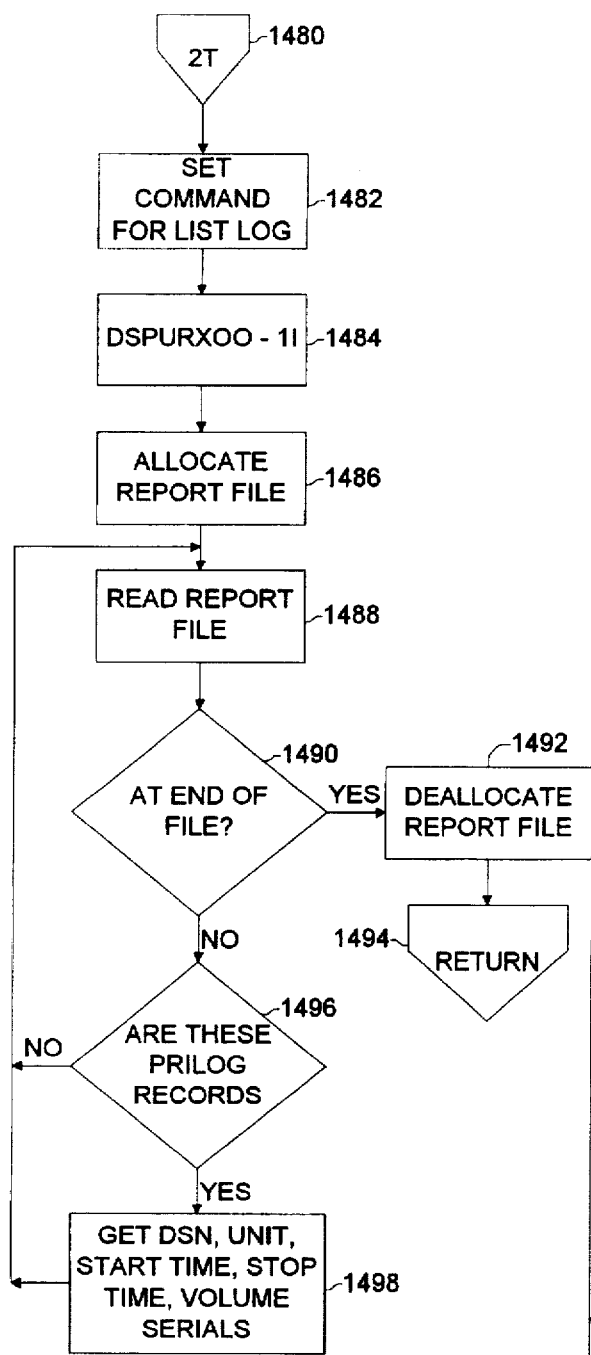
FIG. 51 is a flow diagram illustrating the list log routine in accordance with one embodiment of the present invention.

The List Log routine (FIG. 51 at step 1480) first sets the command for list log 1482. The DSPURX00 subroutine of FIG. 20 (step 416) is executed 1484. It should be noted that the DSPURX00 routine utilizes a mainframe utility which is also referred to as DSPURX00. Next, the report file is allocated 1486, and the report file is read by the system 1488. If the system is at the end of the file 1490, the report file is deallocated 1492, and the system returns to the calling routine 1494. If the file was not at the end 1490, it is determined if the records are PRILOG records 1496. If they are PRILOG records, the system retrieves the DSN, unit, start time, stop item, and volume serials 1498 before returning to step 1488. If the records are not PRILOG 1496, the routine moves to step 1488 without change.

Figure 52:
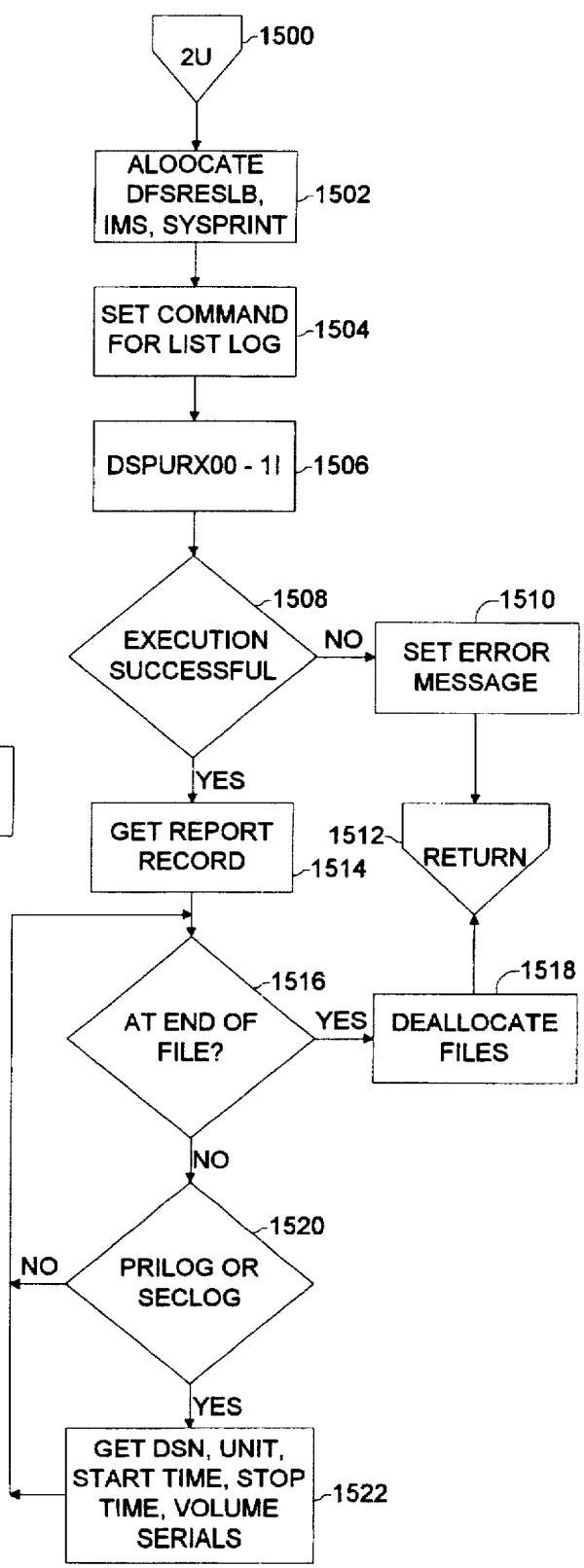
FIG. 52 is a flow diagram illustrating the system log retrieval routine in accordance with one embodiment of the present invention.

The "Get Log" routine retrieves log reports and is illustrated by FIG. 52 at step 1500. At the outset, there are allocations of DFSRESLB, IMS, and SYSPRINT 1502. The command is set for list log 1504 so that the system may execute the DSPURX00 routine 1506 (FIG. 20 at step 416). If the execution of the DSPURX00 subroutine was not successful 1508, an error message is set 1510, and the system returns to the calling routine 1512. In the event of a successful execution 1508, the report record is retrieved 1514. If the report is at the end of file 1516, the files are deallocated 1518, and the system returns to the calling routine 1512. However, if not at the end of file 1516 and either the PRILOG or SECLOG had been selected 1520, the routine retrieves the DSN, unit, start time, stop time, and volume serials 1522 before returning to step 1516. If neither the PRILOG nor the SECLOG was selected 1520, the routine moves to step 1516 without change.

Figures 53, 54:
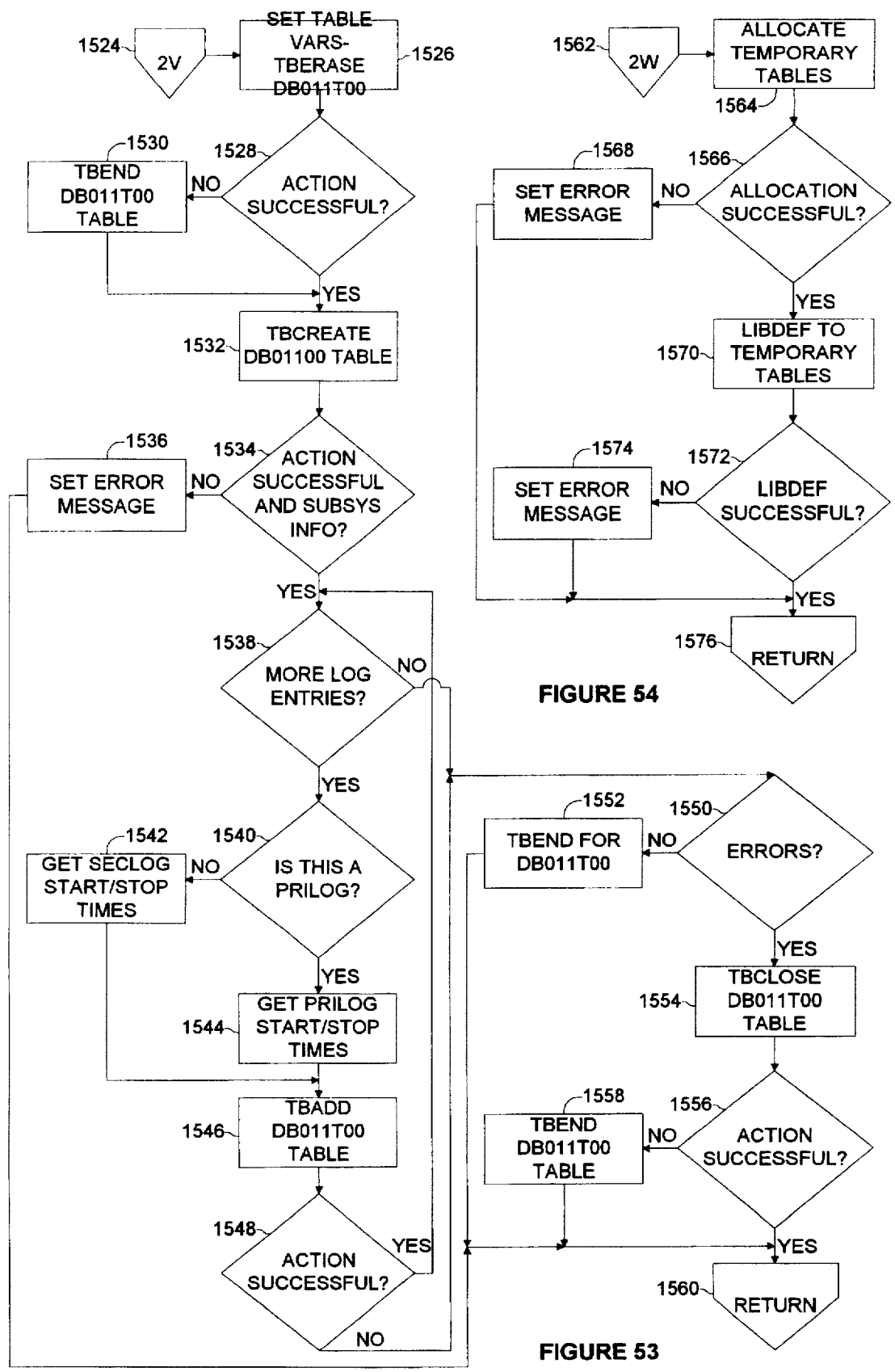
FIG. 53 is a flow diagram illustrating the table building routine in accordance with one embodiment of the present invention.
FIG. 54 is a flow diagram illustrating the table allocation routine in accordance with one embodiment of the present invention.

The Build Tables routine, illustrated at FIG. 53, step 1524, composes tables containing time stamp information for both the primary and secondary logs. Note that DB011T00 is being used as an illustrative table only. Any table of similar function and designation may be used. First, the table variables are set and the mainframe function TBERASE is executed with the DB011T00 table 1526. If the TBERASE function was not successful 1528, TBEND the DB011T00 table 1530. After the TBEND 1530, or if the action was successful 1528, TBCREATE the DB01100 table 1532. If the action was unsuccessful or if there is no information for the subsystem 1534, an error message is set 1536, and the system returns to the calling routine 1560. However, if the action was successful and there is information for the subsystem 1534, it is determined if there are more log entrees 1538.

If no other log entries exist 1538, and there are no errors 1550, TBEND for DB011T00 1552, and return to the calling routine 1560. If errors exist 1550 and there are no other log entries 1538, TBCLOSE the DB011T00 table 1554. If the action was successful 1556, return to the calling routine 1560. If unsuccessful 1556, TBEND the DB011T00 table 1558 before returning to the calling routine 1560.

If more log entries exist 1538, the routine determines if it is a PRILOG entry 1540. If it is not the PRILOG, the SECLOG start and stop times are retrieved 1542 before moving to step 1546. If it is the PRILOG 1540, the PRILOG start and stop times are retrieved 1544. Next, at step 1546, TBADD the DB011T00 table. If the action was successful, the routine moves back to step 1538 to determine if more log entries exist. Otherwise, the routine moves to step 1550.

The Allocate Tables routine (FIG. 54 at step 1562) allocates temporary tables 1564. If the allocation is not successful 1566, an error message is set 1568, and the system returns to the calling routine 1576. If successful 1566, LIBDEF is set to temporary tables for ISPTLIB and ISPT-ABL 1570. If the LIBDEF was not successful 1572, an error message is set 1574 before returning to the calling routine 1576. If successful 1572, the system exits to the calling routine 1576 without error.

The Display subroutine, as illustrated in FIG. 55 at step 1578, first executes the TBOPEN mainframe instruction of the DB011T00 table 1580. Note that a table other than DB011T00 may be used. If the action was not successful 1582, then an error message is set 1590, TBEND of the DB011T00 table is executed 1592, and the system returns to the calling routine 1602. If the action was successful 1582, TBTOP is executed for the table 1584. Then, TBDISPL is executed 1586. If the action was not successful 1588, an error message is set 1590, TBEND of the DB011T00 table is executed 1592, and the system returns to the calling routine 1602. If the action was successful 1588, and the end process key was selected 1594, the system returns to the calling routine 1602. However, if the end process key was not selected 1594, and an entry was not selected 1596, a message is set 1598, and the routine moves to step 1584. If an entry was selected 1596, the number is retrieved 1600 before the system returns to the calling routine 1602.

When the Get Members routine (FIG. 56 at step 1604) is called, it first sets the DBDs and associated DDs 1606. If more than one DBD exists 1608, the continuation is set to "," 1610, and the routine moves to step 1614. If there is not more than one DBD 1608, the continuation is set for ")" 1612. The DBD/DD commands are set at step 1614. Finally, the DBDs are cleared 1616 before the return to the calling routine 1618.

Figure 57:
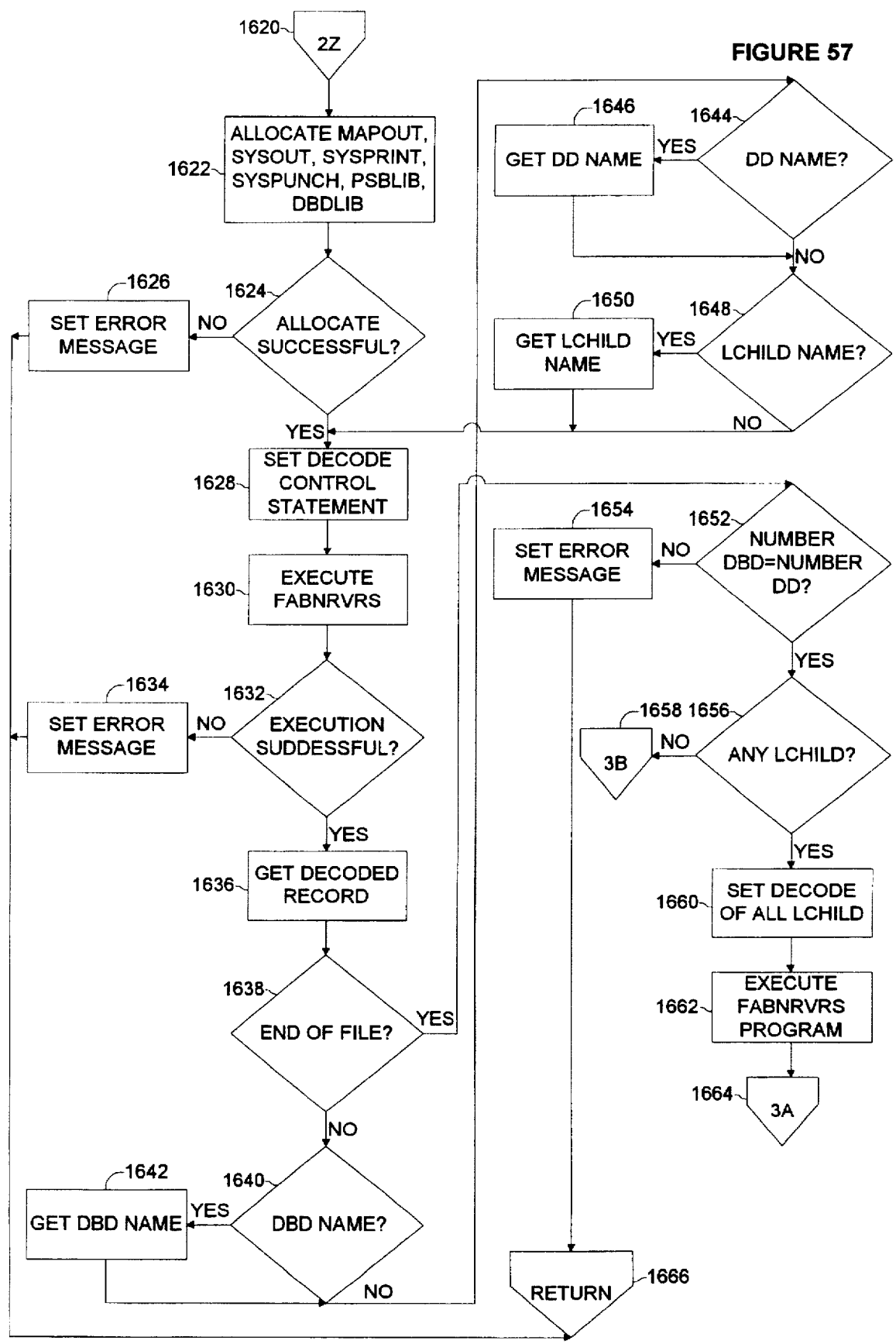
FIG. 57 is a flow diagram illustrating the decode routine in accordance with one embodiment of the present invention.

The Decode routine checks the allocations of files and is shown in FIG. 57 at step 1620. The system files MAPOUT, SYSOUT, SYSPRINT, SYSPUNCH, PSBLIB, AND DBDLIB are allocated 1622. If the allocation was not successful 1624, an error message is set 1626, and the system returns to the calling routine 1666. If successful 1624, the decode control statement is set 1628 before the mainframe program FABNRVRS is executed 1630. If the execution was not successful 1632, an error message is set 1634 before returning to the calling routine 1666. If successful, the decoded record is retrieved 1636. If the record is at the end of file 1638, the routine jumps to step 1652. If not at the end of file 1638, the routine determines if the DBD name exists 1640. The DBD name is retrieved if it exists 1642. If the name does not exist, or if it is retrieved, the system next checks if the DD name exists 1644. It is retrieved 1646 if it exists. The next step, after the DD name is retrieved or if it does not exist, determines if the LCHILD name exists 1648. It is retrieved if existing 1650. If not existing, or after retrieval if existing, the routine moves back to step 1628.

At step 1652, if the number of DBDs is not equal to the number of DDs, an error message is set 1654, and the system returns to the calling routine 1666. Otherwise, if the numbers are equal 1652, and there is an LCHILD 1656, all LCHILD are decoded 1660, the mainframe FABNRVRS program executes 1662, and the routine moves to step 1668 of FIG. 58 (step 1664). If there were no LCHILD 1656, the routine moves to step 1668 of FIG. 58 (step 1664).

Figure 58:
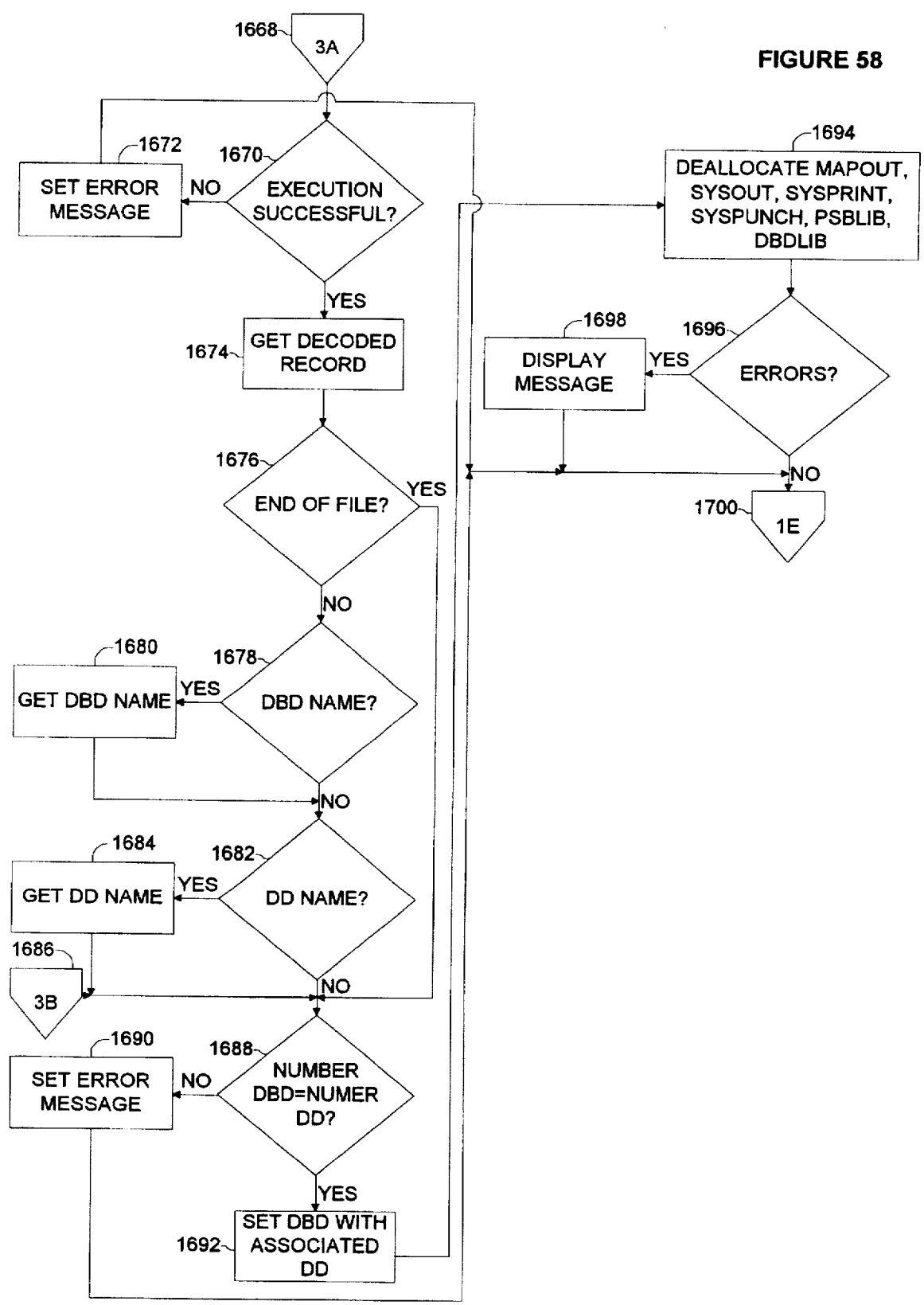
FIG. 58 is a continuation of the flow diagram of FIG. 57.

FIG. 58, at step 1668, represents the continuation of the Decode routine. If the execution of the FABNRVRS program (of step 1662, FIG. 57) was not successful 1670, an error message is set 1672, and the system exits to step 172 of FIG. 13 (step 1700). If successful 1670, the recorded record is retrieved 1674. If at the end of file 1676, the routine moves to step 1688. However, if not at the end of file 1676, does the DBD name exist 1678. If it exists, the DBD name is retrieved 1680. The next step, whether the DBD exists and was retrieved or was not existent, determines if the DD name exists 1682. The DD name is retrieved if existent 1684. The routine moves on to step 1688 after the retrieval or if the DD name was non-existent.

Step 1658 from FIG. 57, as well as the jump from step 1676, both enter at step 1686 and continue to step 1688. At this juncture in the routine, it is determined whether the number of DBDs equals the number of DDs 1688. If they are not equal, an error message is set 1690, and the system exits to step 172 of FIG. 13 (step 1700). Otherwise, the DBD with the associated DD is set 1692. Then, the system files MAPOUT, SYSOUT, SYSPRINT, SYSPUNCH, PSBLIB, AND DBDLIB are deallocated 1694. If errors occurred in the deallocation 1696, a message is displayed to that effect 1698. If there were no errors 1696, or after the message is displayed 1698, the system exits to step 172 of FIG. 13 (step 1700).

Those skilled in the art will appreciate the advantages of the present invention, as well as, embodiments of the invention which are not specifically set out in the specification. As such, the scope of the invention should only be measured by the following claims.

We claim:

1. A system for automatically recovering data from a database, the system comprising:

at least one information database stored in a direct access storage device that stores the data;

a log database that stores image copies of the data wherein the image copies are each loaded with a time stamp that corresponds to when that image copy was made;

an interface operational to allow a user to input an information database designation and a time stamp value which are both associated with particular data to be recovered;

a database recovery routine operational to create program control language based in part on the input; and a processor operational to control the interface, to execute the database recovery routine, and to execute the program control language and restore an image copy of the particular data to the designated information database.

2. A system for automatically recovering data from a database, the system comprising:

a research-recovery routine for identifying the database and a time stamp;

a data-recovery routine for automatically creating program control language sequences specific to the identified database and the identified time stamp, wherein the program control language sequences are configured to recover database data upon execution;

a computer having a processor, wherein the processor is operational to execute the research-recovery routine and the data-recovery routine; and a direct access storage device operational to store the database data.

3. A system for automatically recovering data from a database, the system comprising:

a research-recovery routine for identifying the database and a time stamp;

a data-recovery routine for automatically creating program control language sequences specific to the identified database and the identified time stamp, wherein the program control language sequences are configured to recover database data upon execution; and a recovery clean-up routine for updating information maintained by a database repository control and for organizing the data stored in the database to be consistent with the recovered data.

4. The system of claim 3 further comprising a computer having a processor, wherein the processor is operational to execute the research-recovery routine, the data-recovery routine, and the recovery clean-up routine.

5. The system of claim 4 further comprising a direct access storage device operational to store the database data.

6. A method for automatically recovering data from a database, the method comprising the steps of:

researching an identified database and an identified time stamp to provide subsystem information needed for a recovery of a database;

automatically creating initial program control language sequences to locate an image copy of database information, wherein the image copy is stored in a database recovery repository, and wherein the database information is held in a time log format; and recovering database information by using the located image copy stored in the database recovery repository and automatically formulating a sequence of job control language for automatically recovering the identified database information stored prior to the time of the identified time stamp.

7. The method of claim 6 wherein the method is executed by a computer processor.

8. The method of claim 7 wherein the database information is stored in a direct access storage device.

9. A method for automatically recovering data from a database, the method comprising the steps of:

researching an identified database and an identified time stamp to provide subsystem information needed for a recovery of a database;

automatically creating initial program control language sequences to locate an image copy of database information, wherein the image copy is stored in a database recovery repository, and wherein the database information is held in a time log format;

recovering database information by using the located image copy stored in the database recovery repository and automatically formulating a sequence of job control language for automatically recovering the identified database information stored prior to the time of the identified time stamp; and cleaning up the database by updating information maintained by a database repository control and by organizing the data within the database consistent with the recovered database.

10. The method of claim 9 wherein the method is executed by a computer processor.

11. The method of claim 10 wherein the database information is stored in a direct access storage device.

12. The method of claim 9 further comprising displaying a panel on a computer monitor to request a user to provide the identified database and the identified time stamp.

13. A system for automatically recovering data from a database, the system comprising:

at least one information database that stores the data;

a log database that stores image copies of the data wherein the image copies are each loaded with a time stamp that corresponds to when that image copy was made;

an interface comprised of panels that request the user to input information and operational to allow a user to input an information database designation and a time stamp value which are both associated with particular data to be recovered;

a database recovery routine operational to create program control language based in part on the input; and a processor operational to control the interface, to execute the database recovery routine, and to execute the program control language and restore an image copy of the particular data to the designated information database.

14. The system of claim 13 wherein the interface is comprised of a computer program user interface and wherein the panels are displayed on a computer monitor by the computer program user interface.

15. A system for automatically recovering data from a database, the system comprising:

at least one information database that stores the data;

a log database that stores image copies of the data wherein the image copies are each loaded with a time stamp that corresponds to when that image copy was made;

an interface operational to allow a user to input an information database designation and a time stamp value which are both associated with particular data to be recovered;

a database recovery routine operational to create program control language based in part on the input; and a processor operational to control the interface, to execute the database recovery routine, and to execute the program control language and restore an image copy of the particular data to the designated information database;

said system being operational to execute in a foreground mode and a background mode.

16. A system for automatically recovering data from a database, the system comprising:

at least one information database that stores the data;

a log database that stores image copies of the data wherein the image copies are each loaded with a time stamp that corresponds to when that image copy was made;

an interface operational to allow a user to input an information database designation and a time stamp value which are both associated with particular data to be recovered;

a database recovery routine comprising a research-recovery routine operational to locate a particular entry to the log database wherein the particular entry has a particular time stamp corresponding to when the particular data was lost and a data-recovery routine operational to create program control language based in part on the particular entry and the particular time stamp; and a processor operational to control the interface, to execute the database recovery routine, and to execute the program control language and restore an image copy of the particular data to the designated information database.

17. The system of claim 16 wherein the database recovery routine further comprises a recovery clean-up routine operational to automatically terminate an abnormal job, to update information maintained by a database repository control, and to organize the data stored in the information database to be consistent with recovered data.

* * * * *